US010379331B2

(12) United States Patent
Inomata et al.

(10) Patent No.: US 10,379,331 B2
(45) Date of Patent: Aug. 13, 2019

(54) MAGNIFYING OBSERVATION APPARATUS

(71) Applicant: KEYENCE CORPORATION, Osaka-shi, Osaka (JP)

(72) Inventors: Masahiro Inomata, Osaka (JP); Shingo Matsumura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 204 days.

(21) Appl. No.: 15/646,451

(22) Filed: Jul. 11, 2017

(65) Prior Publication Data

US 2018/0024340 A1 Jan. 25, 2018

(30) Foreign Application Priority Data

Jul. 22, 2016 (JP) ................................ 2016-144939

(51) Int. Cl.

| | |
|---|---|
| ***G02B 21/06*** | (2006.01) |
| ***G02B 21/02*** | (2006.01) |
| ***G02B 21/18*** | (2006.01) |
| ***G02B 21/26*** | (2006.01) |
| ***G02B 21/36*** | (2006.01) |
| ***H04N 5/232*** | (2006.01) |

(52) U.S. Cl.

CPC ............ *G02B 21/06* (2013.01); *G02B 21/02* (2013.01); *G02B 21/18* (2013.01); *G02B 21/26* (2013.01); *G02B 21/365* (2013.01); *G02B 21/367* (2013.01); *G02B 21/368* (2013.01); *H04N 5/23222* (2013.01)

(58) Field of Classification Search

CPC .................................................... G02B 21/06

USPC ........................................................... 348/79

See application file for complete search history.

(56) References Cited

U.S. PATENT DOCUMENTS

2018/0077346 A1* 3/2018 Honda ................. G06F 3/0481
2018/0156606 A1* 6/2018 Jeon ...................... G01B 11/02

FOREIGN PATENT DOCUMENTS

JP 2013-72971 4/2013

OTHER PUBLICATIONS

U.S. Appl. No. 15/646,444, filed Jul. 11, 2017, Masahiro Inomata et al., Keyence Corporation.
U.S. Appl. No. 15/646,432, filed Jul. 11, 2017, Masahiro Inomata et al., Keyence Corporation.

* cited by examiner

*Primary Examiner* — Yulin Sun

(57) ABSTRACT

Lights in a plurality of emitting directions different from one another are selectively irradiated on the observation target from a light projecting section. A plurality of image data indicating images of the observation target at the time when the lights in the plurality of emitting directions are respectively irradiated on the observation target are generated by an imaging section. An imaginary emitting direction of light is designated on the basis of operation of an operation section by the user. Image data for display indicating an image of the observation target that should be obtained when it is assumed that the light in the designated emitting direction is irradiated on the observation target is generated on the basis of the designated emitting direction and the plurality of image data generated by the imaging section. The image based on the generated image data for display is displayed on the display section.

18 Claims, 45 Drawing Sheets

FIG. 24

| | | | | | | | |
|---|---|---|---|---|---|---|---|
| 12 | 13 | 12 | 11 | 10 | 50 | 51 | 51 |
| 13 | 14 | 15 | 16 | 17 | 18 | 19 | 20 |
| 13 | 13 | 18 | 21 | 24 | 27 | 30 | 33 |
| 13 | 13 | 21 | 26 | 31 | 36 | 41 | 46 |
| 13 | 13 | 24 | 31 | 38 | 45 | 52 | 59 |
| 13 | 13 | 27 | 36 | 45 | 54 | 63 | 72 |
| 13 | 13 | 30 | 41 | 52 | 63 | 74 | 85 |

MAGNIFYING OBSERVATION APPARATUS

CROSS-REFERENCE TO RELATED APPLICATIONS

The present application claims foreign priority based on Japanese Patent Application No. 2016-144939, filed Jul. 22, 2016, the contents of which is incorporated herein by reference.

BACKGROUND OF THE INVENTION

1. Field of the Invention

The present invention relates to a magnifying observation apparatus for magnifying and observing an observation target.

2. Description of Related Art

A magnifying observation apparatus is sometimes used in order to magnify and observe an observation target (see, for example, JP-A-2013-72971). In a microscope system described in JP-A-2013-72971, bright-field illumination light and dark-field illumination light are irradiated on a sample on a stage through an objective lens.

The bright-field illumination light is illumination light emitted in a direction parallel to an optical axis of the objective lens. The dark-field illumination light is illumination light emitted in a direction inclined with respect to the optical axis of the objective lens. Observation light reflected on the sample is made incident on an imaging apparatus through an imaging lens, whereby the sample is imaged.

In the microscope system described in JP-A-2013-72971, illumination intensity of one illumination light is relatively reduced according to a ratio of an exposure time for the bright-field illumination light and an exposure time for the dark-field illumination light. Consequently, the intensity of the bright-field illumination light and the intensity of the dark-field illumination light are aligned. JP-A-2013-72971 mentions that, as a result, it is possible to perform the observation of the sample at most suitable illumination intensity in observing the sample on which the bright-field illumination light and the dark-field illumination light are simultaneously irradiated. A user is capable of intuitively adjusting a ratio of illumination intensities of the bright-field illumination light and the dark-field illumination light from an image in an optimized illumination intensity state.

However, appropriate imaging conditions such as illumination intensity are different depending on the shape and the material of an observation target. Therefore, it is difficult for an unskilled user to acquire an image captured under the appropriate imaging conditions. It is sometimes found ex post that the imaging conditions are inappropriate. In such a case, imaging of the observation target needs to be performed again under different imaging conditions. Therefore, a burden on the user increases.

SUMMARY OF THE INVENTION

An object of the present invention is to provide a magnifying observation apparatus capable of easily acquiring an image of an observation target corresponding to a request of a user.

(1) A magnifying observation apparatus according to the present invention includes: a stage on which an observation target is placed; a light projecting device configured to selectively irradiate lights in a plurality of emitting directions different from one another on the observation target placed on the stage; an imaging section configured to receive light from the observation target and respectively generate a plurality of image data indicating images of the observation target at times when the lights in the plurality of emitting directions are respectively irradiated on the observation target; a designating section configured to designate an imaginary emitting direction of light on the basis of operation by a user; a data generating section configured to generate, on the basis of the emitting direction designated by the designating section and the plurality of image data generated by the imaging section, image data for display indicating an image of the observation target that should be obtained when it is assumed that the light in the designated emitting direction is irradiated on the observation target; and a display section configured to display an image for display based on the image data for display generated by the data generating section.

In the magnifying observation apparatus, the observation target is placed on the stage, and the lights in the plurality of emitting directions are respectively selectively irradiated on the observation target on the stage. The plurality of image data indicating the images of the observation target at the time when the lights in the plurality of emitting directions are respectively irradiated on the observation target are generated by the imaging section.

The imaginary emitting direction of light is designated on the basis of the operation by the user. In this case, the image data for display indicating the image of the observation target that should be obtained when it is assumed that the light in the designated emitting direction is irradiated on the observation target is generated on the basis of the designated emitting direction and the plurality of image data generated by the imaging section. The image based on the generated image data for display is displayed on the display section.

Therefore, by optionally designating the imaginary emitting direction of light, the user can generate, without changing an emitting direction of light actually irradiated on the observation target, image data for display indicating an image at the time when light in an appropriate emitting direction corresponding to the shape and the material of the observation target is irradiated on the observation target. Consequently, the user can easily acquire an image of the observation target corresponding to a request of the user.

The image data for display can be generated using an already generated plurality of image data. Therefore, it is unnecessary to perform the imaging of the observation target again. Therefore, it is possible to reduce a burden on the user.

(2) The data generating section may generate the image data for display by combining at least two or more image data among the plurality of image data generated by the imaging section.

In this case, at least two or more image data among a plurality of image data corresponding to the lights in the plurality of emitting directions different from one another are combined. Consequently, it is possible to easily generate image data for display indicating an image of the observation target that should be obtained when it is assumed that light in an emitting direction different from light actually irradiated on the observation target is irradiated on the observation target.

(3) The data generating section may determine rates of the combination of the at least two or more image data on the basis of the designated emitting direction. In this case, it is possible to more easily generate the image data for display on the basis of the plurality of image data.

(4) The data generating section may update, according to the emitting direction designated by the designating section, the image data for display to be generated. In this case, the user can easily acquire, by designating an optimum emitting direction corresponding to the shape and the material of the observation target, image data for display indicating an image of the observation target corresponding to a request of the user.

(5) The display section may display an image for display based on the image data for display before the update simultaneously with an image for display based on the image data for display after the update. In this case, the user can compare the image for display based on the image data for display before the update and the image for display based on the image data for display after the update.

(6) The designating section may include: an indicator display section configured to display a first indicator indicating an emitting position of light; and an operation section operated by the user in order to change a position of the first indicator displayed on the indicator display section. The imaginary emitting direction of light may be designated on the basis of the position of the first indicator on the indicator display section operated by the operation section. In this case, the user can easily designate, by moving the first indicator using the operation section, the imaginary emitting direction of light while grasping the emitting position of light.

(7) The indicator display section may further display a second indicator indicating a position of the observation target. In this case, the user can easily designate, by visually recognizing the first and second indicators, the imaginary emitting direction of light while grasping a relation between the observation target and the emitting position of light.

(8) The indicator display section may further display a third indicator indicating a range that can be designated as the imaginary emitting direction of light. In this case, the user can easily grasp, by visually recognizing the third indicator, the range that can be designated as the imaginary emitting direction of light.

(9) The indicator display section may configure a part of the display section, and the display section may include: a first display region where the image for display based on the image data for display is displayed; and a second display region where the first indicator is displayed. In this case, in the display section, the image for display is displayed in the first display region and the first indicator is displayed in the second display region. Consequently, the image for display and the first indicator do not overlap. Therefore, it is easy to visually recognize the image for display and the first indicator.

(10) The indicator display section may configure a part of the display section, and the display section may superimpose and display the first indicator on the image for display based on the image data for display. In this case, in the display section, the first indicator is superimposed and displayed on the image for display. Consequently, the user can easily designate the imaginary emitting direction of light with more intuitive operation.

(11) The magnifying observation apparatus may further include an objective lens, the imaging section may generate the plurality of image data by receiving light from the observation target via the objective lens, and the light projecting device may include: a first light projecting section including a plurality of light emission regions rotation-symmetrically disposed around an optical axis of the objective lens, the first light projecting section being provided to surround the optical axis of the objective lens; and a switching section configured to switch an emission state of light in the plurality of light emission regions such that the lights in the plurality of light emitting directions are irradiated on the observation target.

In this case, the emission state of light in the plurality of light emission regions of the first light projecting section is switched by the switching section. Consequently, it is possible to selectively irradiate, with a simple configuration and simple control, the lights in the plurality of emitting directions different from one another on the observation target.

(12) The light projecting device may further include a second light projecting section configured to irradiate first light on the observation target from a position closer to the optical axis of the objective lens than the first light projecting section, the switching section may further switch an emission state of the first light in the second light projecting section, the imaging section may further generate image data indicating an image of the observation target at a time when the first light is irradiated on the observation target, and the data generating section may generate the image data for display further on the basis of the image data generated according to the first light.

In this case, the first light is irradiated on the observation target from the position closer to the optical axis of the objective lens than the first light projecting section by the second light projecting section In the image of the observation target at the time when the first light is irradiated, unevenness on the surface of the observation target is more clearly shown compared with the image of the observation target at the time when the light is irradiated from the first light projecting section. Therefore, by using the image data corresponding to the first light, it is possible to generate the image data for display that more clearly shows the unevenness on the surface of the observation target.

(13) The light projecting device may further include a third light projecting section disposed to be opposed to the imaging section across the observation target and configured to irradiate second light on the observation target, the switching section may further switch an emission state of the second light in the third light projecting section, the imaging section may further generate image data indicating an image of the observation target at a time when the second light is irradiated on the observation target, and the data generating section may generate the image data for display further on the basis of the image data generated according to the second light.

In this case, the second light is irradiated on the observation target by the third light projecting section, and light transmitted through the observation target is received by the imaging section. In the image of the observation target at the time when the second light is irradiated, the structure on the inside of the observation target is shown. Therefore, by using the image data corresponding to the second light, it is possible to generate the image data for display that shows the structure on the inside of the observation target.

(14) The designating section may be configured to be capable of designating the imaginary emitting direction of light on the image for display displayed by the display section. Consequently, the user can easily designate the imaginary emitting direction of light.

(15) The display section may include: a main display region where the image for display based on the image data for display is displayed; and a sub-display region where a position image indicating a position of the observation target is displayed, the sub-display region being smaller than the main display region, emitting position indicators indicating emitting positions of lights may be respectively displayed in the main display region and the sub-display region, and, when the designation of the imaginary emitting direction of light is changed by the designating section, the emitting position indicators displayed in the main display region and the sub-display region may move in association with each other to move to positions corresponding to the changed emitting direction.

In this case, the emitting position of light indicated by the emitting position indicator displayed in the main display region and the emitting position of light indicated by the emitting position indicator displayed in the sub-display region are aligned. Therefore, the user can grasp the imaginary emitting direction of light while visually recognizing a desired region of the main display region and the sub-display region.

(16) The designating section may be configured to be capable of operating at least one of the emitting position indicator displayed in the main display region and the emitting position indicator displayed in the sub-display region. In this case, when one emitting position indicator moves according to the operation of the designating section by the user, the other emitting position indicator also moves in association with the movement of the one emitting position indicator.

According to the present invention, it is possible to easily acquire an image of the observation target corresponding to a request of the user.

BRIEF DESCRIPTION OF THE DRAWINGS

FIG. 24 is a diagram visually showing mask image data.

DESCRIPTION OF EMBODIMENTS

Figure 1:
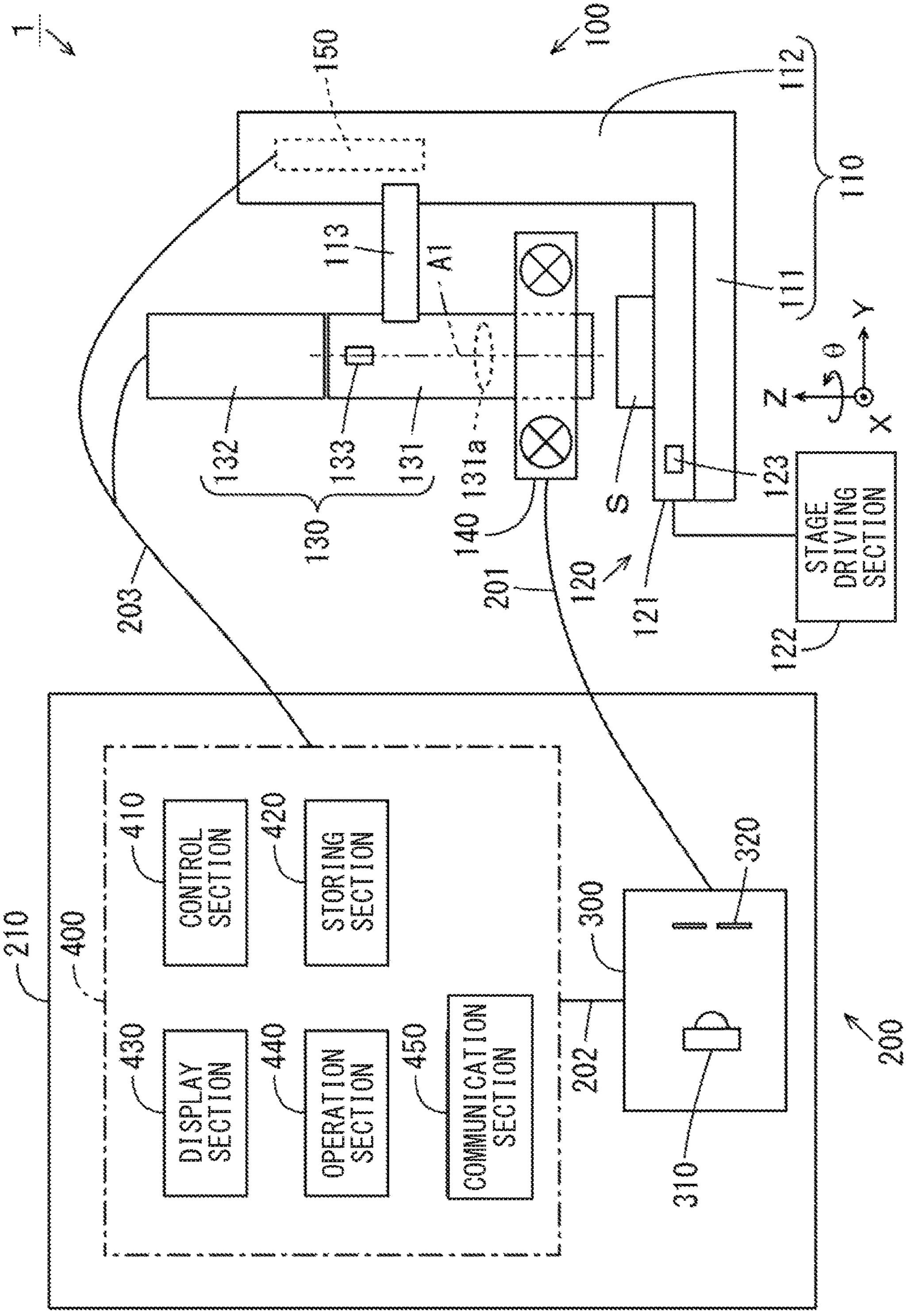
FIG. 1 is a schematic diagram showing the configuration of a magnifying observation apparatus according to a first embodiment of the present invention.

[1] First Embodiment (1) Configuration of a Magnifying Observation Apparatus
(a) Measurement Head A magnifying observation apparatus according to a first embodiment of the present invention is explained with reference to the drawings. FIG. 1 is a schematic diagram showing the configuration of the magnifying observation apparatus according to the first embodiment of the present invention. As shown in FIG. 1, a magnifying observation apparatus 1 includes a measurement head 100 and a processing device 200. The measurement head 100 is, for example, an endoscope and includes a stand section 110, a stage device 120, a lens barrel section 130, a light projecting section 140, and a control board 150.

The stand section 110 has an L-shape in a longitudinal cross section and includes a setting section 111, a holding section 112, and a focus driving section 113. The setting section 111 and the holding section 112 are formed by, for example, resin. The setting section 111 has a horizontal flat shape and is set on a setting surface. The holding section 112 is provided to extend upward from one end portion of the setting section 111.

The stage device 120 includes a stage 121 and a stage driving section 122. The stage 121 is provided on the upper surface of the setting section 111. An observation target S is placed on the stage 121. Two directions orthogonal to each other in a plane on the stage 121 on which the observation target S is placed (hereinafter referred to as placement surface) are defined as an X direction and a Y direction and respectively indicated by arrows X and Y. A direction of a normal orthogonal to the placement surface of the stage 121 is defined as a Z direction and indicated by an arrow Z. A direction of rotation around an axis parallel to the Z direction is defined as a θ direction and indicated by an arrow θ.

The stage driving section 122 includes a not-shown actuator such as a stepping motor. The stage driving section 122 moves the stage 121 in the X direction, the Y direction, or the Z direction or rotates the stage 121 in the θ direction on the basis of a drive pulse given by the control board 150. The user is also capable of manually moving the stage 121 in the X direction, the Y direction, or the Z direction or rotating the stage 121 in the θ direction.

The lens barrel section 130 includes a lens unit 131 and an imaging section 132 and is disposed above the stage 121. The lens unit 131 can be replaced with another lens unit according to a type of the observation target S. The lens unit 131 is configured by an objective lens 131*a* and a not-shown plurality of lenses. An optical axis A1 of the objective lens 131*a* is parallel to the Z direction. The imaging section 132 includes, for example, a CMOS (complementary metal oxide semiconductor) camera. The imaging section 132 may include another camera such as a CCD (charge coupled device) camera.

The lens barrel section 130 is attached to the holding section 112 by the focus driving section 113 of the stand section 110. The focus driving section 113 includes a not-shown actuator such as a stepping motor. The focus driving section 113 moves the lens unit 131 in the direction of the optical axis A1 of the objective lens 131*a* (the Z direction) on the basis of a drive pulse given by the control board 150. Consequently, a focal position of light passed through the lens unit 131 changes to the Z direction. The user is also capable of manually moving the lens unit 131 in the direction of the optical axis A1 of the objective lens 131*a*.

The light projecting section 140 is integrally attached to the lens unit 131 to surround the optical axis A1 of the objective lens 131*a*. Consequently, it is possible to uniquely determine a positional relation between the light projecting section 140 and the lens unit 131. Since it is unnecessary to add a member that holds the light projecting section 140 in the magnifying observation apparatus 1, it is possible to reduce the magnifying observation apparatus 1 in size. An optical axis A2 (FIGS. 3A and 3B referred to below) of the light projecting section 140 is substantially the same as the optical axis A1 of the objective lens 131*a*.

Lights in a plurality of emitting directions are irradiated on the observation target S on the stage 121 from the light projecting section 140. Light reflected to above the stage 121 by the observation target S is condensed and focused by the lens unit 131 and thereafter received by the imaging section 132. The imaging section 132 generates image data on the basis of pixel data corresponding to light reception amounts of pixels. Each of a plurality of image data respectively generated by the imaging section 132 at the time when the lights in the plurality of emitting directions are irradiated on the observation target S by the light projecting section 140 is referred to as original image data. The imaging section 132 gives the generated plurality of original image data to a control device 400.

The control board 150 is provided in, for example, the holding section 112 of the stand section 110 and connected to the focus driving section 113, the stage driving section 122, and the imaging section 132. The control board 150 controls the operations of the focus driving section 113 and the stage driving section 122 on the basis of control by the processing device 200. A control signal is input to the imaging section 132 from the control device 400. A plurality of original image data generated by the imaging section 132 are sequentially given to the processing device 200 via a cable 203.

(b) Processing Device

The processing device 200 includes a housing 210, alight generating section 300, and the control device 400. The housing 210 houses the light generating section 300 and the control device 400. The light generating section 300 is optically connected to the light projecting section 140 of the measurement head 100 by a fiber unit 201. The fiber unit 201 includes a not-shown plurality of optical fibers.

The light generating section 300 includes a light source 310 and a light blocking section 320. The light source 310 is, for example, an LED (light emitting diode). The light source 310 may be another light source such as a halogen lamp. The light blocking section 320 is disposed between the light source 310 and the fiber unit 201 to be capable of partially blocking light emitted by the light source 310. The light emitted by the light source 310 passes through the light blocking section 320 and is made incident on the fiber unit 201. Consequently, light is emitted from the light projecting section 140 of the measurement head 100 through the fiber unit 201.

Figure 2:
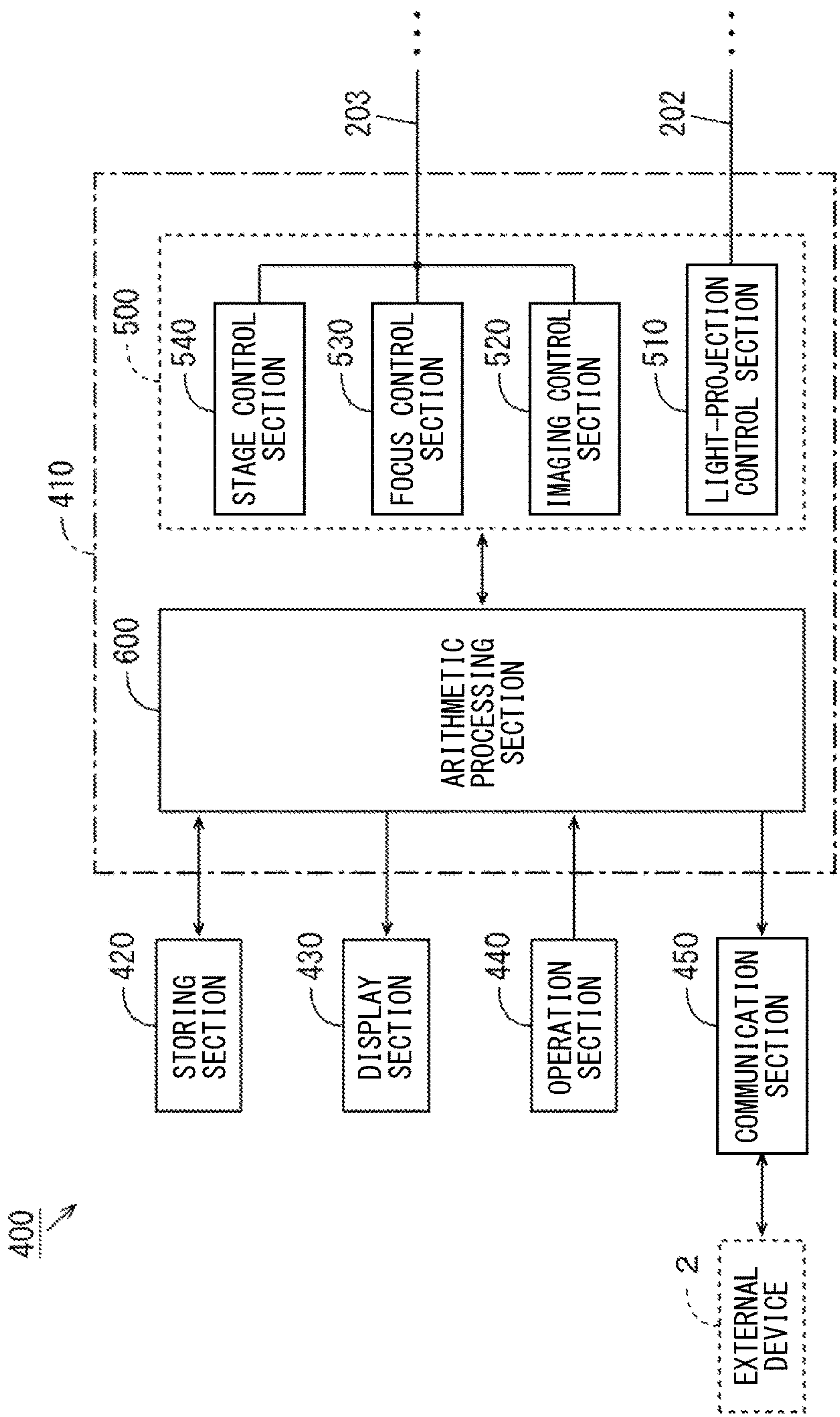
FIG. 2 is a block diagram showing the configuration of a control device shown in FIG. 1.

FIG. 2 is a block diagram showing the configuration of the control device 400 shown in FIG. 1. As shown in FIG. 2, the control device 400 includes a control section 410, a storing section 420, a display section 430, an operation section 440, and a communication section 450. The control section 410 includes, for example, a CPU (central processing unit). The storing section 420 includes, for example, a ROM (read only memory), a RAM (random access memory), or a HDD (hard disk drive). In this embodiment, the control section 410 and the storing section 420 are realized by a personal computer.

The control section 410 includes a driving control section 500 and an arithmetic processing section 600. A system program is stored in the storing section 420. The storing section 420 is used for processing of various data and saving of various data given from the control section 410. Functions of the driving control section 500 and the arithmetic processing section 600 are realized by the control section 410 executing the system program stored in the storing section 420.

The driving control section 500 includes a light-projection control section 510, an imaging control section 520, a focus control section 530, and a stage control section 540. The light-projection control section 510 is connected to the light generating section 300 shown in FIG. 1 through a cable 202 and controls the operation of the light generating section 300. The imaging control section 520, the focus control section 530, and the stage control section 540 are connected to the control board 150 of the measurement head 100 shown in FIG. 1 through the cable 203.

The imaging control section 520, the focus control section 530, and the stage control section 540 respectively control the operations of the imaging section 132, the focus driving section 113, and the stage driving section 122 through the control board 150. The imaging control section 520 sequentially gives a plurality of original image data generated by the imaging section 132 to the arithmetic processing section 600.

The arithmetic processing section 600 can generate, on the basis of at least one of the acquired plurality of original image data, image data for display indicating an image of the observation target S that should be obtained when it is assumed that light in an emitting direction designated by the user is irradiated on the observation target S. Details of the arithmetic processing section 600 are explained below. The plurality of original image data acquired by the arithmetic processing section 600 and the image data for display generated by the arithmetic processing section 600 are stored in the storing section 420.

The display section 430 is configured by, for example, an LCD (liquid crystal display) panel. The display section 430 may be configured by another display section such as an organic EL (electroluminescence) panel. The display section 430 displays, for example, an image based on the image data stored in the storing section 420 or the image data generated by the arithmetic processing section 600. The operation section 440 includes a pointing device such as a mouse, a touch panel, a trackball, or a joystick and a keyboard and is operated by the user in order to give an instruction and the like to the control device 400. The operation section 440 may include a jog shuttle in addition to the pointing device and the keyboard. The operation section 440 may include dial-like operation means, a rotation center of which faces the horizontal direction, for moving the lens barrel section 130 and the stage 121 in the up-down direction.

The communication section 450 includes an interface for connecting the control device 400 to a network. In the example shown in FIG. 1, an external device 2 having a display function is connected to the network. The control device 400 is capable of transmitting image data to the external device 2 having the display function via the communication section 450 A user of the external device 2 can acquire image data stored in a general-purpose image file format from the control device 400 via the communication section 450 and cause the external device 2 to display an image based on the image data.

(c) Light Projecting Section

Figure 3A:
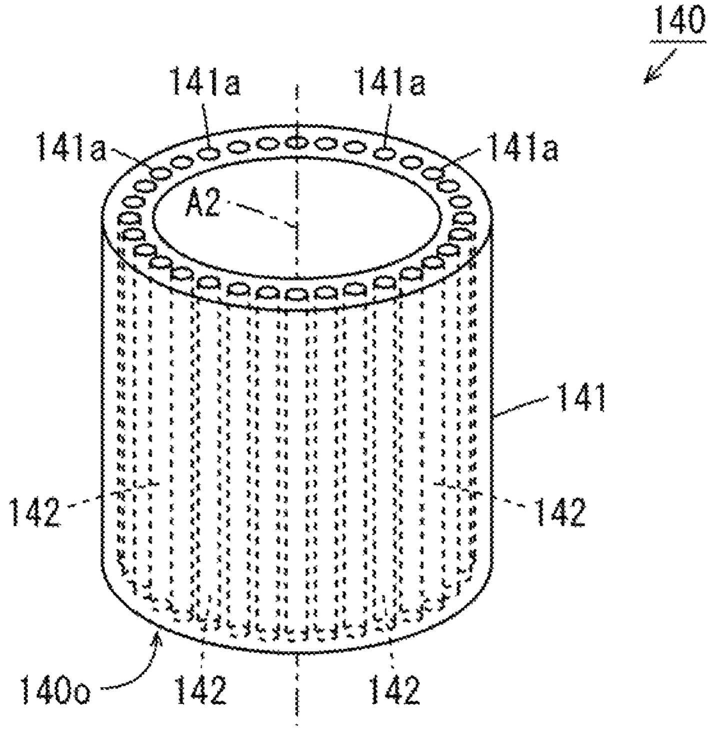
FIGS. 3A and 3B are a perspective view and a plan view showing the configuration of a light projecting section.
Figure 3B:
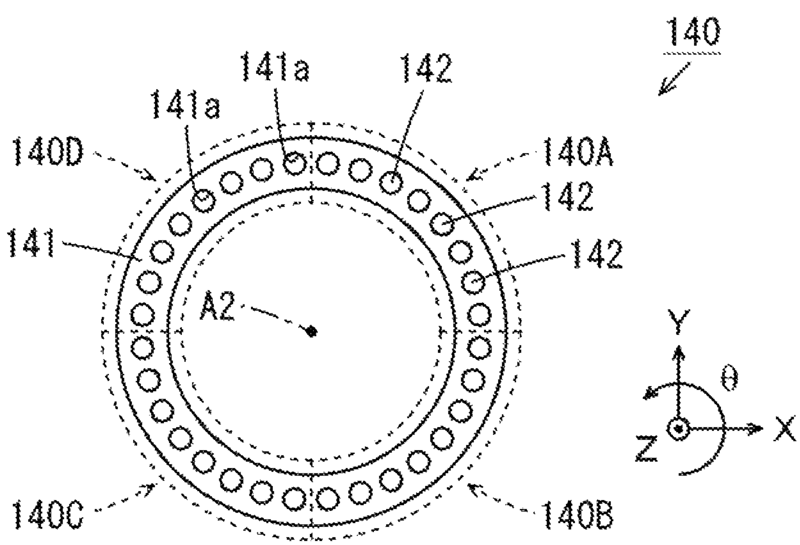

FIGS. 3A and 3B are a perspective view and a plan view respectively showing the configuration of the light projecting section 140. As shown in FIG. 3A, the light projecting section 140 includes a holding member 141 and a plurality of optical fibers 142. The holding member 141 is formed by, for example, resin and has a cylindrical shape. The outer diameter of the holding member 141 in plan view is smaller than the dimension of the stage 121 shown in FIG. 1. The holding member 141 is disposed to surround the optical axis A1 of the objective lens 131*a* shown in FIG. 1.

A plurality of through holes 141*a* piercing through the holding member 141 from the upper surface to the lower surface are formed in the holding member 141. The plurality of through holes 141*a* are disposed at substantially equal intervals and located rotation-symmetrically around the optical axis A1 of the objective lens 131*a*. The plurality of optical fibers 142 are respectively inserted through the plurality of through holes 141*a*. Consequently, the plurality of optical fibers 142 are integrally held by the holding member 141. Incident sections and emission sections of lights in the optical fibers 142 are respectively located on the upper surface and the lower surface of the holding member 141. Consequently, a light emitting section 140*o* is formed on the lower surface of the holding member 141.

The plurality of optical fibers 142 are disposed on one circumference centering on the optical axis A1 of the objective lens 131*a*. Therefore, the distances from the optical axis A1 of the objective lens 131*a* to the emitting sections in the plurality of optical fibers 142 are substantially equal. An angle formed by lines, which connect the emitting sections in the optical fibers 142 and the center of the stage 121, with respect to the optical axis A1 of the objective lens 131*a* is an acute angle. In this embodiment, the holding member 141 integrally holds the plurality of optical fibers 142, whereby a positional relation among the plurality of optical fibers 142 is easily maintained.

As shown in FIG. 3B, the annular light emitting section 140*o* of the light projecting section 140 is substantially equally divided into a plurality of (in this example four) regions 140A, 140B, 140C, and 140D. The plurality of regions 140A to 140D are disposed rotation-symmetrically around the optical axis A1 of the objective lens 131*a*. The plurality of regions 140A to 140D include emitting sections of the optical fibers 142 generally as many as the plurality of regions 140A to 140D.

The incident sections of the plurality of optical fibers 142 are optically connected to the light generating section 300 of the processing device 200 by the fiber unit 201 shown in FIG. 1. Consequently, light emitted from the light generating section 300 is made incident on the incident sections of the plurality of optical fibers 142 from the upper surface of the holding member 141 and emitted from the light emitting section 140*o* on the lower surface of the holding member 141 through the emitting sections of the plurality of optical fibers 142. That is, the optical fibers 142 included in the regions 140A to 140D emit lights from the light emitting section 140*o*, whereby the lights are emitted from the regions 140A to 140D.

The light blocking section 320 shown in FIG. 1 include a mask including a plurality of opening patterns respectively corresponding to the regions 140A to 140D of the light projecting section 140. Light emitted by the light source 310 shown in FIG. 1 passes through any one of the opening patterns of the light blocking section 320 and is made incident on the fiber unit 201. The light-projection control section 510 shown in FIG. 2 switches the opening pattern of the light blocking section 320 for allowing the light to pass to thereby switch the regions 140A to 140D from which lights are emitted in the light projecting section 140. Consequently, the light projecting section 140 is capable of emitting lights from the entire regions 140A to 140D and capable of selectively emitting light from any one of the regions 140A to 140D.

In this way, the light projecting section 140 can irradiate the lights having the emitting directions different from one another on the observation target S. Lights simultaneously emitted from the entire regions 140A to 140D are referred to as ring illumination. Light emitted from any one region of the regions 140A to 140D is referred to as directional illumination. In this embodiment, the light projecting section 140 is capable of selectively emitting the ring illumination and any one of four directional illuminations. Therefore, the imaging section 132 shown in FIG. 1 is capable of generating five original image data indicating the observation target S at the time when the ring illumination and the four directional illuminations are respectively irradiated on the observation target S.

The four directional illuminations are lights respectively emitted from four positions (the regions 140A to 140D) different from one another by approximately 90° in the θ direction around the optical axis A1 of the objective lens 131*a*. The four directional illuminations are rotation-symmetrical around the optical axis A1 of the objective lens 131*a*. Therefore, the directional illuminations have deviation from the optical axis A1 of the objective lens 131*a*. The four directional illuminations are emitted in directions inclined with respect to the optical axis A1 of the objective lens 131*a* and different from one another. Light amounts of the four directional illuminations are substantially equal to one another. Angles of irradiation of the four directional illuminations with respect to the optical axis A1 of the objective lens 131*a* are not uniform according to the θ direction.

On the other hand, the ring illumination is light not deviating from the optical axis A1 of the objective lens 131*a*. The center of the ring illumination substantially coincides with the optical axis A1 of the objective lens 131*a*. Therefore, the ring illumination is emitted substantially in the direction of the optical axis A1 of the objective lens 131*a*. The ring illumination has a substantially uniform light amount distribution around the optical axis A1 of the objective lens 131*a*. A light amount of the ring illumination is substantially equal to a sum of light amounts of the four directional illuminations. That is, the light amount of the ring illumination is approximately four times as large as the light amount of each of the directional illuminations. An angle of irradiation of the ring illumination with respect to the optical axis A1 of the objective lens 131*a* is uniform according to the θ direction.

As explained above, in this embodiment, the plurality of regions 140A to 140D are disposed rotation-symmetrically around the optical axis A1 of the objective lens 131*a*. Consequently, when image data for display is generated by an arithmetic operation on the basis of the plurality of original image data, it is possible to simplify the arithmetic operation.

In this embodiment, the optical fibers 142 are provided as the light emitting members in the regions 140A to 140D of the light projecting section 140. However, the present invention is not limited to this. Light sources such as LEDs may be provided as the light emitting members in the regions 140A to 140D of the light projecting section 140. In this case, the light generating section 300 is not provided in the processing device 200. In this configuration, one or a plurality of light sources provided in each of the regions 140A to 140D emit lights, whereby the lights are emitted from the regions 140A to 140D.

Figure 4C:
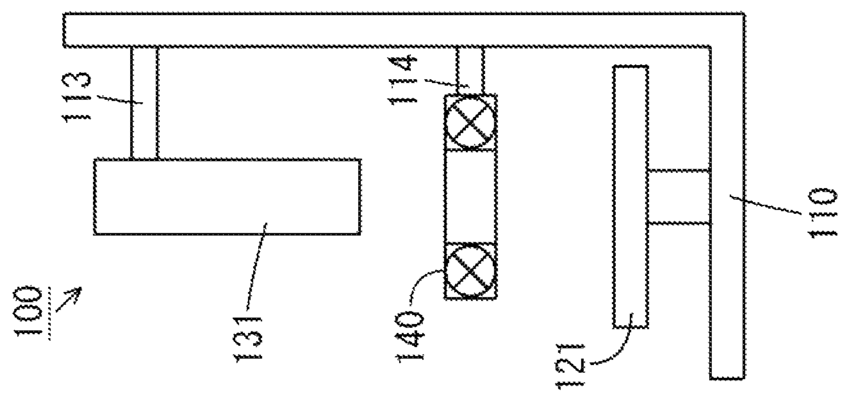
FIGS. 4A to 4C are schematic diagrams showing disposition examples of the light projecting section.
Figure 4B:
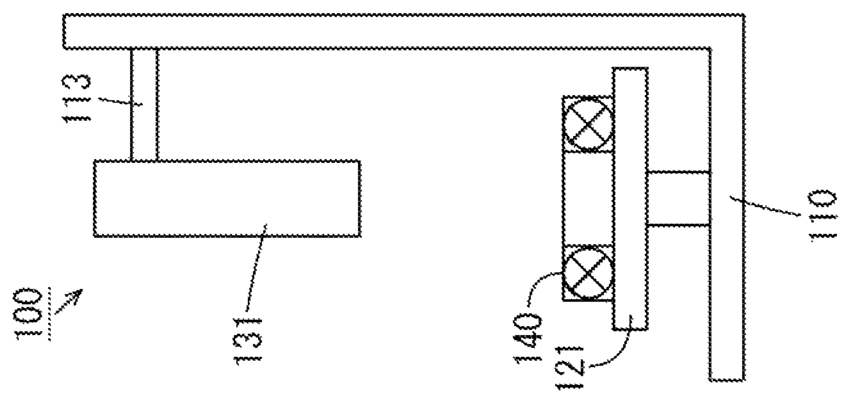
Figure 4A:
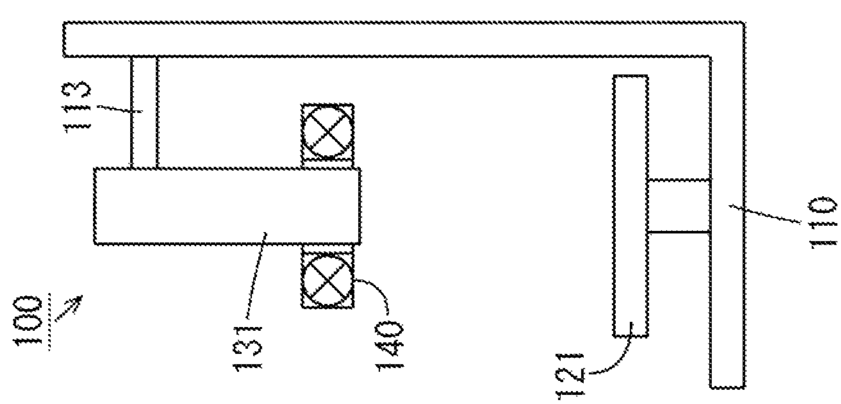

FIGS. 4A to 4C are schematic diagrams showing disposition examples of the light projecting section 140. In this embodiment, as shown in FIG. 4A, the light projecting section 140 is attached to the lens unit 131. The present invention is not limited to this. As shown in FIG. 4B, the light projecting section 140 may be disposed on the stage 121. Alternatively, as shown in FIG. 4C, the light projecting section 140 may be disposed between the stage 121 and the lens unit 131 and held in the stand section 110 by a holding section 114.

Further, in this embodiment, the four regions 140A to 140D from which lights are emitted are provided in the light projecting section 140. However, the present invention is not limited to this. Three or less or five or more regions from which lights are emitted may be provided in the light projecting section 140.

In this embodiment, the plurality of light emitting members (the optical fibers 142) are disposed on one circumference centering on the optical axis A1 of the objective lens 131*a*. However, the present invention is not limited to this. The plurality of light emitting members may be disposed on two or more concentric circles centering on the optical axis A1 of the objective lens 131*a*. Further, in this embodiment, the plurality of light emitting members are disposed in each of the regions 140A to 140D. However, the present invention is not limited to this. One light emitting member may be disposed in each of the regions 140A to 140D.

In the embodiment, the light projecting section 140 is configured as a unit such that a positional relation among the plurality of light emission regions does not change. However, the present invention is not limited to this. The light projecting section 140 may be configured to be capable of changing the positional relation among the plurality of light emission regions.

(d) Lens Barrel Section

Figure 5A:
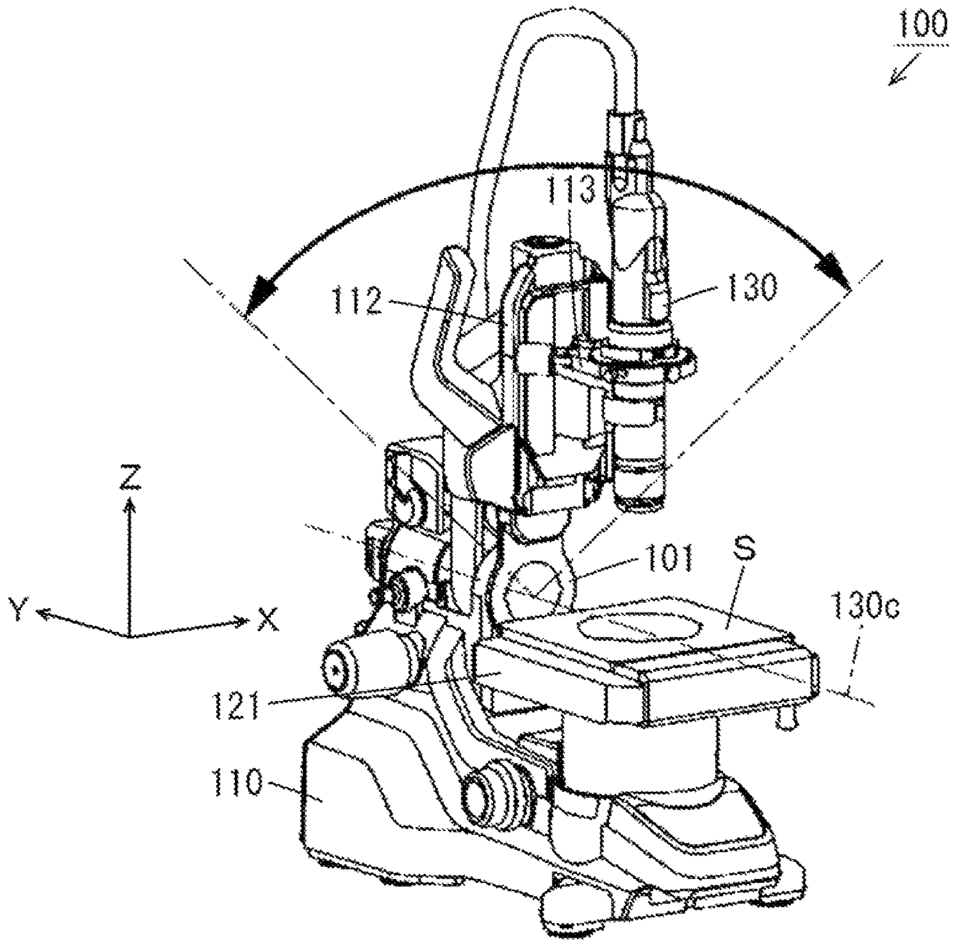
FIGS. 5A and 5B are an exterior perspective view of a measurement head and a schematic diagram showing the configuration of a lens barrel section.
Figure 5B:
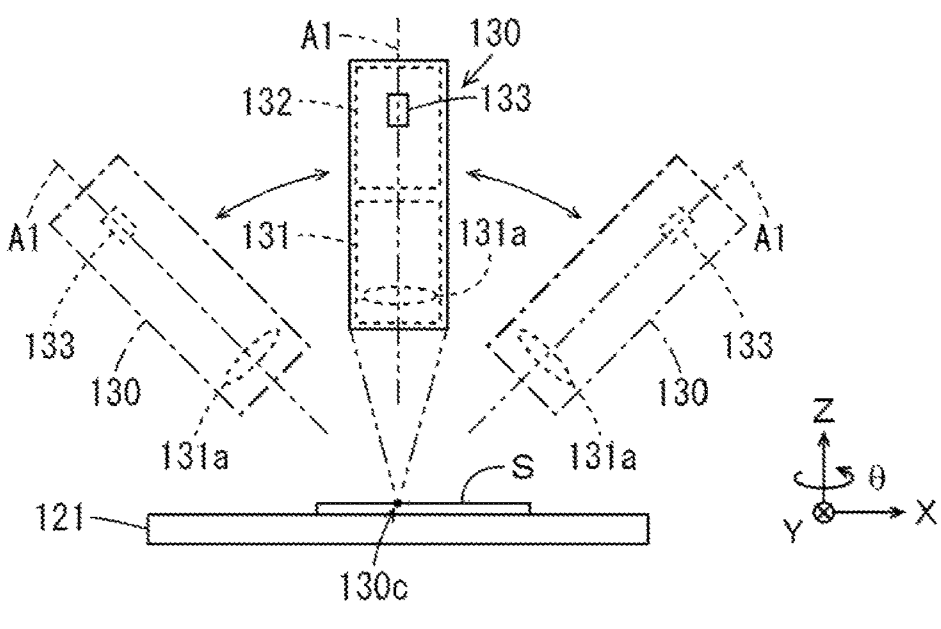

FIGS. 5A and 5B are respectively an exterior perspective views of the measurement head 100 and a schematic diagram showing the configuration of the lens barrel section 130. As shown in FIG. 5A, the measurement head 100 includes an inclining mechanism 101 for inclining the lens barrel section 130 with respect to the stage 121. The inclining mechanism 101 supports an upper part of the holding section 112 with respect to a lower part of the holding section 112 in a plane orthogonal to the Y direction. Consequently, the inclining mechanism 101 can incline the lens barrel section 130 with respect to the stage 121 around an inclination center 130*c*. In FIG. 5B, the lens barrel section 130 after the inclination is indicated by an alternate long and short dash line.

The stage 121 moves in the Z direction on the basis of control by the stage control section 540 shown in FIG. 2 such that the surface of the observation target S is located at height substantially the same as the height of the inclination center 130*c* of the lens barrel section 130. Therefore, even if the lens barrel section 130 is inclined, a eucentric relation in which a visual field of the imaging section 132 does not move is maintained. It is possible to prevent a desired observation region of the observation target S from deviating from the visual field of the imaging section 132.

As shown in FIG. 5B, the lens barrel section 130 includes the lens unit 131, the imaging section 132, and an inclination sensor 133. The imaging section 132 receives, via the lens unit 131, light from the observation target S placed on the placement surface of the stage 121 and generates original image data on the basis of control by the imaging control section 520 shown in FIG. 2.

The imaging control section 520 controls a light reception time, a gain, timing, and the like of the imaging section 132. For example, the imaging control section 520 adjusts a light reception time during irradiation of the directional illuminations on the basis of a light reception time during irradiation of the ring illumination. In this example, as explained above, the light amount of the ring illumination is approximately four times as large as the light amount of each of the directional illuminations. Therefore, the imaging control section 520 adjusts the light reception time during the irradiation of the directional illuminations to be four times as long as a light reception time during the irradiation of the ring illumination.

With this control, the imaging section 132 can generate original image data at high speed compared with when the light reception times during the irradiation of the directional illuminations are independently adjusted. The imaging section 132 can easily substantially equalize brightness of an image during the irradiation of the ring illumination and brightness of an image during the irradiation of the directional illuminations. Note that, in this example, control contents of the imaging section 132 during the irradiation of the plurality of directional illuminations are the same one another.

The imaging section 132 can generate a plurality of original image data in a state in which a light reception time is changed to a plurality of times by the imaging control section 520. The arithmetic processing section 600 shown in FIG. 2 can generate image data with an adjusted dynamic range by selectively combining the plurality of original image data generated in the state in which the light reception time of the imaging section 132 is changed to the plurality of times (DR (dynamic range) adjustment processing).

An inclination angle of the optical axis A1 of the objective lens 131*a* with respect to the Z direction (hereinafter referred to as inclination angle of the lens barrel section 130) is detected by the inclination sensor 133. An angle signal corresponding to the inclination angle is output to the control board 150 shown in FIG. 1. The control board 150 gives the angle signal output by the inclination sensor 133 to the arithmetic processing section 600 via the cable 203 and the imaging control section 520 shown in FIG. 2. The arithmetic processing section 600 calculates an inclination angle of the lens barrel section 130 on the basis of the angle signal. It is possible to cause the display section 430 shown in FIG. 1 to display the inclination angle calculated by the arithmetic processing section 600.

With the configuration explained above, it is possible to selectively perform a plane observation and an inclined observation of the observation target S placed on the placement surface of the stage 121. During the plane observation, the optical axis A1 of the objective lens 131*a* is parallel to the Z axis. That is, the inclination angle of the lens barrel section 130 is 0°. On the other hand, during the inclined observation, the optical axis A1 of the objective lens 131*a* inclines with respect to the Z direction. The user can perform observation of the observation target S in a state in which the lens barrel section 130 is detached from the stand section 110 shown in FIG. 1 and fixed by a hand or another fixing member. In the following explanation, the plane observation of the observation target S is performed.

(e) Focus Driving Section

The focus control section 530 shown in FIG. 2 controls the focus driving section 113 shown in FIG. 1 such that a focal position of light from the observation target S passed through the lens unit 131 changes in the Z direction relatively to the observation target S. Consequently, the imaging section 132 shown in FIG. 1 can generate a plurality of original image data indicating the observation target S in different positions in the Z direction.

In this processing, the user can designate a range in which the focus driving section 113 moves in the Z direction. When the moving range is designated, the focus control section 530 controls the focus driving section 113 such that a focal position of light changes in the Z direction in the designated moving range. Consequently, the imaging section 132 can generate, in a short time, the plurality of original image data indicating the observation target S in the different positions in the Z direction.

The arithmetic processing section 600 can determine a focus degree of each of pixels concerning each of the generated plurality of original image data indicating the observation target S in the different positions in the Z direction. The focus control section 530 can adjust the focus driving section 113 on the basis of a determination result of the focus degree by the arithmetic processing section 600 such that the imaging section 132 is focused on a specific portion of the observation target S (autofocus processing). Further, the arithmetic processing section 600 can generate image data focused on all portions of the observation target S by selectively combining the plurality of original image data for each of the pixels on the basis of the determination result of the focus degree (depth synthesis processing).

Figure 6:
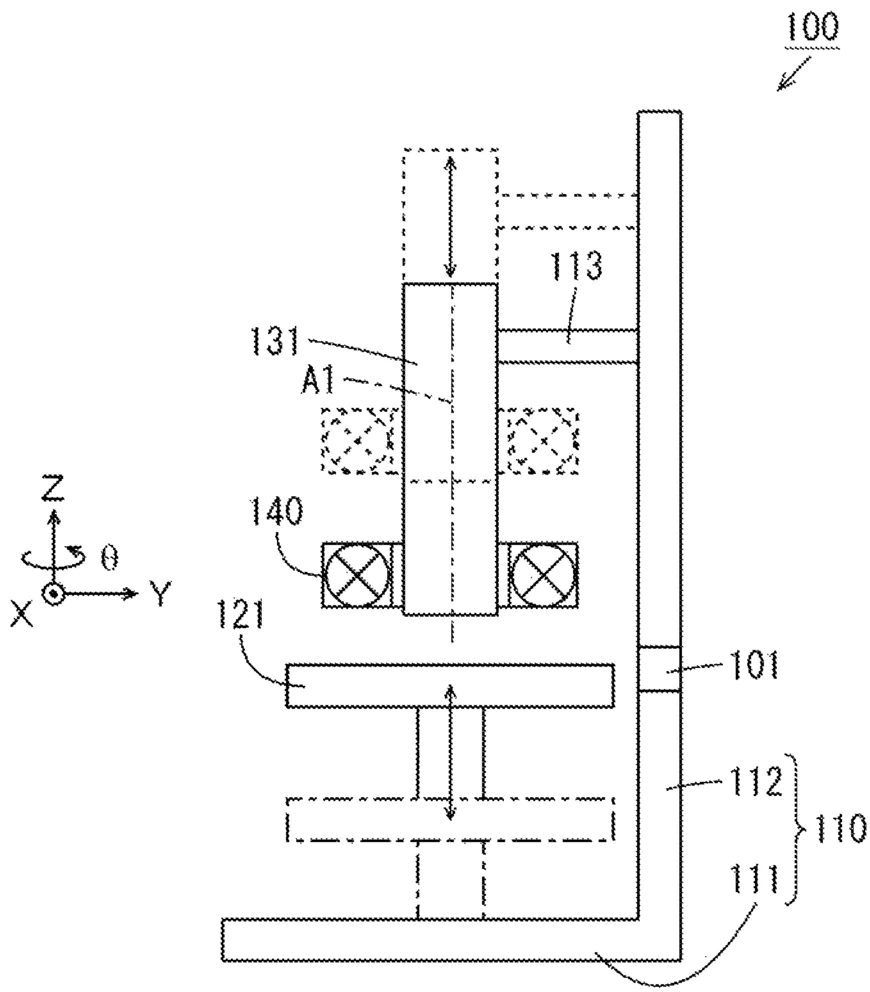
FIG. 6 is a diagram showing a configuration example of a focus driving section.

FIG. 6 is a diagram showing a configuration example of the focus driving section 113. In this embodiment, the light projecting section 140 is attached to the lens unit 131. As indicated by a dotted line in FIG. 6, the lens unit 131 is moved in the Z direction integrally with the light projecting section 140 by the focus driving section 113. As indicated by an alternate long and short dash line in FIG. 6, the stage 121 is moved in the Z direction by the stage driving section 122 shown in FIG. 1. In this way, the lens unit 131 and the light projecting section 140 and the stage 121 are capable of relatively moving in the Z direction.

When a positional relation in the Z direction among the observation target S, the lens unit 131, and the light projecting section 140 changes, an angle of elevation of a light source that irradiates illumination on the observation target S (see FIG. 10 referred to below) changes.

In the example shown in FIG. 6, the light projecting section 140 is integrally provided in the lens barrel section 130. However, the present invention is not limited to this. The light projecting section 140 may be detachably attached to the lens barrel section 130 as a unit. In this case, a positioning mechanism for maintaining an angle relation between the light projecting section 140 and the lens unit 131 in the θ direction constant is desirably provided in the lens unit 131 or the light projecting section 140.

(f) Stage Device

Figure 7A:
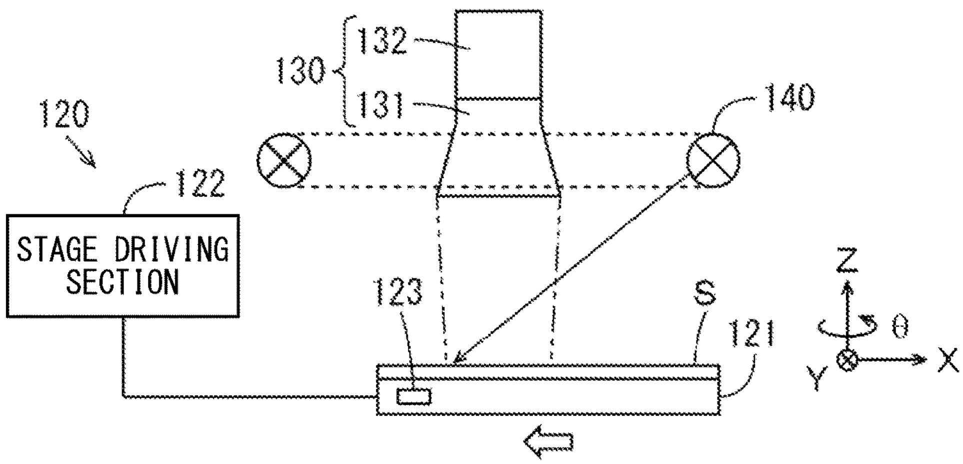
FIGS. 7A to 7C are diagrams showing the configuration of a stage device.
Figure 7B:
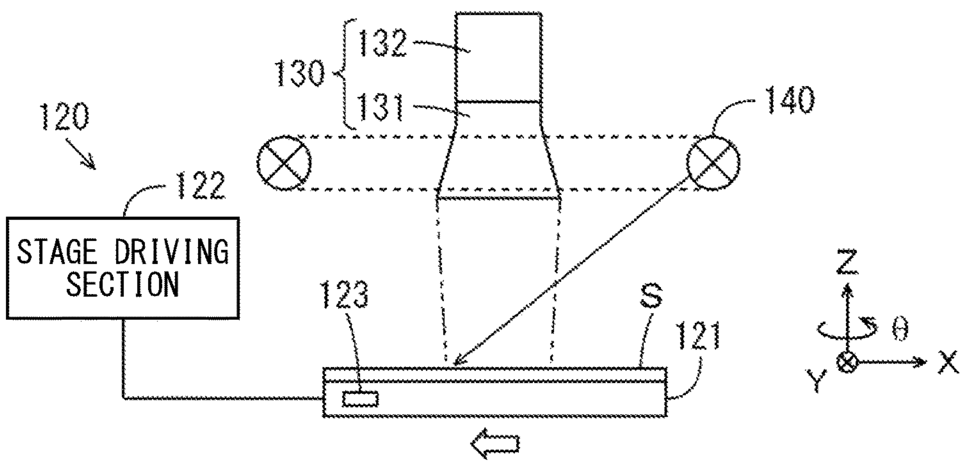
Figure 7C:
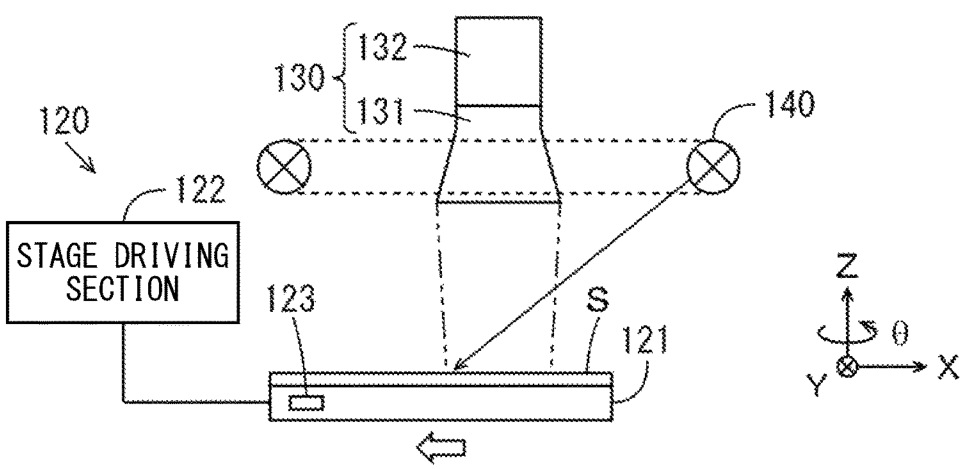

FIGS. 7A to 7C are diagrams showing the configuration of the stage device 120. As shown in FIGS. 7A to 7C, the stage device 120 includes the stage 121, the stage driving section 122, and a position sensor 123. The stage control section 540 shown in FIG. 2 controls the stage driving section 122 to move the stage 121 in the X direction, the Y direction, or the Z direction or rotate the stage 121 in the θ direction. In the example shown in FIGS. 7A to 7C, as indicated by a void arrow, the stage 121 is moved in the X direction. In the following explanation, positions in the X direction, the Y direction, and the Z direction and an angle in the θ direction of the stage 121 are simply referred to as positions of the stage 121.

The position sensor 123 includes, for example, a linear encoder or a rotary encoder and is attached to the stage 121. The position of the stage 121 is detected by the position sensor 123. A position signal indicating the position is output to the control board 150 shown in FIG. 1. The control board 150 gives the position signal output by the position sensor 123 to the arithmetic processing section 600 via the cable 203 and the stage control section 540 shown in FIG. 2. The arithmetic processing section 600 calculates a position of the stage 121 on the basis of the position signal. It is possible to cause the display section 430 shown in FIG. 1 to display the position calculated by the arithmetic processing section 600.

As explained above, the position sensor 123 is attached to the stage 121. However, the present invention is not limited to this. The position sensor 123 does not have to be attached to the stage 121. In this case, a scale indicating the position of the stage 121 may be added to the stage 121. When the arithmetic processing section 600 calculates the position of the stage 121 on the basis of the number of drive pulses from the control board 150 to the stage driving section 122 shown in FIG. 1, it is unnecessary to attach the position sensor 123 to the stage 121.

The arithmetic processing section 600 can generate image data indicating a region of the observation target S larger than a visual field (a unit region explained below) of the imaging section 132 by connecting a plurality of image data generated while the stage 121 is moved in the X direction or the Y direction (connection processing).

(g) Operation Section

Figure 8:
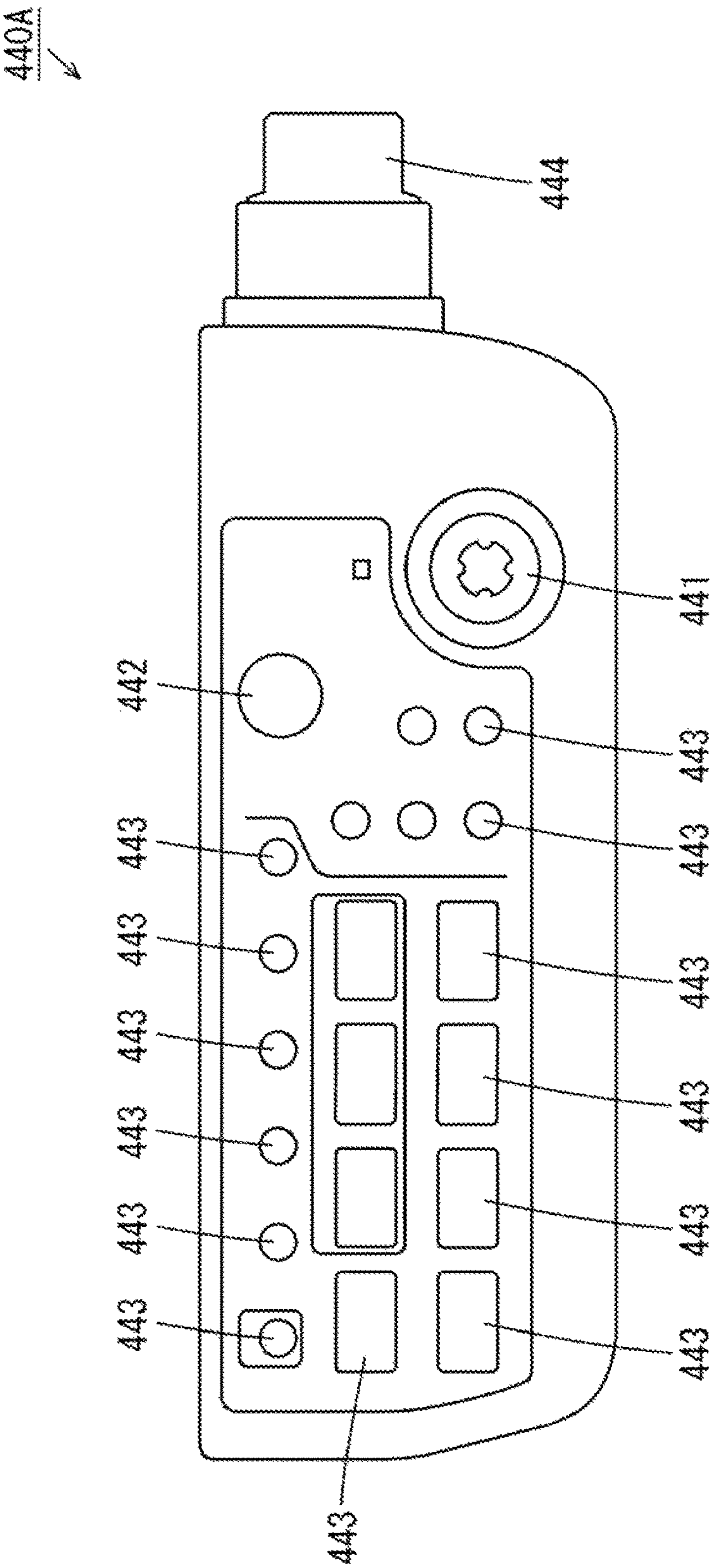
FIG. 8 is a plan view showing a dedicated console of the control device.

The operation section 440 includes a general-purpose pointing device and a general-purpose keyboard and includes a dedicated console of the control device 400 shown in FIG. 2. FIG. 8 is a plan view showing the dedicated console of the control device 400. As shown in FIG. 8, a console 440A includes a joystick 441, a dial 442, a plurality of buttons 443, and a Z-direction control dial 444. The user can move the lens barrel section 130 in the up-down direction by rotating the Z-direction control dial 444.

The user can give various instructions to the control device 400 by operating the joystick 441, the dial 442, or the plurality of buttons 443. The joystick 441 is used to give an instruction for moving the stage 121 shown in FIG. 1 in the X direction or the Y direction to the stage control section 540 shown in FIG. 2. The dial 442 is used to adjust the brightness of an image acquired by the imaging section 132.

A part of the plurality of buttons 443 is used to switch ON and OFF of emission of light from the light projecting section 140 shown in FIGS. 3A and 3B and give an instruction for switching of the regions 140A to 140D, from which lights are emitted, to the light-projection control section 510 shown in FIG. 2. Another part of the plurality of buttons 443 is used to give instructions for various kinds of processing such as the autofocus processing, the depth synthesis processing, and the connection processing explained above to the arithmetic processing section 600. The plurality of buttons 443 are also used to give an instruction for temporarily stopping update of generated original image data or an instruction for causing the storing section 420 shown in FIG. 2 to store the generated original image data to the control device 400.

The plurality of buttons 443 are also used to give instructions for causing the display section 430 shown in FIG. 2 to display the magnification of an acquired image, the inclination angle of the lens barrel section 130 shown in FIG. 5B, or the position of the stage 121 to the control device 400. Further, the control device 400 is configured to be capable of executing adjustment of the resolution of an image, adjustment of a white balance, three-dimensional display, correction of a camera shake, and the like. The plurality of buttons 443 are used to give instructions for execution of these kinds of processing to the control device 400.

(h) Arithmetic Processing Section

Figure 9:
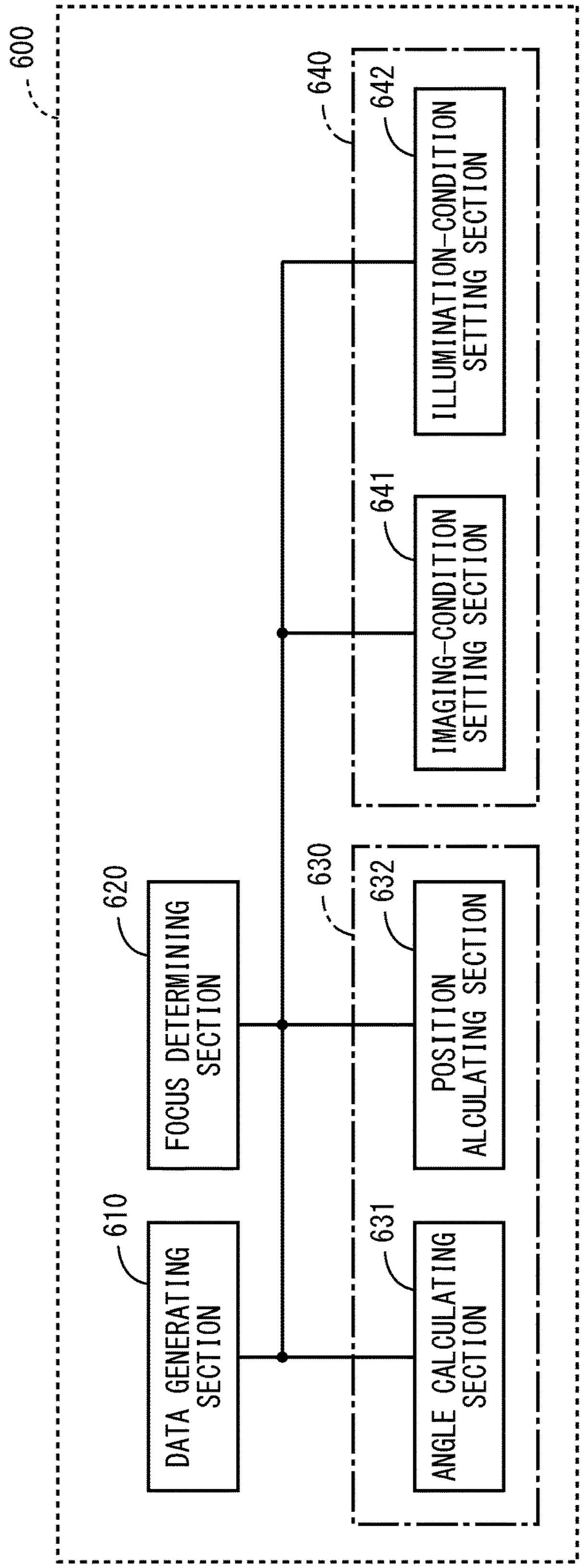
FIG. 9 is a block diagram showing the configuration of an arithmetic processing section shown in FIG. 2.

FIG. 9 is a block diagram showing the configuration of the arithmetic processing section 600 shown in FIG. 2. As shown in FIG. 9, the arithmetic processing section 600 includes a data generating section 610, a focus determining section 620, a calculating section 630, and a condition setting section 640.

The data generating section 610 generates image data for display on the basis of at least one of a plurality of original image data generated by the imaging section 132 shown in FIG. 1. The date generating section 610 performs the DR adjustment processing, the depth synthesis processing, or the connection processing on image data according to an instruction of the user.

When the focus control section 530 shown in FIG. 2 performs the autofocus processing, the focus determining section 620 determines a focus degree of each of pixels concerning each of a plurality of original image data generated according to movement in the Z direction of the focus driving section 113. When the data generating section 610 performs the depth synthesis processing, the focus determining section 620 determines a focus degree of each of pixels concerning the plurality of original image data.

The calculating section 630 includes an angle calculating section 631 and a position calculating section 632. The angle calculating section 631 calculates an inclination angle of the lens barrel section 130 shown in FIGS. 5A and 5B on the basis of an angle signal output by the inclination sensor 133 shown in FIGS. 5A and 5B. The angle calculating section 631 causes, according to an instruction of the user, the display section 430 shown in FIG. 2 to display the calculated inclination angle of the lens barrel section 130.

The position calculating section 632 calculates a position of the stage 121 shown in FIGS. 7A to 7C on the basis of a position signal output from the position sensor 123 shown in FIGS. 7A to 7C. The position calculating section 632 may calculate the position of the stage 121 on the basis of the number of drive pulses from the control board 150 to the stage driving section 122 shown in FIG. 1. The position calculating section 632 causes, according to an instruction of the user, the display section 430 shown in FIG. 2 to display the calculated position of the stage 121. Further, the position calculating section 632 causes the storing section 420 shown in FIG. 2 to store position information indicating the position of the stage 121 at the time when original image data is generated by the imaging section 132 shown in FIG. 1.

The condition setting section 640 includes an imaging-condition setting section 641 and an illumination-condition setting section 642. The imaging-condition setting section 641 sets imaging conditions according to an instruction of the user. The condition setting section 640 causes the storing section 420 shown in FIG. 2 to store imaging information indicating the set imaging conditions. The imaging conditions include, for example, a light reception time of the imaging section 132 shown in FIG. 1, presence or absence of execution of the DR adjustment processing, presence or absence of execution of the depth synthesis processing, presence or absence of execution of the connection processing, and a range of a focal position of light in the Z direction. The driving control section 500 shown in FIG. 2 controls the operations of the measurement head 100 and the light generating section 300 shown in FIG. 1 on the basis of the imaging conditions set by the imaging-condition setting section 641.

The illumination-condition setting section 642 sets illumination conditions according to an instruction of the user. The illumination-condition setting section 642 causes the storing section 420 to store illumination information corresponding to the set illumination conditions. The illumination conditions include an imaginary emitting direction of light with respect to the observation target S. The data generating section 610 generates image data for display on the basis of the illumination conditions set by the illumination-condition setting section 642 and causes the storing section 420 to store the image data for display. An instruction method for illumination conditions by the user is explained below.

(2) Basic Operation of the Magnifying Observation Apparatus (a) Content of the Basic Operation A position where the optical axis A1 of the objective lens 131*a* crosses on the placement surface of the stage 121 is referred to as reference point. The observation target S is placed on the stage 121 such that an observation target portion is located on the reference point. In this state, the position in the Z direction of the lens unit 131 (FIG. 1) is adjusted such that the objective lens 131*a* is focused on at least a part of the observation target S. The stage 121 is adjusted in the X direction and the Y direction such that a desired portion of the observation target S can be observed. Further, imaging conditions such as a light reception time and a white balance of the imaging section 132 are adjusted.

In the following explanation, in order to distinguish the four directional illuminations, lights emitted from the respective regions 140A, 140B, 140C, and 140D of the light projecting section 140 are respectively referred to as first directional illumination, second directional illumination, third directional illumination, and fourth directional illumination. In the following explanation, a traveling direction of a ray obtained when a plurality of rays forming the ring illumination are combined in terms of a vector is referred to as ring emitting direction. The ring emitting direction is a direction perpendicular to the placement surface of the stage 121. A traveling direction of a ray obtained when a plurality of rays forming the first directional illumination are combined in terms of a vector is referred to as first emitting direction. A ray obtained when a plurality of rays forming the second directional illumination are combined in terms of a vector is referred to as second emitting direction. Further, a traveling direction of a ray obtained when a plurality of rays forming the third directional illumination are combined in terms of a vector is referred to as third emitting direction. A traveling direction of a ray obtained when a plurality of rays forming the fourth directional illumination are combined in terms of a vector is referred to as fourth emitting direction.

Figure 10:
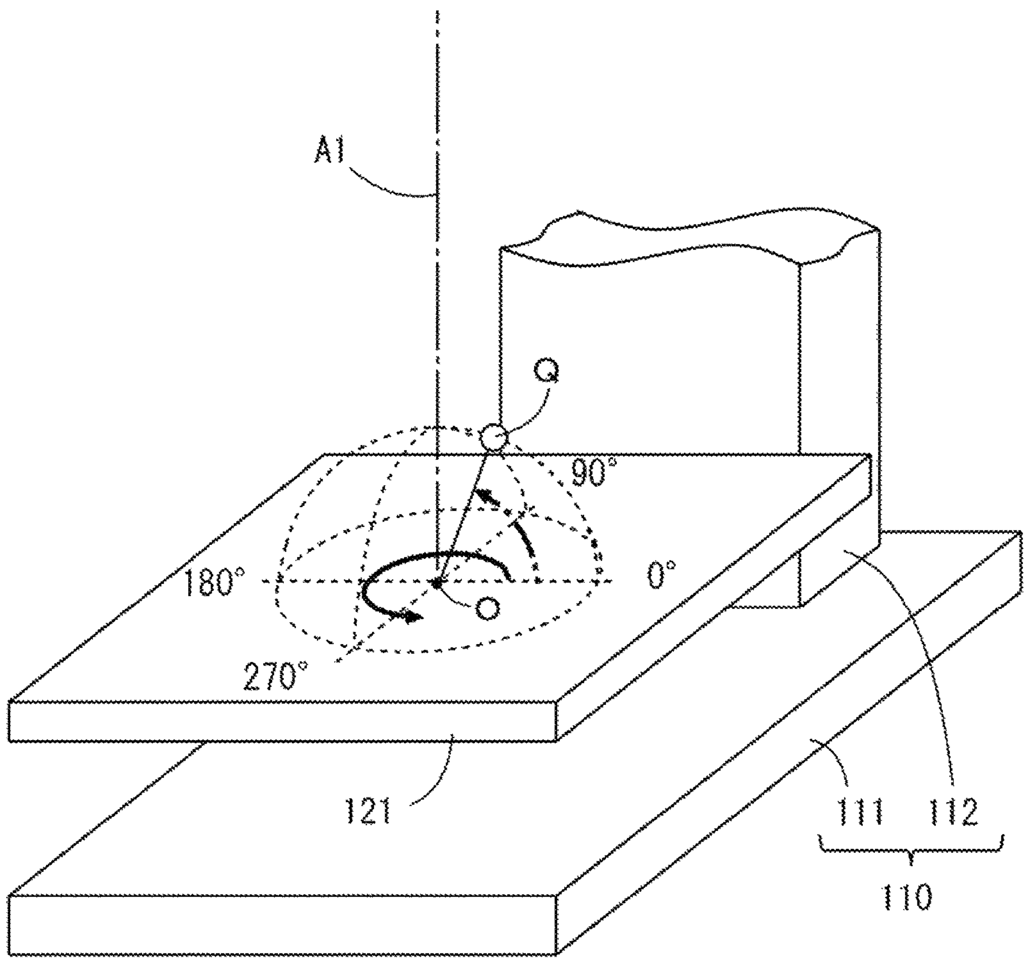
FIG. 10 is a diagram showing a polar coordinate system defined on a placement surface of a stage.

A polar coordinate system having the reference point as the origin is defined on the placement surface of the stage 121 such that it is possible to specify an emitting direction or an emitting position of light at the time when the light is irradiated on the observation target S placed on the reference point. FIG. 10 is a diagram showing the polar coordinate system defined on the placement surface of the stage 121. As shown in FIG. 10, the reference point on the placement surface of the stage 121 is defined as an origin O. As indicated by a thick solid line in FIG. 10, an azimuth angle is defined in a direction counterclockwise around the origin O in a state in which the placement surface of the stage 121 is viewed from above. In this example, a direction from the origin O to one side of the magnifying observation apparatus 1 is defined as a reference angle (0°) of the azimuth angle.

A point Q is assumed in any position on the placement surface or above the placement surface. In this case, as indicated by a thick alternate long and short dash line in FIG. 10, an angle between a straight line connecting the point Q and the origin O and the placement surface is defined as an angle of elevation of the point Q. When the point Q is present on the placement surface, the angle of elevation of the point Q is 0°. When the point Q is present above the placement surface and on the optical axis A1, the angle of elevation of the point Q is 90°. In FIG. 10, the azimuth angle on the placement surface of the stage 121 is shown at every 90°. In the following explanation, when any position above the placement surface of the stage 121, a direction of light irradiated on the observation target S, or the like is explained, the "angle of elevation" and the "azimuth angle" defined as explained above are used as appropriate.

In this example, center portions of the regions 140A, 140B, 140C, and 140D of the light projecting section 140 are respectively disposed at azimuth angles of 45°, 135°, 225°, and 315° around the optical axis A1. Note that the disposition of the light projecting section 140 is not limited to the example explained above. For example, the center portions of the regions 140A, 140B, 140C, and 140D may be respectively disposed at azimuth angles of 0°, 90°, 180°, and 270° around the optical axis A1. Sequentially imaging the observation target S using the ring illumination and the first to fourth directional illuminations is referred to as plural illumination imaging.

The components of the magnifying observation apparatus 1 perform the following basic operations in response to instruction for the plural illumination imaging. FIGS. 11A to 11J are schematic diagrams for explaining a basic operation of the magnifying observation apparatus 1 at the time when the plural illumination imaging is instructed. In FIGS. 11A to 11E, changes in illumination irradiated on the observation target S are shown in time series. In FIGS. 11A to 11E, a region of the light projecting section 140 that emits light is indicated by a thick solid line. The ring emitting direction and the first to fourth emitting directions are respectively indicated by thick solid line arrows. In FIGS. 11F to 11J, an image SI of the observation target S at the time when the illuminations shown in FIGS. 11A to 11E are irradiated on the observation target S is shown. In the following explanation, a display portion of the observation target S in an image in which the observation target S is displayed is referred to as target partial image sp.

Figure 11A:
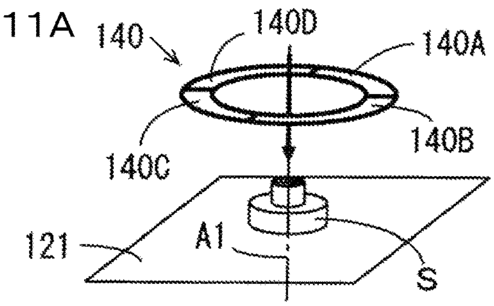
FIGS. 11A to 11J are schematic diagrams for explaining a basic operation of the magnifying observation apparatus at the time when plural illumination imaging is designated.
Figure 11F:
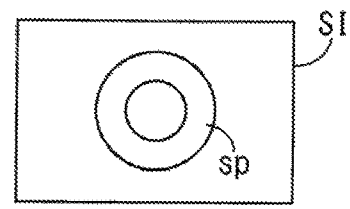

As shown in FIG. 11A, first, the ring illumination is irradiated on the observation target S and the observation target S is imaged. In this case, the first to fourth directional illuminations are simultaneously and uniformly irradiated on portions of the observation target S from all of the regions 140A to 140D surrounding the optical axis A1 of the objective lens 131*a*. Consequently, as shown in FIG. 11F, in the image SI of the observation target S imaged by the ring illumination, shadows due to the shape of the observation target S hardly occur in the target partial image sp. Therefore, it is possible to substantially entirely observe a surface state of a portion facing upward in the observation target S.

Figure 11B:
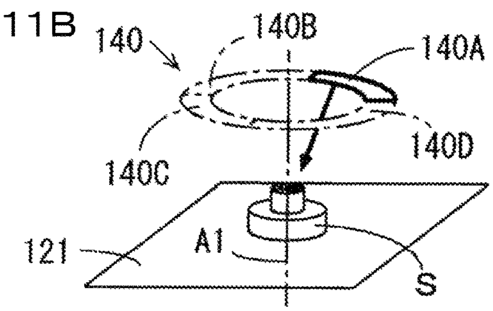
Figure 11G:
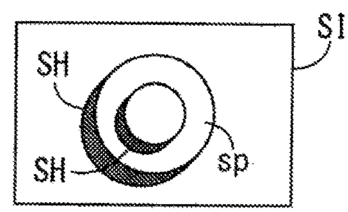

Subsequently, as shown in FIG. 11B, only the first directional illumination is irradiated on the observation target S. The observation target S is imaged. As shown in FIG. 11G, in the image SI of the observation target S imaged by the first directional illumination, shadows SH in the first emitting direction and in a direction from a position of the azimuth angle of 45° to a position of the azimuth angle of 225° corresponding to the shape of the observation target S occur in a part of the target partial image sp. Consequently, an uneven portion in the observation target S is strongly emphasized in the first emitting direction.

Figure 11C:
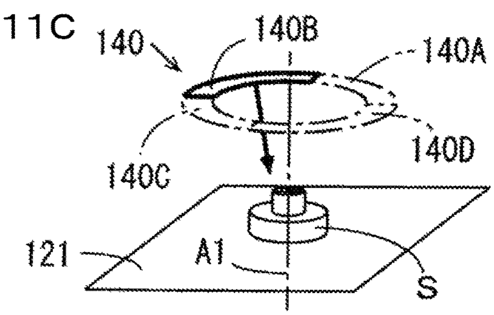
Figure 11H:
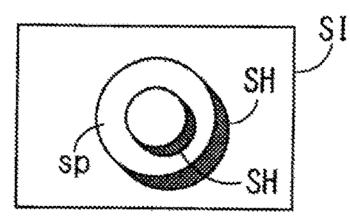

Subsequently, as shown in FIG. 11C, only the second directional illumination is irradiated on the observation target S. The observation target S is imaged. As shown in FIG. 11H, in the image SI of the observation target S imaged by the second directional illumination, the shadows SH in the second emitting direction and in a direction from a position of the azimuth angle of 135° to a position of the azimuth angle of 315° corresponding to the unevenness of the observation target S occur in a part of the target partial image sp. Consequently, the uneven portion in the observation target S is strongly emphasized in the second emitting direction.

Figure 11D:
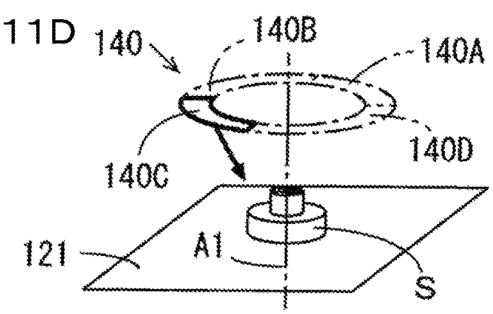
Figure 11I:
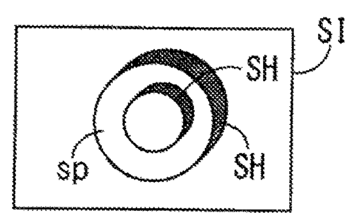

Subsequently, as shown in FIG. 11D, only the third directional illumination is irradiated on the observation target S. The observation target S is imaged. As shown in FIG. 11I, in the image SI of the observation target S imaged by the third directional illumination, the shadows SH in the third emitting direction and in a direction from a position of the azimuth angle of 225° to a position of the azimuth angle of 45° corresponding to the unevenness of the observation target S occur in a part of the target partial image sp. Consequently, the uneven portion in the observation target S is strongly emphasized in the third emitting direction.

Figure 11E:
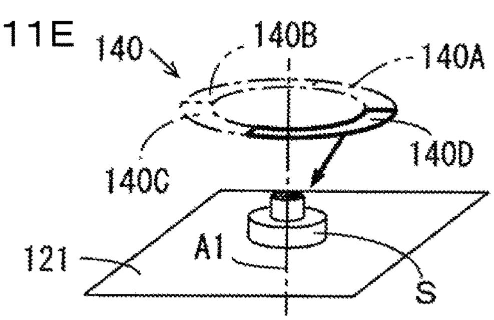
Figure 11J:
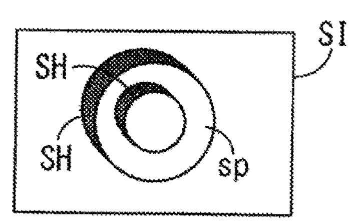

Subsequently, as shown in FIG. 11E, only the fourth directional illumination is irradiated on the observation target S. The observation target S is imaged. As shown in FIG. 11J, in the image SI of the observation target S imaged by the fourth directional illumination, the shadows SH in the fourth emitting direction and in a direction from a position of the azimuth angle of 315° to a position of the azimuth angle of 135° corresponding to the unevenness of the observation target S occur in a part of the target partial image sp. Consequently, the uneven portion in the observation target S is strongly emphasized in the fourth emitting direction.

When a plurality of original image data are respectively stored in the storing section 420, a part of pixel data is curtailed from the original image data, whereby thumbnail image data corresponding to the original image data are generated. The generated thumbnail image data are stored in the storing section 420.

The series of operation explained above is automatically performed by the control section 410 shown in FIG. 1 executing the system program stored in the storing section 420. However, the series of operation may be manually performed on the basis of operation by the user.

Figure 12:
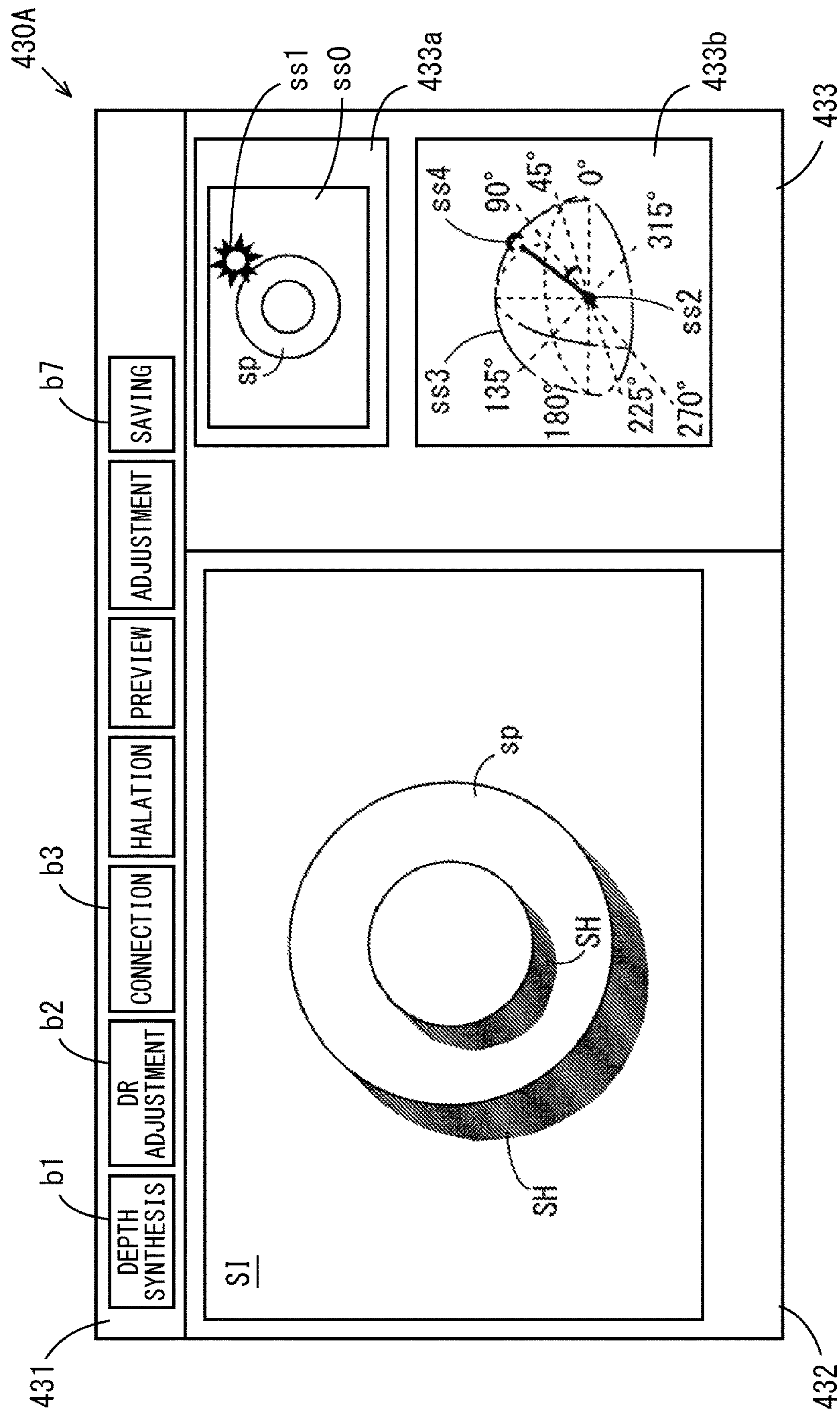
FIG. 12 is a diagram showing a display example of an observation screen.

When the plural illumination imaging is completed, an observation screen is displayed on the display section 430 shown in FIG. 1. FIG. 12 is a diagram showing a display example of the observation screen. As shown in FIG. 12, a function display region 431 is set in an upper part of an observation screen 430A. In the function display region 431, a depth synthesis button b1, a DR adjustment button b2, a connection button b3, and a saving button b7 are displayed.

The user can operate the buttons displayed in the function display region 431 using the console 440A shown in FIG. 8. Contents of the processing executed according to the operation of each of the depth synthesis button b1, the DR adjustment button b2, the connection button b3, and the saving button b7 are explained below.

As shown in FIG. 12, a main display region 432 and a sub-display region 433 are set to be arranged side by side on the left and the right below the function display region 431. The main display region 432 has a large area compared with the function display region 431 and the sub-display region 433. In an initial state, any one of a plurality of images SI based on a plurality of original image data generated by the immediately preceding plural illumination imaging is displayed over substantially the entire main display region 432. In this example, the image SI (see FIGS. 11B and 11G) of the observation target S at the time when the first directional illumination is irradiated is displayed in the main display region 432.

In the sub-display region 433, an emitting-direction designation field 433*a* and an emitting-direction display field 433*b* are displayed. In the emitting-direction designation field 433*a*, a target position image ss0 indicating the position of the observation target S on the placement surface is displayed. A light icon ss1 indicating an emitting position of light with respect to the observation target S at the time when the observation target S is viewed from a position above the light projecting section 140 is superimposed and displayed on the target position image ss0.

In this case, a relative positional relation between the target portion image sp of the observation target S and the light icon ss1 on the target position image ss0 corresponds to an emitting direction of light that should be irradiated on the observation target S in order to obtain the image SI displayed in the main display region 432 (hereinafter referred to as imaginary emitting direction of light). As the target position image ss0, for example, a thumbnail image corresponding to the ring illumination can be used.

By operating the console 440A shown in FIG. 8 to thereby move the light icon ss1 shown in FIG. 12 relatively to the target partial image sp of the observation target S on the target position image ss0, the user can easily designate the imaginary emitting direction of light while grasping an imaginary emitting position of light.

The imaginary emitting direction of light is designated by the user, whereby the image SI of the observation target S displayed in the main display region 432 is updated to the image SI of the observation target S that should be obtained when it is assumed that light in a designated emitting direction is irradiated on the observation target S. The update processing of the image SI is executed by the data generating section 610 shown in FIG. 9.

In the emitting-direction display field 433*b*, an image indicating the reference point on the placement surface is displayed as a reference point image ss2 and an image of an imaginary hemisphere covering the reference point on the stage 121 is stereoscopically displayed as a hemispherical image ss3. On the hemispherical image ss3, an image indicating an emitting direction of light corresponding to an imaginary emitting direction of light designated by the light icon ss1 is displayed as an emitting position image ss4.

Further, a straight line is displayed to connect the emitting position image ss4 and the reference point image ss2 on the hemispherical image ss3. In this case, a direction from the emitting position image ss4 to the reference point image ss2 on the straight line indicates the emitting direction of light designated by the light icon ss1. The user can easily and accurately recognize the virtual emitting direction of light designated by the light icon ss1 by visually recognizing the reference point image ss2, the hemispherical image ss3, and the emitting position image ss4 displayed in the emitting-direction display field 433*b*.

The magnifying observation apparatus 1 may be configured to be capable of selecting only a part of the ring illumination and the first to fourth directional illuminations as illumination used for the plural illumination imaging. When the plural illumination imaging is performed using only a part of the ring illumination and the first to fourth directional illuminations, a range of an emitting direction that can be designated by the light icon ss1 is sometimes limited.

In this case, in the hemispherical image ss3, the range of the emitting direction that can be designated by the light icon ss1 in the emitting-direction designation field 433*a* may be displayed to be distinguishable from a range of an emitting direction that cannot be designated. For example, when the range of the emitting direction that can be designated is limited to a range of a specific azimuth angle, a display form such as a color may be differentiated between a portion corresponding to a range of an azimuth angle that can be designated and a portion corresponding to a range of an azimuth angle that cannot be designated. Consequently, the user can easily recognize the range of the emitting direction that can be designated by the light icon ss1. Alternatively, in the hemispherical image ss3, instead of the example explained above, only the range of the emitting direction that can be designated by the light icon ss1 may be displayed.

In this example, in the emitting-direction display field 433*b*, the imaginary hemisphere covering the reference point is stereoscopically displayed as the hemispherical image ss3. However, the present invention is not limited to this. In the emitting-direction display field 433*b*, a plane hemispherical image obtained by viewing, from above, the imaginary hemisphere covering the reference point and a side hemispherical image obtained by viewing the imaginary hemisphere from one side may be displayed. In this case, the reference point image ss2 and the emitting position image ss4 may be displayed on the plane hemispherical image. The reference point image ss2 and the emitting position image ss4 may be displayed on the side hemispherical image.

Figure 13A:
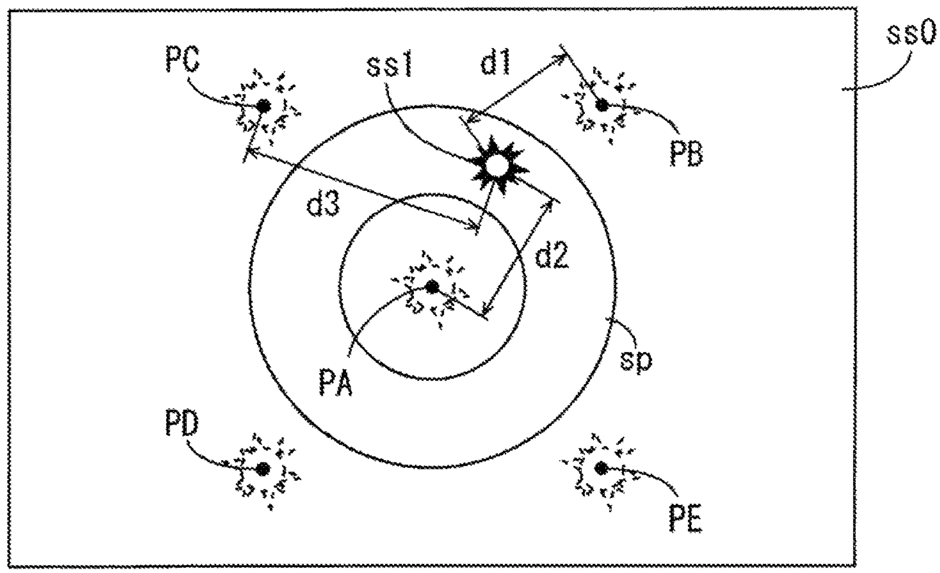
FIGS. 13A to 13C are schematic diagrams for explaining processing content at the time when an image of an observation target is updated in response to designation of an imaginary emitting direction of light.
Figure 13B:
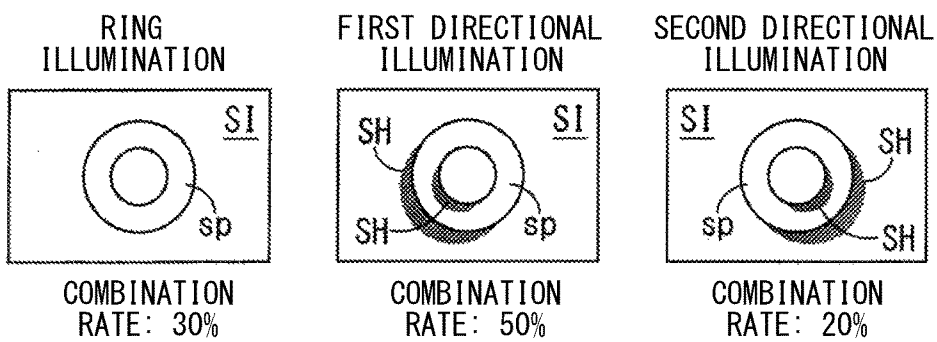
Figure 13C:
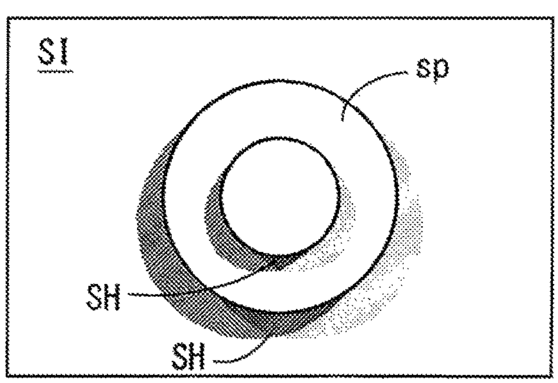

FIGS. 13A to 13C are schematic diagrams for explaining processing content at the time when the image SI of the observation target S is updated in response to the designation of the imaginary emitting direction of light.

In the magnifying observation apparatus 1, a plane coordinate system decided in advance concerning the target position images ss0 displayed in the sub-display region 433 shown in FIG. 12 is defined. Further, as shown in FIG. 13A, on the target position image ss0 shown in FIG. 12, points PA, PB, PC, PD, and PE indicating emitting positions of the ring illumination and lights respectively corresponding to the first, second, third, and fourth emitting directions are set in advance.

Positions of the points PA to PE are set, for example, on the basis of a relative positional relation between the light projecting section 140 and the stage 121. In this example, the point PA is located in the center of the target position image ss0. The points PB, PC, PD, and PE are arranged at equal angle intervals on a concentric circle centering on the point PA.

The control section 410 detects a position (a coordinate) on the target position image ss0 of the light icon ss1 at a cycle decided in advance and causes the display section 430 to display, in the main display region 432 shown in FIG. 12, the image SI of the observation target S corresponding to the position of the light icon ss1.

For example, the control section 410 causes the display section 430 to display, in the main display region 432 shown in FIG. 12, the image SI shown in FIG. 11F corresponding to the ring emitting direction when the light icon ss1 is located on the point PA shown in FIG. 13A. The control section 410 causes the display section 430 to display, in the main display region 432 shown in FIG. 12, the image SI shown in FIG. 11G corresponding to the first emitting direction when the light icon ss1 is located on the point PB shown in FIG. 13A. The control section 410 causes the display section 430 to display, in the main display region 432 shown in FIG. 12, the image SI shown in FIG. 11H corresponding to the second emitting direction when the light icon ss1 is located on the point PC shown in FIG. 13A. Further, the control section 410 causes the display section 430 to display, in the main display region 432 shown in FIG. 12, the image SI shown in FIG. 11I corresponding to the third emitting direction when the light icon ss1 is located on the point PD shown in FIG. 13A. The control section 410 causes the display section 430 to display, in the main display region 432 shown in FIG. 12, the image SI shown in FIG. 11J corresponding to the fourth emitting direction when the light icon ss1 is located on the point PE shown in FIG. 13A.

When the light icon ss1 is present in a position different from the points PA to PE, the control section 410 generates, according to a procedure explained below, the image SI of the observation target S that the control section 410 should cause the main display region 432 to display.

As shown in FIG. 13A, when the light icon ss1 is present in a position different from the points PA to PE, the control section 410 calculates distances between the points PA to PE and the light icon ss1. The control section 410 extracts the number of points decided in advance (in this example, three points) out of the plurality of points PA to PE in an ascending order of the calculated distances. In the example shown in FIG. 13A, a distance d1 between the light icon ss1 and the point PB is the shortest. A distance d2 between the light icon ss1 and the point PA is the second shortest. A distance d3 between the light icon ss1 and the point PC is the third shortest. Therefore, the control section 410 extracts the points PA, PB, and PC.

Subsequently, the control section 410 determines, on the basis of the distances d1, d2, and d3, combination rates of original image data corresponding to the point PA, original image data corresponding to the point PB, and original image data corresponding to the point PC.

The combination rates are, for example, ratios of inverses of values of the distances d1, d2, and d3. In this case, the combination rate is higher in original image data corresponding to a point, the distance to which from the light icon ss1 is shorter, and is lower in original image data corresponding to a point, the distance to which from the light icon ss1 is longer. In the example shown in FIG. 13B, the combination rates of the original image data corresponding to the point PA, the original image data corresponding to the point PB, and the original image data corresponding to the point PC are respectively determined as 30%, 50%, and 20%.

The control section 410 combines the three original image data respectively corresponding to the points PA, PB, and PC on the basis of the determined combination rates. Specifically, the control section 410 multiplies, for each of the original image data, value (pixel values) of all pixel data of the original image data with the combination rate and combines the three original image data after the multiplication to thereby generate image data for display. Thereafter, the control section 410 causes the display section 430 to display, in the main display region 432 shown in FIG. 12, the image SI based on the generated image data for display.

In FIG. 13C, an example of the image SI displayed in the main display region 432 according to the position of the light icon ss1 shown in FIG. 13A is shown. In the image SI shown in FIG. 13C, the three original image data respectively corresponding to the points PA, PB, and PC are combined, whereby the uneven portion in the observation target S is strongly emphasized in the imaginary emitting direction of light designated by the light icon ss1 shown in FIG. 13A.

As explained above, after the completion of the plural illumination imaging, the image data of the image SI displayed in the main display region 432 is generated on the basis of the generated plurality of original image data and the imaginary emitting direction of light designated by the user. Therefore, even if the imaginary emitting direction of light designated by the user continuously changes, a plurality of image data corresponding to the designated emitting direction are substantially continuously generated at speed corresponding to a processing ability of the control section 410. The image SI based on the generated plurality of image data is continuously displayed. Therefore, a video substantially the same as a video (a moving image) obtained by continuously performing imaging while changing the position of illumination is simulatively reproduced on the main display region 432. Consequently, the user visually recognizes the image SI on the main display region 432 while designating the imaginary emitting direction of light to thereby feel as if the light in the designated emitting direction is irradiated on the observation target S on a real time basis.

In the example explained above, the control section 410 extracts the three points among the points PA to PE corresponding to the ring illumination and the first to fourth directional illuminations and determines the combination rates of the three original image data corresponding to the extracted three points. However, the present invention is not limited to this. The control section 410 may determine combination rates concerning five original image data respectively corresponding to all the points PA to PE and combine the five original image data on the basis of the determined combination rates.

Note that, on the observation screen 430A shown in FIG. 12, a combination-rate input field in which combination rates concerning a plurality of original image data obtained by plural illumination imaging can be input by the console 440A shown in FIG. 8 may be displayed. In this case, the control section 410 may combine a part or all of the plurality of original image data on the basis of values input to the combination-rate input field by the user.

Figure 14:
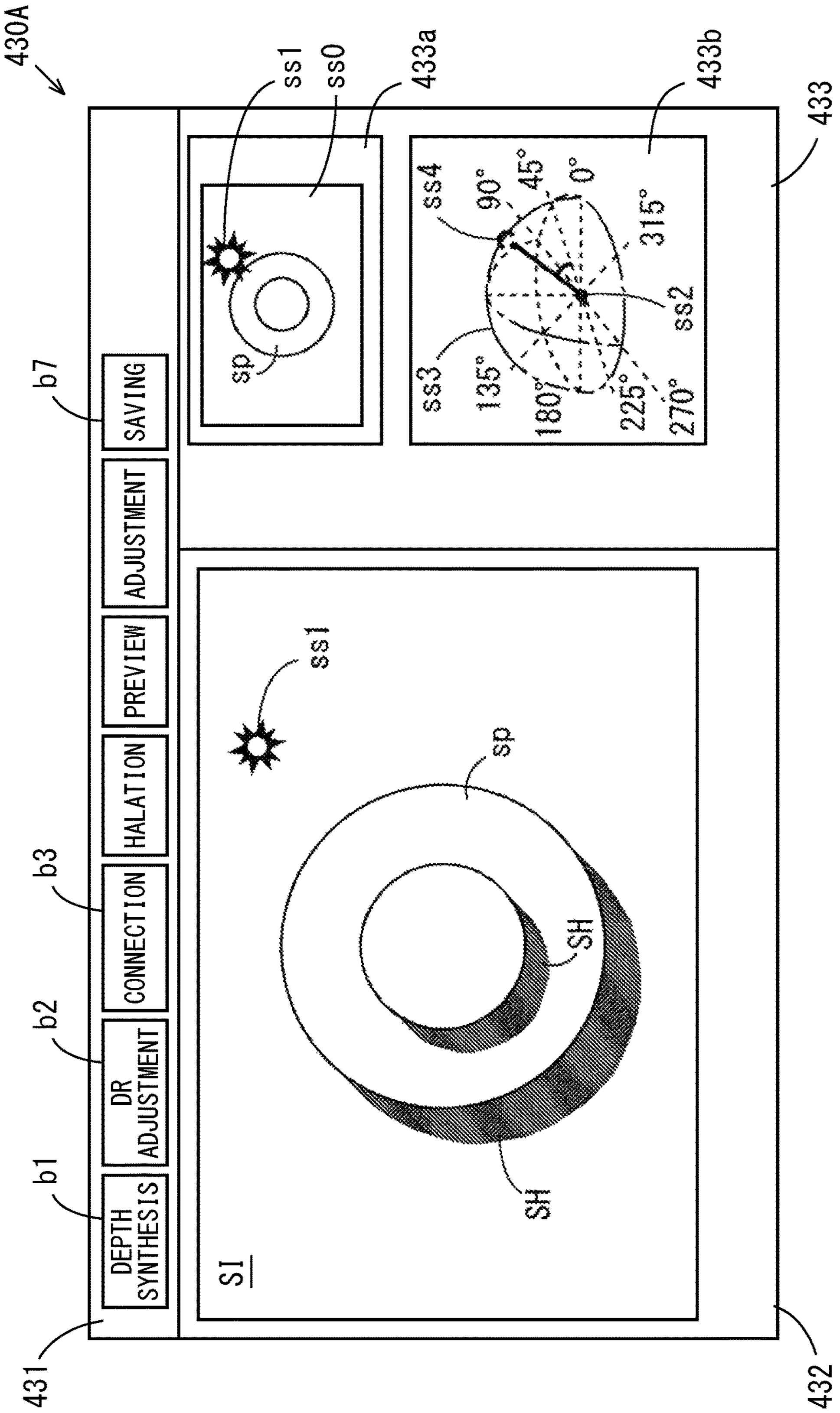
FIG. 14 is a diagram showing an example in which light icons are respectively displayed in a main display region and a sub-display region.

On the observation screen 430A shown in FIG. 12, the light icon ss1 is superimposed and displayed on the target position image ss0 displayed in the sub-display region 433. In this embodiment, in addition to the light icon ss1 on the target position image ss0, the light icon ss1 may also be superimposed and displayed on the image SI displayed in the main display region 432. FIG. 14 is a diagram showing an example in which the light icons ss1 are respectively displayed in the main display region 432 and the sub-display region 433.

In this case, the points PA to PE are set on the image SI of the observation target S as well. The user can move, on the observation screen 430A, using, for example, the console 440A shown in FIG. 8, one of the light icon ss1 on the image SI of the observation target S and the light icon ss1 on the target position image ss0.

When the light icon ss1 on the target position image ss0 is moved, the control section 410 generates image data for display in a procedure same as the procedure in the example explained with reference to FIGS. 13A to 13C above and displays the image SI based on the generated image data for display in the main display region 432. At this point, the control section 410 adjusts the position of the light icon ss1 on the image SI to move the light icon ss1 to a position corresponding to the position of the light icon ss1 on the target position image ss0.

When the light icon ss1 on the image SI of the observation target S is moved, the control section 410 generates image data for display on the basis of a positional relation between the position of the light icon ss1 on the image SI and the points PA to PE set in the image SI and displays the image SI based on the generated image data for display in the main display region 432. At this point, the control section 410 adjusts the position of the light icon ss1 on the target position image ss0 to move the light icon ss1 to a position corresponding to the position of the light icon ss1 on the image SI.

According to the example shown in FIG. 14, the user can designate an imaginary emitting direction of light using a desired light icon ss1 of the two light icons ss1. Note that, in the example shown in FIG. 14, the two light icons ss1 do not always have to be simultaneously displayed. For example, when the various buttons, the light icon ss1, and the like displayed on the observation screen 430A are operated by a pointer, only one light icon ss1 of the two light icons ss1 may be displayed on the observation screen 430A according to the position of the pointer on the observation screen 430A. Specifically, when a mouse pointer is located on the main display region 432, only the light icon ss1 on the image SI of the observation target S may be displayed. The light icon ss1 on the target position image ss0 does not have to be displayed. When the mouse pointer is located on the sub-display region 433, only the light icon ss1 on the target position image ss0 may be displayed. The light icon ss1 on the image SI of the observation target S does not have to be displayed.

Note that the light icon ss1 on the target position image ss0 may be displayed irrespective of the position of the mouse pointer. Consequently, the user can easily grasp an imaginary emitting position of light.

The user can move the light icon ss1 by moving the mouse pointer in the main display region 432 and designate the imaginary emitting position of light. Consequently, the user can continuously change the designation of the imaginary emitting position of light by moving the mouse pointer in the main display region 432. Note that, when the designation of the imaginary emitting position of light is enabled in the main display region 432, the designation of the imaginary emitting position of light may be unable to be changed even if the mouse pointer is moved on the inside of the emitting-direction designation field 433*a*.

The light icon ss1 may be disposed in the emitting-direction display field 433*b*. In this case, the light icon ss1 displayed in the emitting-direction display field 433*b* is an icon for stereoscopically showing the imaginary emitting position of light to the user. The light icon ss1 displayed in the emitting-direction display field 433*b* may be able to be operated by the mouse pointer or may be unable to be operated by the mouse pointer as the icon for stereoscopically showing the imaginary emitting position of light. A numerical-value display section that displays the imaginary emitting position of light in terms of a numerical value using an angle of elevation and an azimuth angle may be further provided.

Further, as explained above, a plurality of light icons ss1 simultaneously displayed in a plurality of regions on the observation screen 430A may move in association with one another. When the imaginary emitting position of light is changed by operating the light icon ss1 displayed in the main display region 432 with the mouse pointer, the light icon ss1 displayed in the emitting-direction designation field 433*a* and the emitting-direction display field 433*b* may move in association with the movements of the mouse pointer and the light icon ss1 displayed in the main display region 432. In this way, in the main display region 432 in which a two-dimensional observation image is displayed, it is also possible to designate the angle of elevation and the azimuth angle by designating the imaginary emitting position of light. By operating the light icon ss1 in the main display region 432, the display of the imaginary emitting position of light in the emitting-direction display field 433*b* moves in association with the operation of the light icon ss1. Illumination at the time when it is assumed that light is irradiated from a position having the angle of elevation is irradiated on the observation target S.

In the emitting-direction display field 443*b*, a hemispherical schematic diagram indicating the imaginary emitting position of light and the angle of elevation and the azimuth angle is displayed to make it easy to understand the imaginary emitting position of light and the angle of elevation and the azimuth angle.

A specific example is explained concerning a change in the observation screen 430A at the time when an imaginary emitting direction of light is designated by the light icon ss1 in a state in which the observation screen 430A shown in FIG. 12 is displayed on the display section 430.

Figure 15:
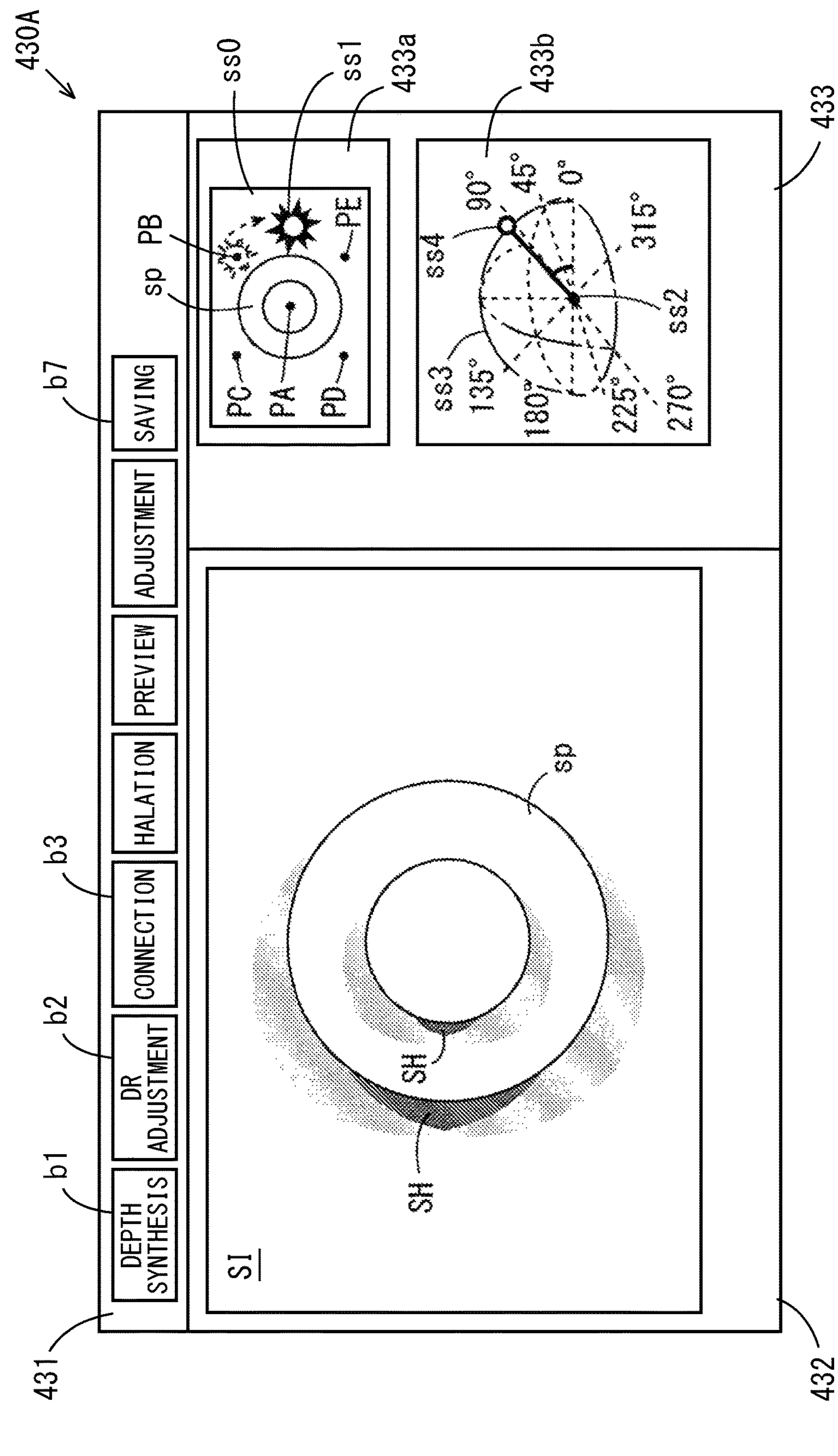
FIG. 15 is a diagram showing another display example of the observation screen.

FIG. 15 is a diagram showing another display example of the observation screen 430A. In FIG. 15, in order to facilitate understanding of the following explanation, the five points PA to PE shown in FIG. 13A are shown on the target position image ss0 displayed in the emitting-direction designation field 433*a*.

As indicated by a dotted line in the emitting-direction designation field 433*a* shown in FIG. 15, for example, the light icon ss1 is moved from the position of the point PB to the position between the points PB and PE on a concentric circle centering on the point PA on which the points PB to PE are arranged. In this case, the control section 410 generates image data for display by combining a part of the plurality of original image data respectively corresponding to the points PA to PE as in the example explained above. The control section 410 causes the display section 430 to display, in the main display region 432, the image SI of the observation target S based on the generated image data for display.

In the image SI displayed in the main display region 432 shown in FIG. 15, the uneven portion in the observation target S is strongly emphasized in an imaginary emitting direction of light designated by the light icon ss1 in the emitting-direction designation field 433*a*.

The imaginary emitting direction of light includes components of an azimuth angle and an angle of elevation. In this example, the light icon ss1 is moved on the concentric circle centering on the point PA on which the points PB to PE are arranged. The user can designate an azimuth angle of the imaginary emitting direction of light by moving the light icon ss1 on the target position image ss0 to rotate with respect to the center of the target position image ss0. Consequently, the azimuth angle of the imaginary emitting direction of light is changed to the azimuth angle designated by the light icon ss1. In this way, the user can designate the azimuth angle of the imaginary emitting direction of light in a desired direction by operating the light icon ss1. As a result, in the image SI displayed in the main display region 432, the user can easily change a direction in which the uneven portion in the observation target S is emphasized to the θ direction.

Figure 16:
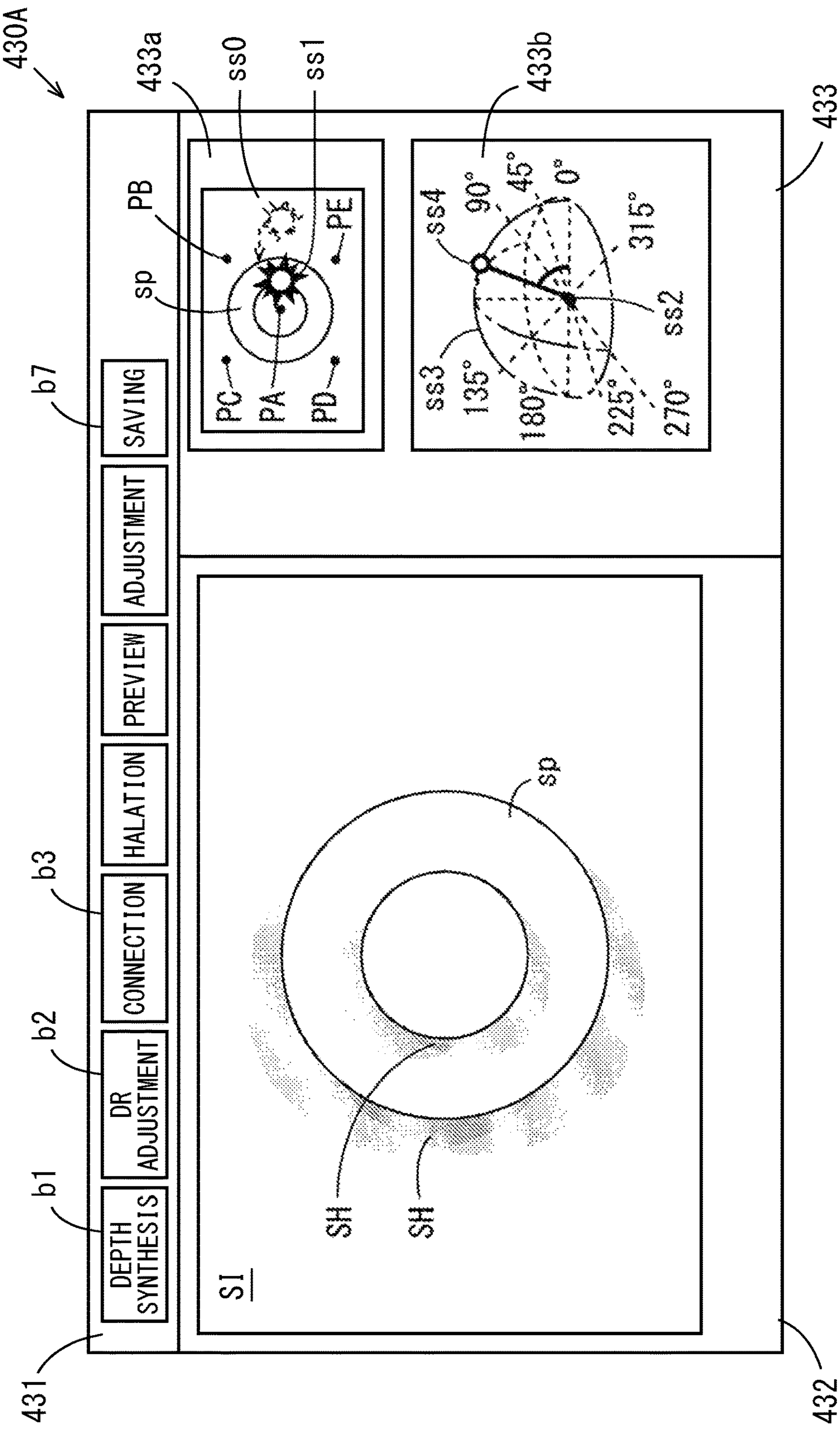
FIG. 16 is a diagram showing still another display example of the observation screen.

FIG. 16 is a diagram showing still another display example of the observation screen 430A. In FIG. 16, as in the example shown in FIG. 15, the five points PA to PE shown in FIG. 13A are shown on the target position image ss0 displayed in the emitting-direction designation field 433*a*. As indicated by a dotted line in the emitting-direction designation field 433*a* shown in FIG. 16, the light icon ss1 is moved to be closer to the point PA from the position shown in the emitting-direction designation field 433*a* shown in FIG. 15. In this case, the control section 410 generates image data for display by combining a part of the plurality of original image data respectively corresponding to the points PA to PE as in the example explained above. The control section 410 causes the display section 430 to display, in the main display region 432, the image SI of the observation target S based on the generated image data for display.

In the image SI displayed in the main display region 432 shown in FIG. 16, the uneven portion in the observation target S is weakly emphasized compared with the image SI displayed in the main display region 432 shown in FIG. 15.

In this example, the light icon ss1 is moved from the concentric circle on which the points PB to PE are arranged centering on the point PA toward the point PA. The user can designate an angle of elevation of the imaginary emitting direction of light from the placement surface by moving the light icon ss1 close to or away from the center of the target position image ss0 on the target position image ss0. Consequently, the angle of elevation of the imaginary emitting direction of light from the placement surface is changed to the angle of elevation designated by the light icon ss1. In this way, the user can designate the angle of elevation of the imaginary emitting direction of light in a desired angle by operating the light icon ss1. As a result, in the image SI displayed in the main display region 432, the user can easily change a degree of the emphasis of the uneven portion in the observation target S.

In the example explained above, on the observation screen 430A of the display section 430, the main display region 432 for displaying the image SI based on the image data for display and the sub-display region 433 for operating the light icon ss1 are set. Consequently, the image SI of the observation target S and the light icon ss1 do not overlap. Therefore, it is easy to visually recognize the image SI of the observation target S and the light icon ss1.

The user operates the saving button b7 shown in FIG. 12 using the console 440A shown in FIG. 8 in a state in which the imaginary emitting direction of light is designated in a desired direction concerning the image SI of the observation target S. In this case, the image data for display of the image SI displayed in the main display region 432 is stored in the storing section 420 together with a plurality of data concerning the image data for display. The plurality of data include a plurality of original image data, a plurality of thumbnail image data, imaging information, illumination information, and lens information related to the image data for display.

Figure 17:
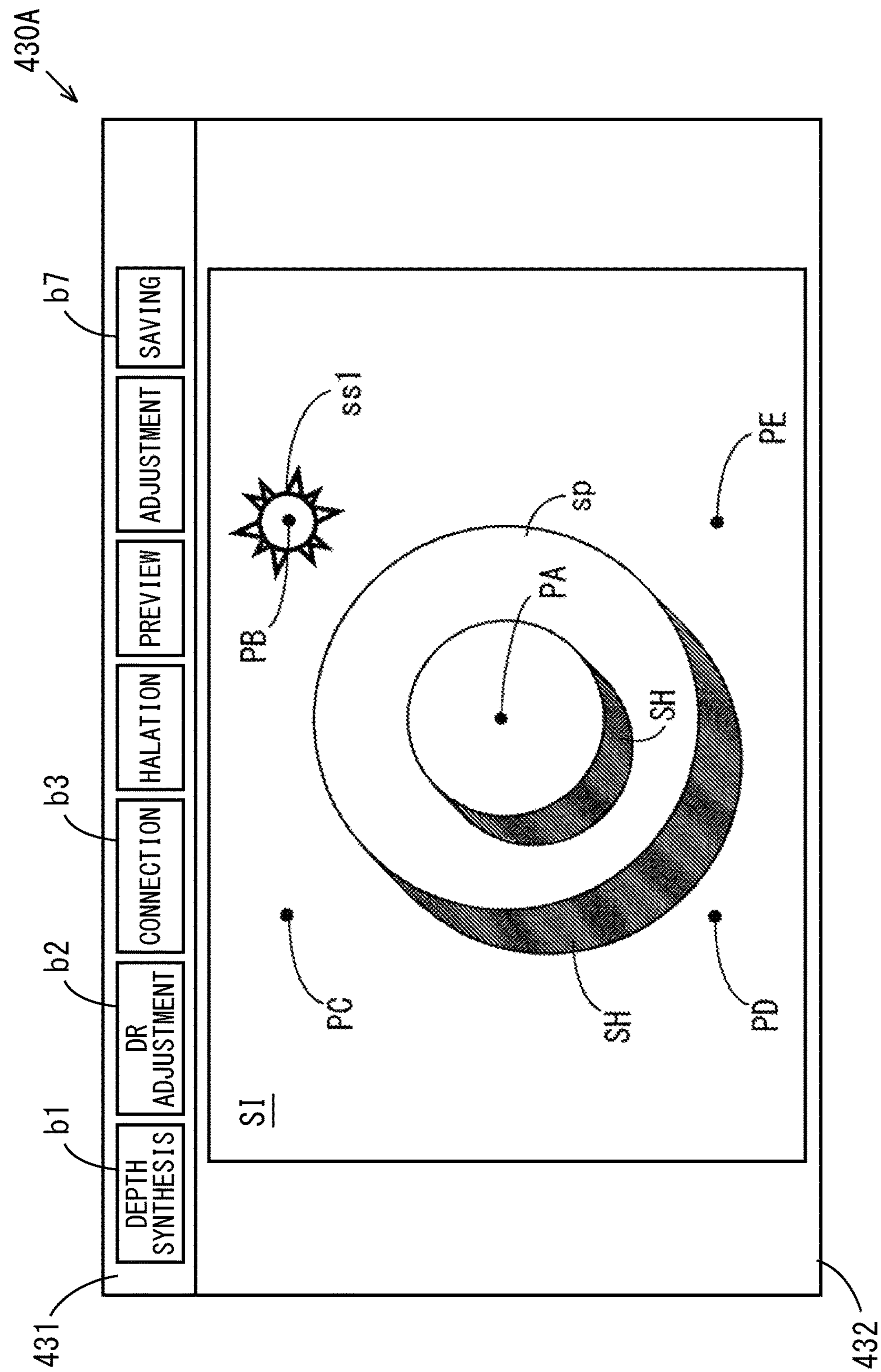
FIG. 17 is a diagram showing another configuration example for designating the imaginary emitting direction of light.
Figure 18:
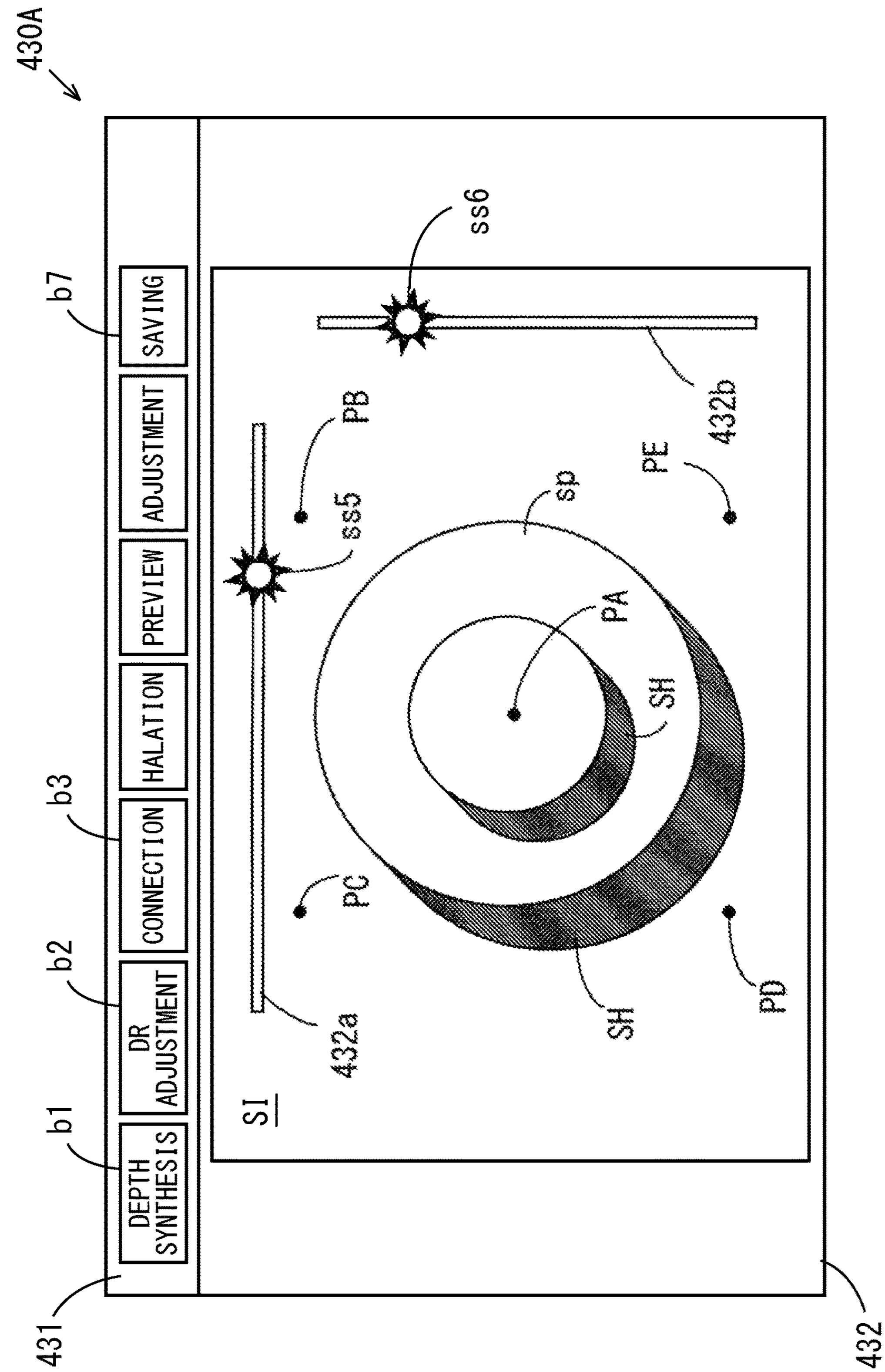
FIG. 18 is a diagram showing another configuration example for designating the imaginary emitting direction of light.
Figure 19:
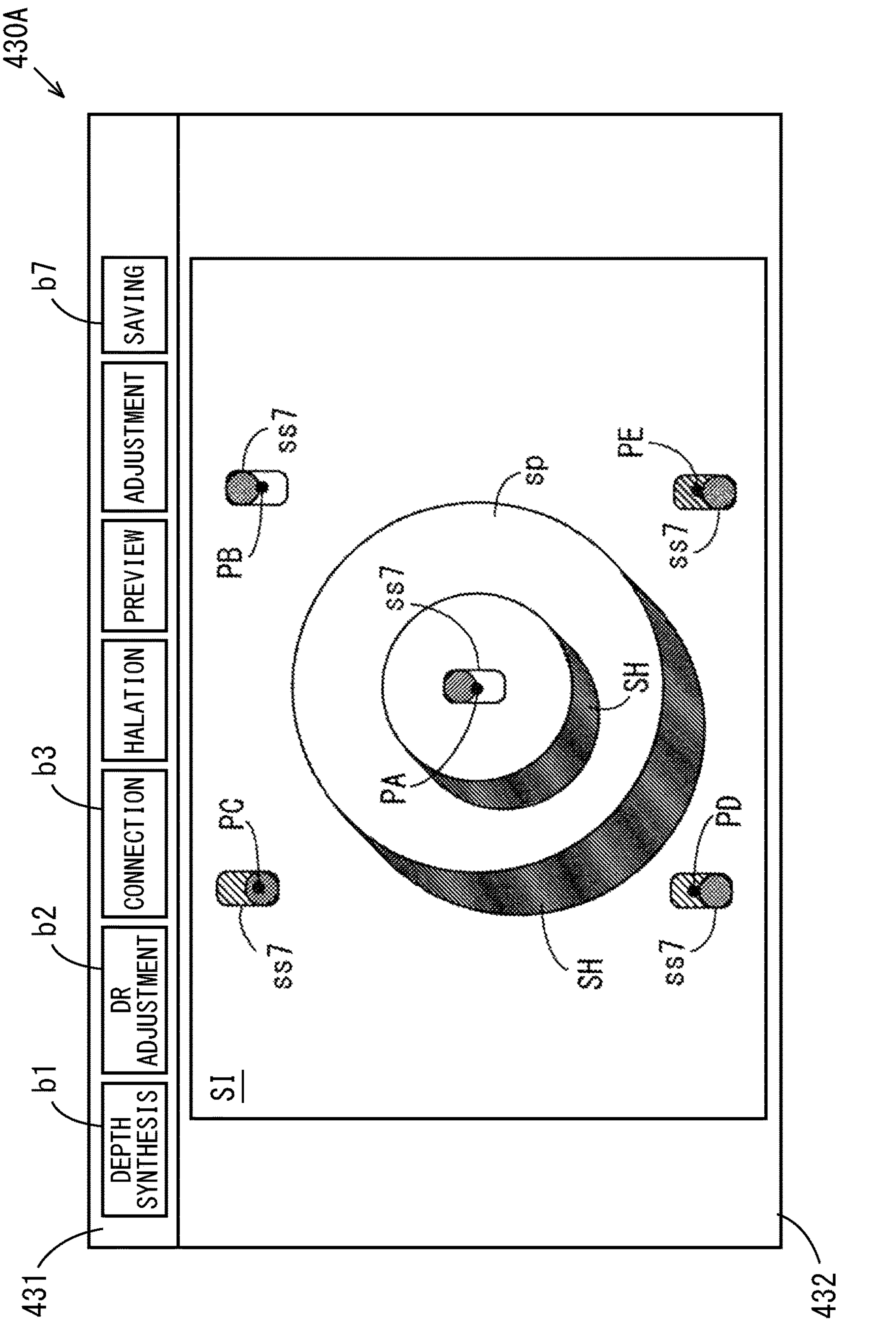
FIG. 19 is a diagram showing another configuration example for designating the imaginary emitting direction of light.

A configuration for designating the imaginary emitting direction of light is not limited to the example explained above. FIGS. 17 to 19 are diagrams showing other configuration examples for designating the imaginary emitting direction of light.

In the example shown in FIG. 17, the sub-display region 433 shown in FIG. 12 is not set on the observation screen 430A. The light icon ss1 is superimposed and displayed on the image SI of the observation target S displayed in the main display region 432. In this case, the points PA to PE explained above are set on the image SI of the observation target S. The control section 410 generates image data for display on the basis of a positional relation between the light icon ss1 on the image SI and the set points PA to PE and updates the display in the main display region 432 with the image SI based on the generated image data for display. The user can more intuitively operate the light icon ss1 on the image SI. Therefore, the user can more easily designate the imaginary emitting direction of light.

Concerning the example shown in FIG. 17, the user can designate an azimuth angle in the imaginary emitting direction of light by moving the light icon ss1 to rotate with respect to the center of the image SI on the image SI. The user can designate an angle of elevation from the placement surface in the imaginary emitting direction of light by bringing the light icon ss1 close to or away from the center of the image SI on the image SI.

In the example shown in FIG. 18, the sub-display region 433 shown in FIG. 12 is not set on the observation screen 430A. A position adjustment bar 432*a* extending in the left-right direction and a position adjustment bar 432*b* extending in the up-down direction are displayed on the image SI of the observation target S displayed in the main display region 432. In the position adjustment bar 432*a*, a light icon ss5 is displayed to be capable of moving in the left-right direction on the position adjustment bar 432*a*. Further, in the position adjustment bar 432*b*, a light icon ss6 is displayed to be capable of moving in the up-down direction on the position adjustment bar 432*b*.

The light icon ss5 indicates a position (a coordinate) in the left-right direction on the image SI. The light icon ss6 indicates a position (a coordinate) in the up-down direction on the image SI. In this example, as in the example shown in FIG. 17, the points PA to PE explained above are set on the image SI of the observation target S. The control section 410 generates image data for display on the basis of a positional relation between the positions on the image SI specified by the light icons ss5 and ss6 and the points PA to PE and updates the display in the main display region 432 with the image SI based on the generated image data for display. The user can designate the imaginary emitting direction of light by operating the light icons ss5 and ss6 on the image SI.

Concerning the example shown in FIG. 18, the user can designate an azimuth angle in the imaginary emitting direction of light by moving the positions on the image SI specified by the light icons ss5 and ss6 to rotate. The user can designate an angle of elevation from the placement surface in the imaginary emitting direction of light by bringing the positions on the image SI specified by the light icons ss5 and ss6 close to or away from the center of the image SI. Note that, in the example shown in FIG. 12, a plurality of indicators having functions same as the functions of the position adjustment bars 432*a* and 432*b* and the light icons ss5 and ss6 shown in FIG. 18 may be displayed on the sub-display region 433 instead of one light icon ss1.

In the example shown in FIG. 19, the sub-display region 433 shown in FIG. 12 is not set on the observation screen 430A. Five switch icons ss7 are displayed on the image SI of the observation target S displayed in the main display region 432. In this example, as in the example shown in FIG. 17, the points PA to PE explained above are set on the image SI of the observation target S. The five switch icons ss7 are respectively located on the points PA to PE and respectively correspond to the ring illumination and the first to fourth directional illuminations.

The switch icons ss7 are displayed to be capable of being switched to an ON state and an OFF state. In this case, the control section 410 may generate image data for display on the basis of one or a plurality of images SI corresponding to the switch icon(s) ss7 in the ON state. For example, it is assumed that the switch icon ss7 located in the center of the image SI and the switch icon ss7 located on the upper right of the image SI are switched to the ON state and the remaining all switch icons ss7 are switched to the OFF state. In this case, the control section 410 may generate image data for display by combining two original image data corresponding to the points PA and PB.

When the plurality of switch icons ss7 are disposed in the same manner as emitting positions of lights corresponding to the ring emitting direction and the first to fourth emitting directions, the user can easily grasp a light emitting position in the light projecting section 140 on the image SI.

Concerning the example shown in FIG. 19, the user can designate an azimuth angle in the imaginary emitting direction of light by, for example, switching the ON state and the OFF state of the four switch icons ss7 surrounding the center of the image SI. The user can designate an angle of elevation from the placement surface in the imaginary emitting direction of light by switching the ON state and the OFF state of the switch icon ss7 located in the center of the image SI and switching the ON state and the OFF state of the four switch icons ss7. In this case, although patterns of angles of elevation that can be designated are few, it is possible to designate an angle of elevation by only operation for turning on and off switches.

Besides the examples shown in FIGS. 12 and 14 to 19, as a configuration for designating the imaginary emitting direction of light, an azimuth-angle input field and an angle-of-elevation input field in which an azimuth angle and an angle of elevation of the imaginary emitting direction of light can be respectively input may be displayed on the observation screen 430A. In this case, the user may designate the imaginary emitting direction of light by designating the azimuth angle and the angle of elevation using the azimuth-angle input field and the angle-of-elevation input field.

In the example explained above, one of the plurality of images SI based on the plurality of original image data generated by the immediately preceding plural illumination imaging is displayed in the main display region 432 of the observation screen 430A in the initial state after the completion of the plural illumination imaging. However, the present invention is not limited to this. In the magnifying observation apparatus 1, for example, before the plural illumination imaging is started, an imaginary emitting direction of light corresponding to the image SI that should be displayed in the initial state in advance may be able to be designated. Alternatively, the imaginary emitting direction of light corresponding to the image SI that should be displayed in the initial state in advance may be designated by a manufacturer in advance during factory shipment of the magnifying observation apparatus 1. An image (a moving image) in which an emitting direction with respect to the image SI smoothly changes such that the imaginary emitting direction of light corresponding to the image SI changes may be displayed in the main display region 432 of the observation screen 430A in the initial state after the completion of the plural illumination imaging until operation by the user is received.

In this case, the control section 410 generates, when the plural illumination imaging is completed, image data for display corresponding to an emitting direction designated on the basis of the imaginary emitting direction of light designated in advance and the plurality of original image data generated by the plural illumination imaging. The control section 410 causes the display section 430 to display, in the main display region 432, the image SI based on the generated image data for display.

(b) Example of Plural Illumination Imaging Processing

The system program stored in the storing section 420 shown in FIG. 2 includes a plural illumination imaging program and an image-for-display generating program. The control section 410 shown in FIG. 2 performs plural illumination imaging processing and image-for-display generation processing by executing the plural illumination imaging program and the image-for-display generating program. The series of basic operation explained above is realized by the plural illumination imaging processing and the image-for-display generation processing. Consequently, even if the user is unskilled, the user can easily generate original image data.

Figure 20:
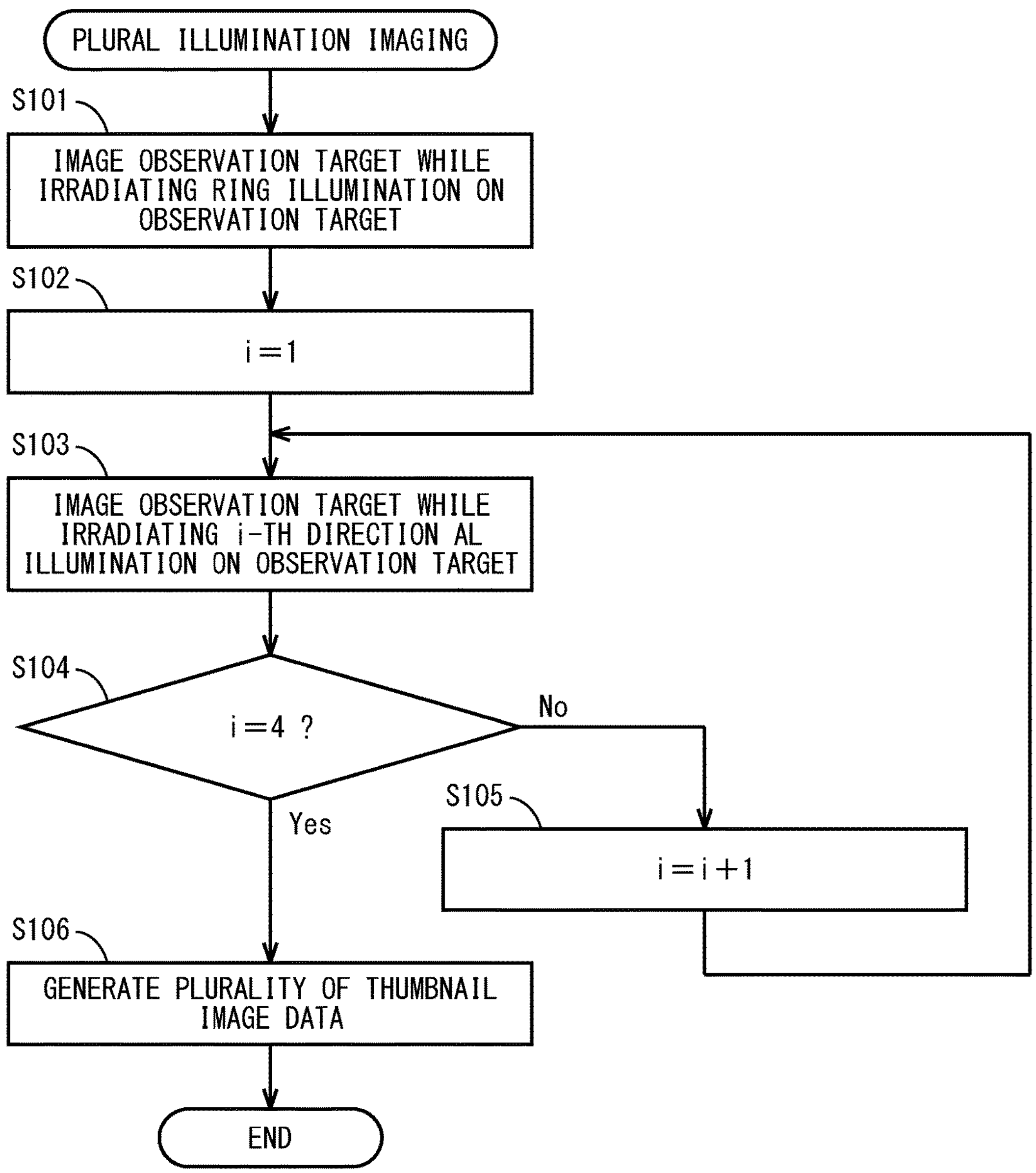
FIG. 20 is a flowchart for explaining an example of plural illumination imaging processing.

FIG. 20 is a flowchart for explaining an example of the plural illumination imaging processing. The plural illumination imaging processing is started in response to an instruction for the plural illumination imaging by the user. When the plural illumination imaging processing is started, the control section 410 irradiates the ring illumination on the observation target S according to imaging conditions set in advance and images the observation target S with the imaging section 132 (step S101). Original image data generated by the imaging is stored in the storing section 420.

Subsequently, the control section 410 sets i to 1 (step S102). In this step, i indicates numbers of a plurality of directional illuminations. Subsequently, the control section 410 irradiates i-th directional illumination on the observation target S and images the observation target S with the imaging section 132 (step S103). Original image data obtained by the imaging is stored in the storing section 420.

Subsequently, the control section 410 determines whether i is 4 (step S104). If i is not 4, the control section 410 updates i to i+1 (step S105) and returns to the processing in step S103.

If i is 4 in step S104, the control section 410 generates a plurality of thumbnail image data respectively corresponding to a plurality of original image data (step S106). The generated plurality of thumbnail image data are stored in the storing section 420. Consequently, the plural illumination imaging processing ends.

In the above explanation, the processing in step S106 may be omitted when it is unnecessary to display a thumbnail image on the display section 430. Consequently, a processing time is reduced.

In the above explanation, a part of the processing may be performed at other points in time. For example, the processing in step S101 may be executed later than the processing in steps S102 to S105.

(c) Example of the Image-For-Display Generation Processing

Figure 21:
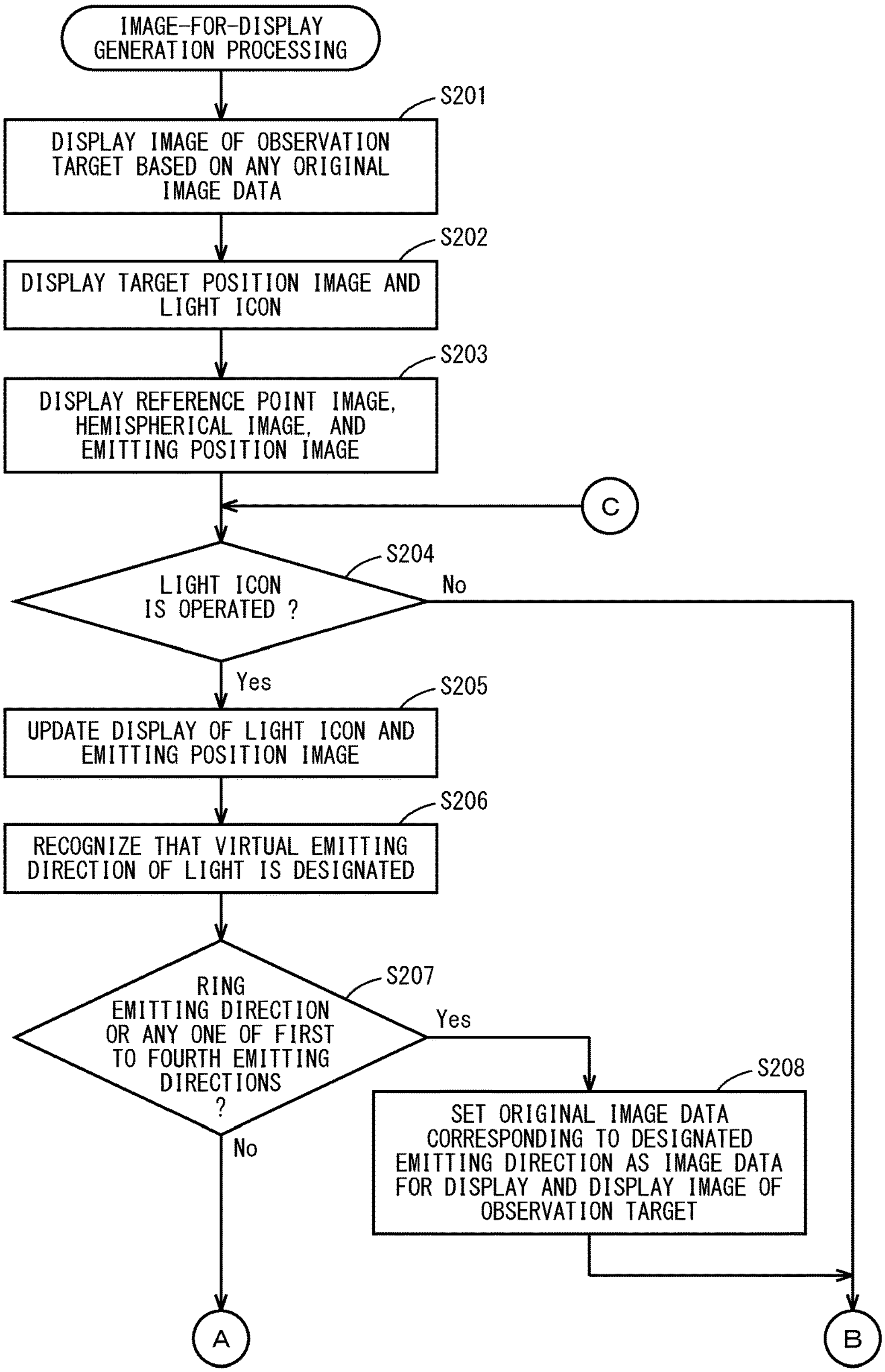
FIG. 21 is a flowchart for explaining an example of image-for-display generation processing.
Figure 22:
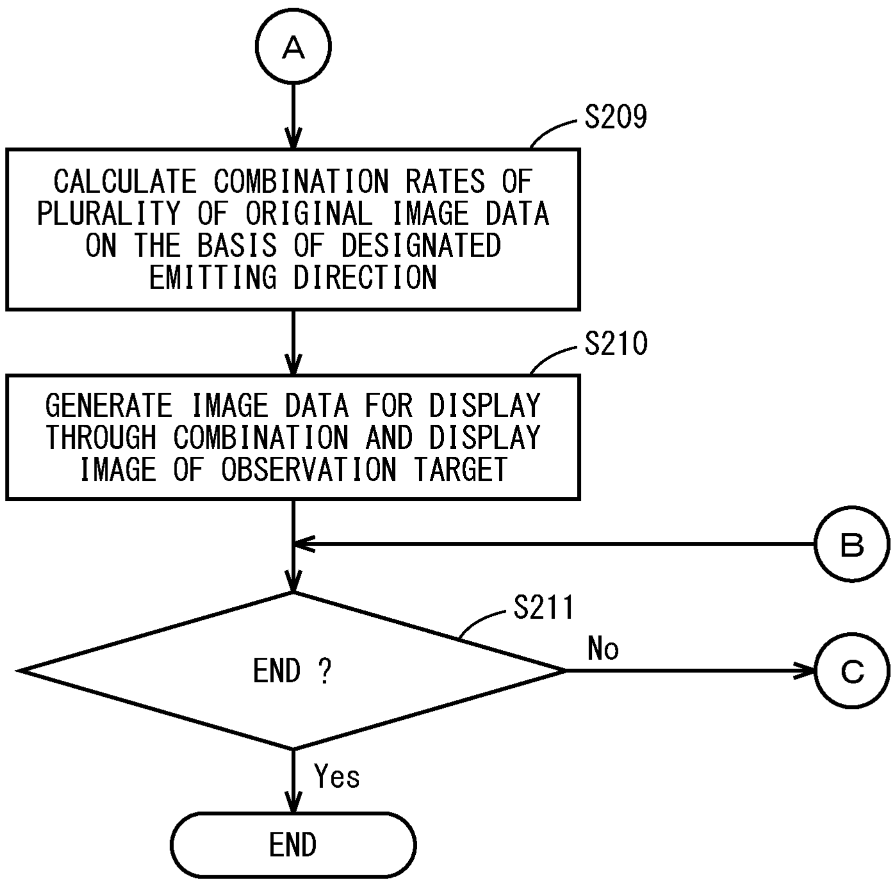
FIG. 22 is a flowchart for explaining the example of the image-for-display generation processing.

FIGS. 21 and 22 are flowcharts for explaining an example of image-for-display generation processing. In this embodiment, the control section 410 starts the image-for-display generation processing after the end of the plural illumination imaging processing.

First, the control section 410 causes the display section 430 to display, in the main display region 432, the image SI of the observation target S based on any original image data among the plurality of original image data generated by the plural illumination imaging processing (step S201). The control section 410 causes the display section 430 to display the target position image ss0 and the light icon ss1 in the emitting-direction designation field 433*a* (step S202). Further, the control section 410 causes the display section 430 to display the reference point image ss2, the hemispherical image ss3, and the emitting position image ss4 in the emitting-direction display field 433*b* (step S203).

Thereafter, the control section 410 determines whether the light icon ss1 is operated (step S204). If the light icon ss1 is not operated, the control section 410 proceeds to processing in step S210 explained below.

If the light icon ss1 is operated, the control section 410 updates the display of the light icon ss1 and the emitting position image ss4 in response to the operation of the light icon ss1 (step S205). The control section 410 recognizes that an imaginary emitting direction of light is designated by the operation of the light icon ss1 (step S206) and determines whether the designated emitting direction is the ring emitting direction or any one of the first to fourth emitting directions (step S207). The determination processing in step S207 is executed on the basis of a positional relation between the points PA to PE set on the target position image ss0 and the light icon ss1.

If the designated emitting direction is the ring emitting direction or any one of the first to fourth emitting directions, the control section 410 sets the original image data corresponding to the designated emitting direction as image data for display and causes the display section 430 to display the image SI of the observation target S based on the image data for display in the main display region 432 (step S208). Thereafter, the control section 410 proceeds to processing in step S210 explained below.

If the designated emitting direction is not the ring emitting direction or all of the first to fourth emitting directions in step S207, the control section 410 calculates combination rates of the plurality of original image data on the basis of the designated emitting direction (step S209). Like the processing in step S207, the calculation processing in step S209 is executed on the basis of the positional relation between the points PA to PE set on the target position image ss0 and the light icon ss1.

Thereafter, the control section 410 generates image data for display by combining the plurality of original image data on the basis of the combination rates calculated in step S209 and causes the display section 430 to display the image SI of the observation target S based on the image data for display in the main display region 432 (step S210).

In this embodiment, the user can instruct an end of the observation of the observation target S by operating the console 440A shown in FIG. 8. After the processing in step S209, the control section 410 determines whether the end of the observation of the observation target S is instructed (step S211). If the end of the observation of the observation target S is instructed, the control section 410 ends the image-for-display generation processing. On the other hand, if the end of the observation of the observation target S is not instructed, the control section 410 returns to the processing in step S204.

In the image-for-display generation processing shown in FIGS. 21 and 22, the control section 410 may calculate at least one of an azimuth angle and an angle of elevation in the designated imaginary emitting direction of light during or after the processing in step S209. In this case, the control section 410 may cause the display section 430 to display the calculated at least one of the azimuth angle and the angle of elevation. Consequently, the user can easily recognize information concerning the designated imaginary emitting direction of light.

In the image-for-display generation processing explained above, the image SI of the observation target S based on any original image data among the plurality of original image data generated in the plural illumination imaging processing is displayed on the display section 430 in the processing in step S201. However, the present invention is not limited to this. In the processing in step S201, the control section 410 may cause the display section 430 to display the image SI based on original image data corresponding to illumination decided in advance (e.g., the ring illumination) instead of the any original image data. Alternatively, the control section 410 may omit the processing in step S201.

In the example explained above, the image-for-display generation processing is executed after the end of the plural illumination imaging processing. However, the present invention is not limited to this. When the plural illumination imaging processing is continuously or intermittently executed at a fixed cycle, the image-for-display generation processing may be executed in parallel to the plural illumination imaging processing. In this case, the image-for-display generation processing can be executed on the basis of a latest plurality of original image data stored in the storing section 420 by the immediately preceding plural illumination imaging processing.

In the magnifying observation apparatus 1 according to this embodiment, the user can designate a part of the plurality of original image data stored in the storing section 420 using the console 440A shown in FIG. 8. In this case, the control section 410 may respond to the designation of the original image data by the user, read the designated original image data, and perform the image-for-display generation processing based on the read original image data.

(3) Depth Synthesis Processing (a) Processing Content

The user can give an instruction for the depth synthesis processing to the control section 410 shown in FIG. 1 by operating any one of the plurality of buttons 443 of the console 440A shown in FIG. 8 or by operating the depth synthesis button b1 shown in FIG. 12 using the console 440A.

In the depth synthesis processing, it is desirable that a range of a focal position of light and a moving pitch of the focal position in the Z direction are set in advance as imaging conditions for the depth synthesis processing. In this case, the focus driving section 113 shown in FIG. 1 does not need to change the focal position of the light in an excessively large range. Therefore, it is possible to generate a plurality of original image data at high speed. The imaging conditions are set, for example, on the basis of operation of the console 440 by the user. Note that the range of the focal position of the light and the moving pitch of the focal position in the Z direction may be automatically set according to, for example, magnification of the objective lens 131*a* used for imaging. In the following explanation, it is assumed that imaging conditions for the depth synthesis processing are set in advance.

Figure 23A:
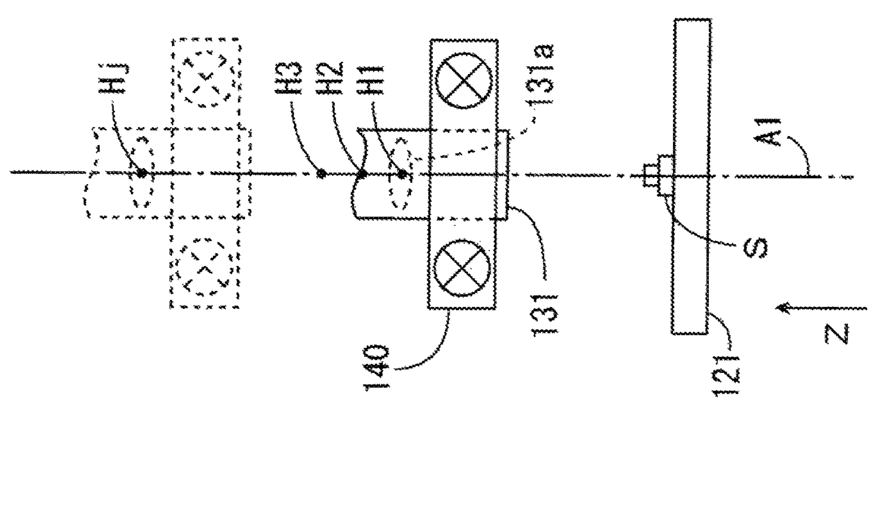
FIGS. 23A and 23B are conceptual diagrams of depth synthesis processing.
Figure 23B:
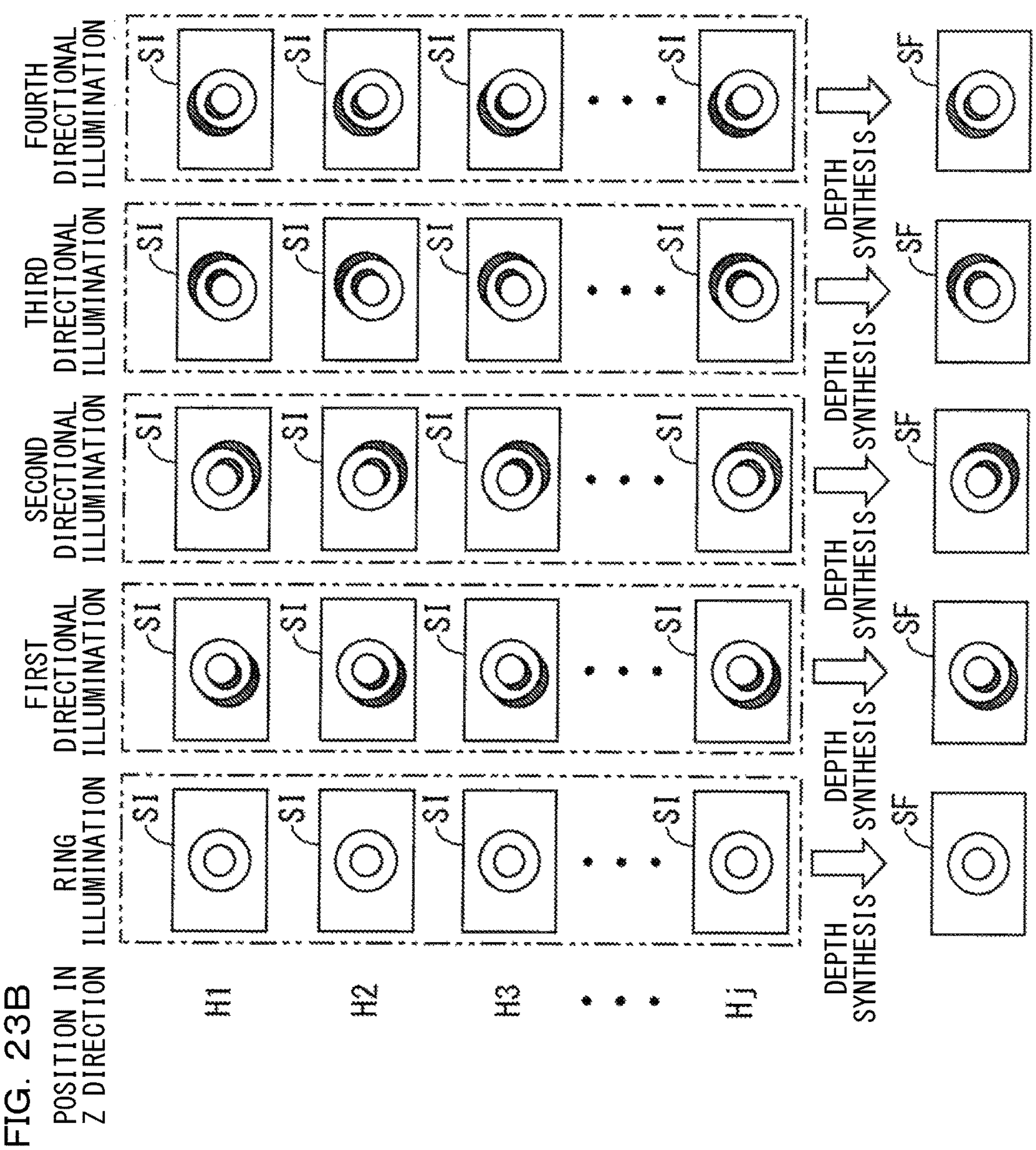

FIGS. 23A and 23B are conceptual diagrams of the depth synthesis processing. In FIG. 23A, a positional relation among the lens unit 131, the light projecting section 140, and the stage 121 is shown. In this example, in a state in which the stage 121 stands still, the lens unit 131 is moved in the Z direction integrally with the light projecting section 140. In this case, positions H1 to Hj (j is a natural number) in the Z direction to which the lens unit 131 (the objective lens 131*a*) should move are decided on the basis of the range of the focal position of the light and the moving pitch of the focal position in the Z direction designated in advance.

In the depth synthesis processing, the observation target S is imaged using the ring illumination and the first to fourth directional illuminations in a state in which the lens unit 131 is positioned in each of the positions H1 to Hj. Consequently, pluralities of (j) original image data respectively corresponding to the positions H1 to Hj are generated using the ring illumination and the first to fourth directional illuminations. In FIG. 23B, a plurality of images SI of the observation target S respectively corresponding to the positions H1 to Hj are shown for each of the illuminations.

A focus degree of each of pixels is determined concerning each of the plurality of original image data obtained by the imaging using the ring illumination. The plurality of original image data are selectively combined on the basis of a determination result of the focus degree. Consequently, depth synthesis image data focused on all portions of the observation target S on which the ring illumination is irradiated is generated. Depth synthesis image data corresponding to the directional illuminations are generated on the basis of the pluralities of original image data corresponding to the directional illuminations and mask image data explained below. An image based on the depth synthesis image data is referred to as depth synthesis image. In FIG. 23B, a plurality of depth synthesis images SF of the observation target S respectively corresponding to the ring illumination and the first to fourth directional illuminations are shown.

The control section 410 executes the image-for-display generation processing on the basis of a plurality of depth synthesis image data generated by the depth synthesis processing instead of the plurality of original image data. Consequently, the user can easily cause the display section 430 to display a depth synthesis image SF of the observation target S that should be obtained when it is assumed that light is irradiated on the observation target S from a desired direction.

In the depth synthesis processing explained above, pluralities of original image data respectively corresponding to the positions H1 to Hj are generated for each of the illuminations. An operation button for designating only the generation of the pluralities of original image data may be displayed on the observation screen 430A shown in FIG. 12. When only the generation of the pluralities of original image data is designated, after performing only the generation of the pluralities of original image data, the control section 410 may receive designation by the user concerning a position in the Z direction of a focus and execute the image-for-display generation processing using a plurality of original image data corresponding to the designated position in the Z direction.

In the depth synthesis processing, mask image data is generated when depth synthesis image data corresponding to the ring illumination is generated. A plurality of depth synthesis image data respectively corresponding to the first to fourth directional illuminations are generated using the generated mask image data. The mask image data is explained.

Numbers corresponding to the focal positions H1 to Hj of light in the Z direction are given to respective pluralities of original image data generated in processing for imaging the observation target S while changing the positions in the Z direction of the lens barrel section 130 and the stage 121. The data generating section 610 shown in FIG. 9 generates mask image data indicating a corresponding relation between pixels of the depth synthesis image data corresponding to the ring illumination and numbers of the original image data.

FIG. 24 is a schematic diagram visually showing the mask image data. Small squares in FIG. 24 are equivalent to pixel data of the depth synthesis image data corresponding to the ring illumination. Numbers given to the squares indicate numbers of original image data from which data are extracted that indicate a pixel value of pixel data generated in which position among the focal positions H1 to Hj of the light in the Z direction is optimum in pixels corresponding to the squares, that is, in which focal position of the light a brightness value is the highest without being saturated. That is, in the example shown in FIG. 24, it is indicated that pixel data at the uppermost left is extracted from original image data in a focal position H12 of the light and pixel data at the lowermost right is extracted from original image data in a focal position H85 of the light.

The data generating section 610 generates, on the basis of the generated mask image data, depth synthesis image data corresponding to the respective first to fourth directional illuminations. In this case, the focus determining section 620 shown in FIG. 9 does not need to determine a focus degree of each of pixels concerning the original image data when generating the depth synthesis image data corresponding to the respective first to fourth directional illuminations. Consequently, it is possible to increase the speed of the depth synthesis processing.

In the above explanation, the depth synthesis image data is generated first for each of the ring illumination and the first to fourth directional illuminations. The image data for display is generated on the basis of the generated plurality of depth synthesis image data. However, the present invention is not limited to this. Pluralities of image data for display respectively corresponding to the plurality of positions H1 to Hj in the Z direction may be generated on the basis of the imaginary emitting direction of light designated by the user. Depth synthesis image data for display may be generated on the basis of the generated pluralities of image data for display. In this case, the mask image data is unnecessary.

Note that, in the above explanation, the mask image data is generated on the basis of the image data at the time when the ring illumination is emitted. However, the present invention is not limited to this. The mask image data may be generated on the basis of each of image data at the time when the ring illumination is emitted and image data at the time when the directional illumination is emitted. The mask image data at the time when the directional illumination is emitted may be generated for each of the plurality of directional illuminations. This configuration is useful when an optimum position in the Z direction is different because, for example, light amounts are different in the ring illumination and the directional illumination.

(b) Example of the Depth Synthesis Processing

The system program stored in the storing section 420 shown in FIG. 2 includes a depth synthesis program. The control section 410 shown in FIG. 2 performs the depth synthesis processing by executing the depth synthesis program.

Figure 25:
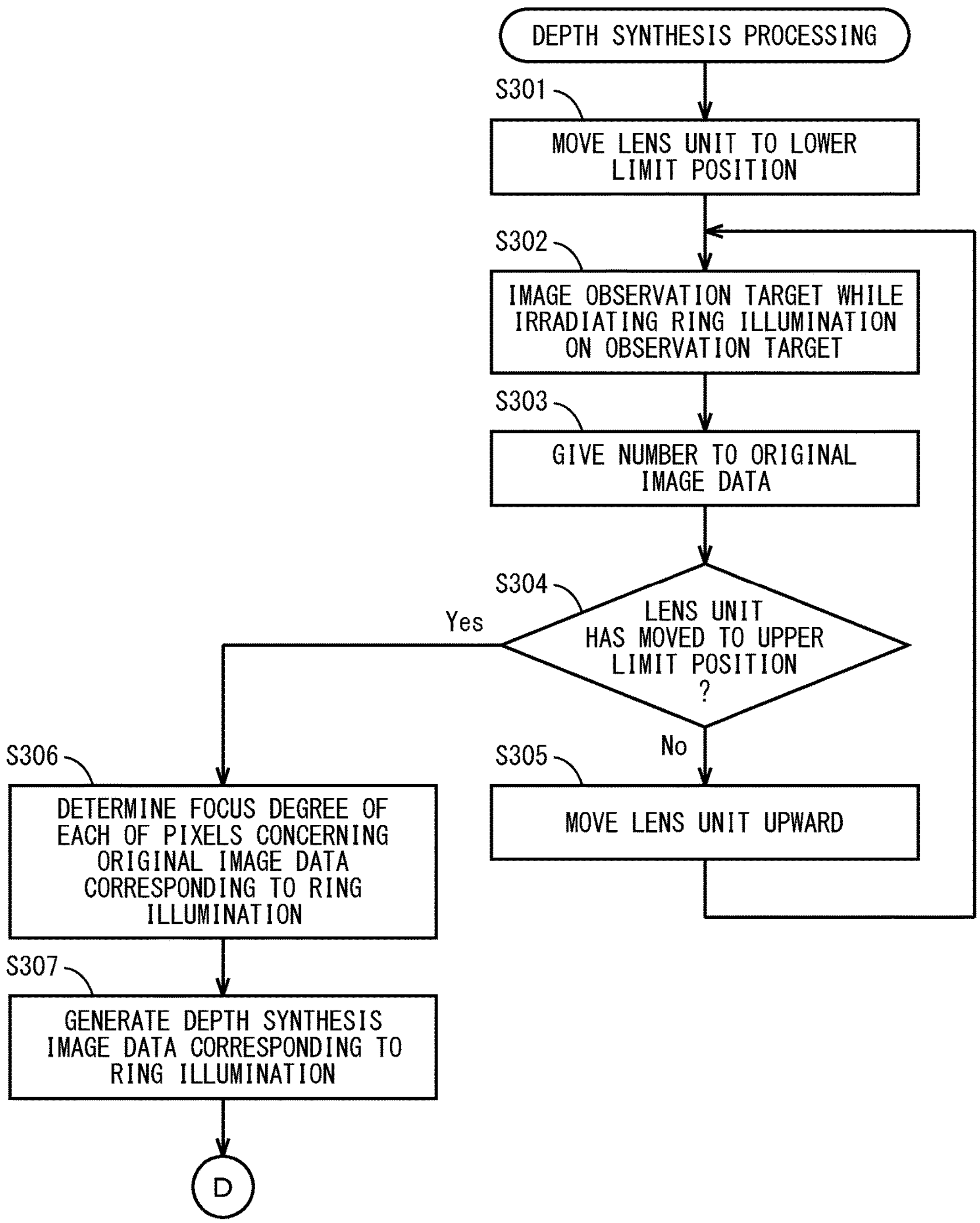
FIG. 25 is a flowchart for explaining an example of the depth synthesis processing.
Figure 26:
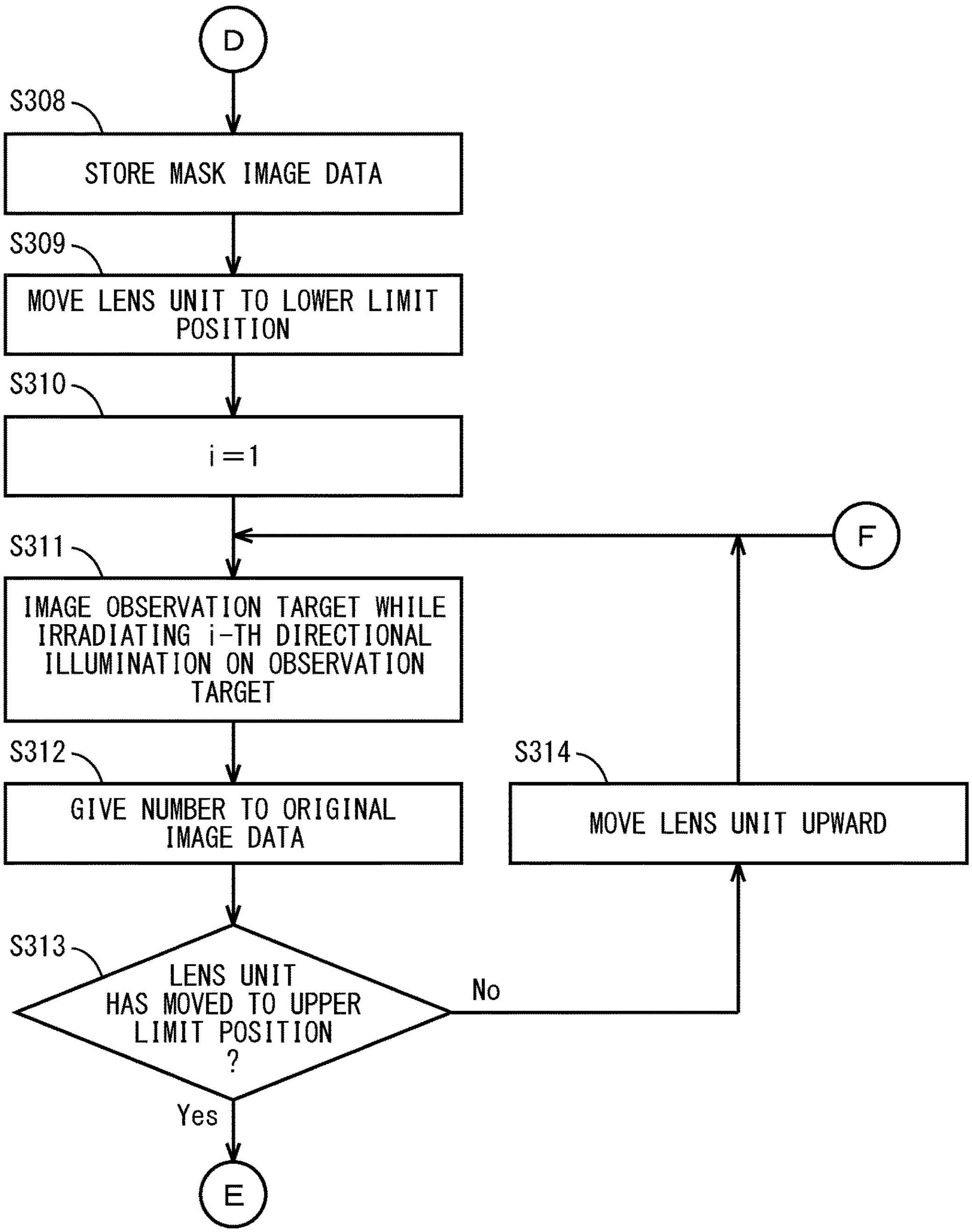
FIG. 26 is a flowchart for explaining the example of the depth synthesis processing.
Figure 27:
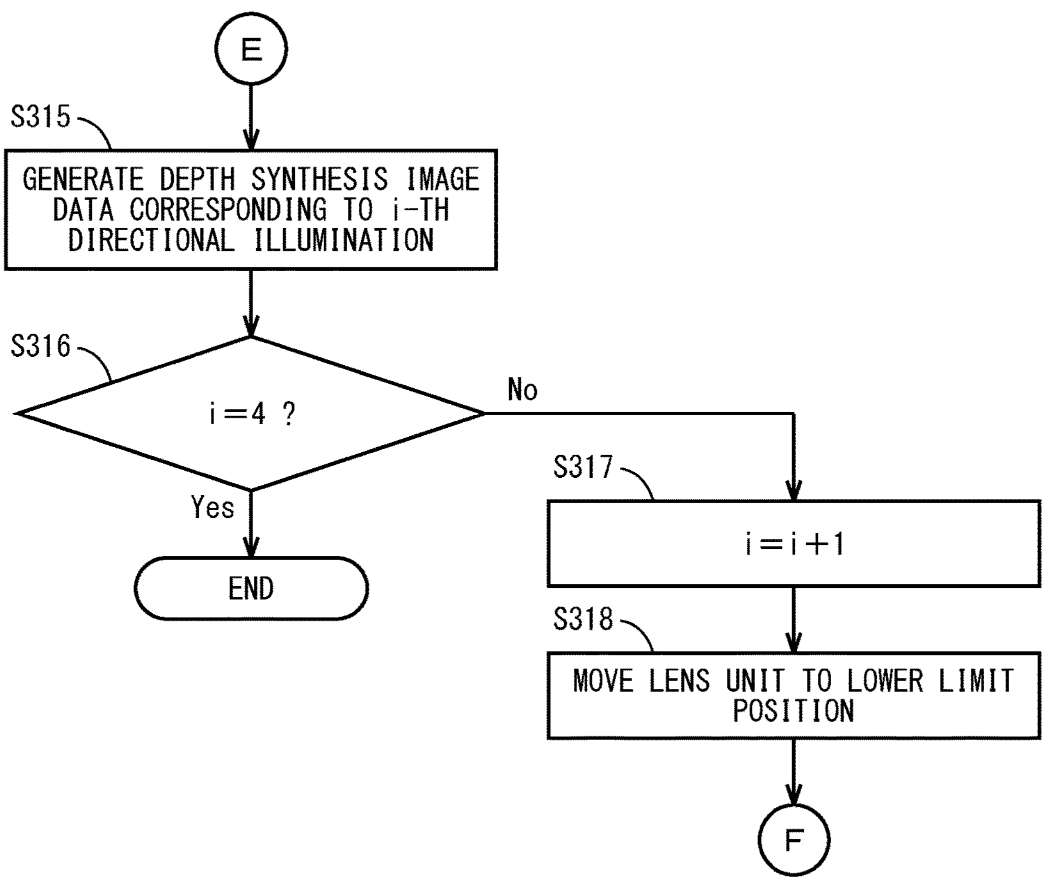
FIG. 27 is a flowchart for explaining the example of the depth synthesis processing.

FIGS. 25, 26, and 27 are flowcharts for explaining an example of the depth synthesis processing. The control section 410 moves the lens unit 131 to a lower limit position (step S301). Subsequently, the control section 410 irradiates the ring illumination on the observation target S with the light projecting section 140 and images the observation target S with the imaging section 132 (step S302). The control section 410 gives a number corresponding to the position in the Z direction of the lens unit 131 to generated original image data (step S303). Subsequently, the control section 410 determines whether the lens unit 131 has moved to an upper limit position (step S304).

If the lens unit 131 has not moved to the upper limit position in step S304, the control section 410 moves the lens unit 131 upward by a predetermined amount (a moving pitch set in advance) (step S305). Thereafter, the control section 410 returns to the processing in step S302. The control section 410 repeats the processing insteps S302 to S305 until the lens unit 131 moves to the upper limit position.

If the lens unit 131 has moved to the upper limit position in step S304, the control section 410 determines a focus degree of each of pixels concerning original image data corresponding to the ring illumination (step S306). Subsequently, the control section 410 generates depth synthesis image data corresponding to the ring illumination by combining pixel data of a plurality of original image data on the basis of a determination result of the focus degree (step S307). The control section 410 generates mask image data indicating a correspondence relation between pixels of combined image data and numbers of the original image data and causes the storing section 420 to store the mask image data (step S308).

Thereafter, the control section 410 moves the lens unit 131 to the lower limit position (step S309). Subsequently, the control section 410 sets i to 1 (step S310). In this step, i indicates numbers of a plurality of directional illuminations. Subsequently, the control section 410 irradiates the i-th directional illumination on the observation target S with the light projecting section 140 and images the observation target S with the imaging section 132 (step S311). The control section 410 gives a number corresponding to the position in the Z direction of the lens unit 131 to the generated original image data (step S312). Subsequently, the control section 410 determines whether the lens unit 131 has moved to the upper limit position (step S313).

If the lens unit 131 has not moved to the upper limit position in step S313, the control section 410 moves the lens unit 131 upward by a predetermined amount (a moving pitch set in advance) (step S314). Thereafter, the control section 410 returns to the processing in step S311. The control section 410 repeats the processing insteps S311 to S314 until the lens unit 131 moves to the upper limit position.

If the lens unit 131 has moved to the upper limit position in step S313, the control section 410 generates depth synthesis image data corresponding to the i-th directional illumination by combining pixel data of the plurality of original image data on the basis of the mask image data stored in the storing section 420 (step S315).

Subsequently, the control section 410 determines whether i is 4 (step S316). If i is not 4 in step S316, the control section 410 updates i to i+1 (step S317). The control section 410 moves the lens unit 131 to a lower limit position (step S318). Thereafter, the control section 410 returns to the processing in step S311. The control section 410 repeats the processing in steps S311 to S318 until i reaches 4. Consequently, pluralities of original image data corresponding to the respective first to fourth directional illuminations are generated. Depth synthesis image data corresponding to the respective first to fourth directional illuminations are generated. If i is 4 in step S316, the control section 410 ends the processing.

In the above explanation, a part of the processing may be performed at another point in time. For example, the processing in steps S306 to S308 may be executed in parallel to steps S309 to S314. The processing in step S315 corresponding to the i-th directional illumination may be executed in parallel to steps S311 to S314 corresponding to (i+1)-th directional illumination. In these cases, it is possible to increase the speed of the depth synthesis processing.

Alternatively, the processing in steps S306 to S308 may be executed later than the processing in steps S309 to S314. The processing in step S315 corresponding to the i-th directional illumination may be executed later than the processing in steps S311 to S314 corresponding to the (i+1)-th directional illumination.

(c) Another Example of the Depth Synthesis Processing

Figure 28:
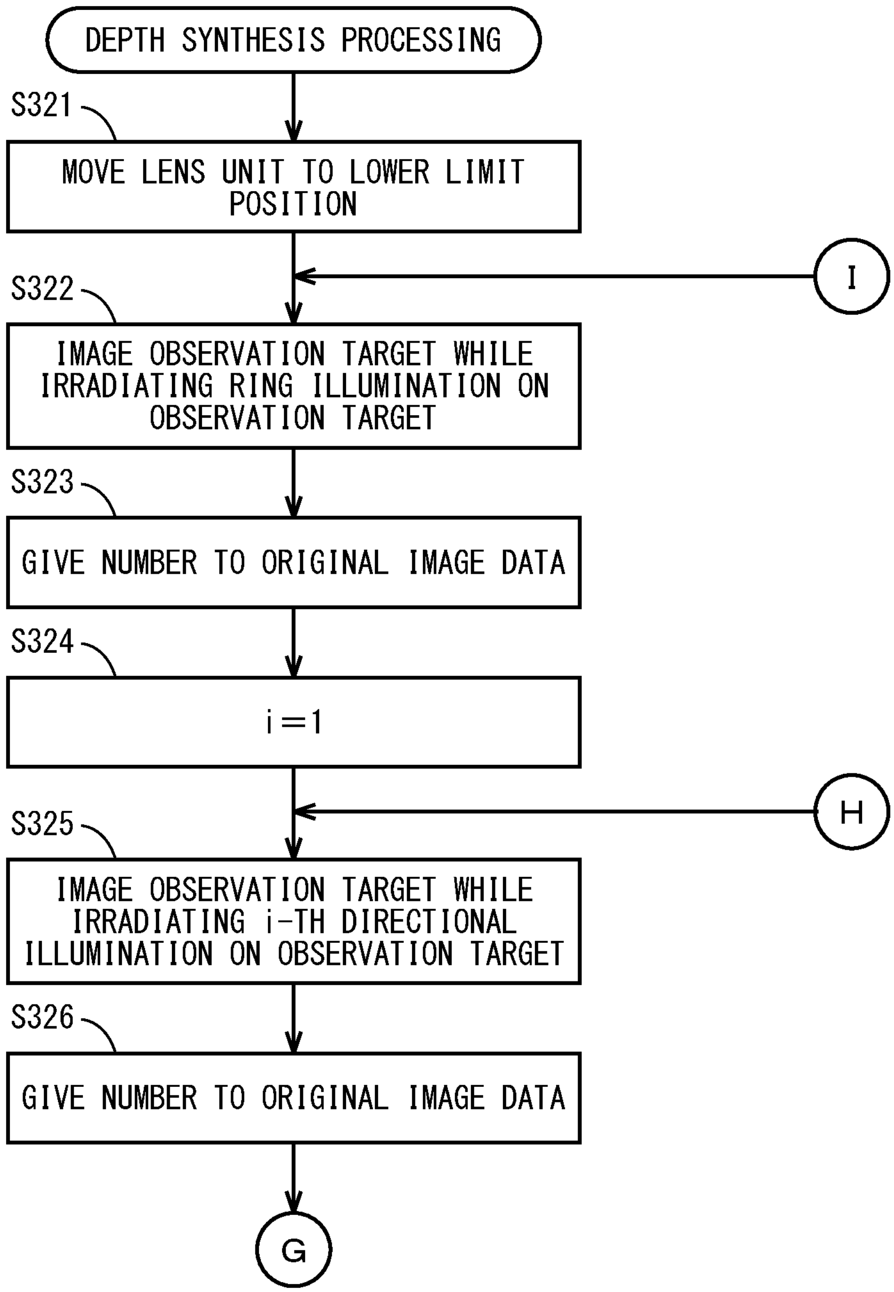
FIG. 28 is a flowchart for explaining another example of the depth synthesis processing.
Figure 29:
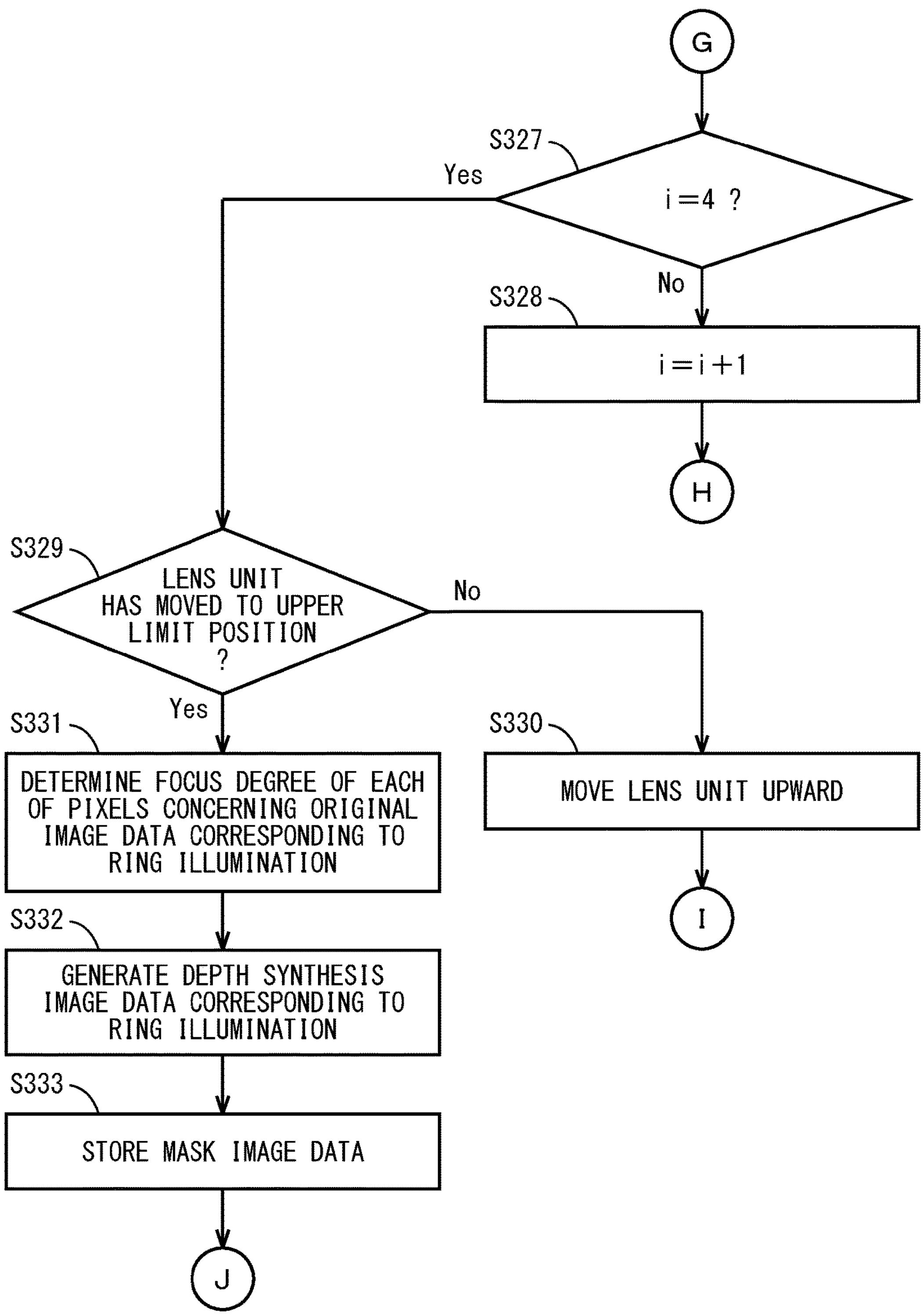
FIG. 29 is a flowchart for explaining the other example of the depth synthesis processing.
Figure 30:
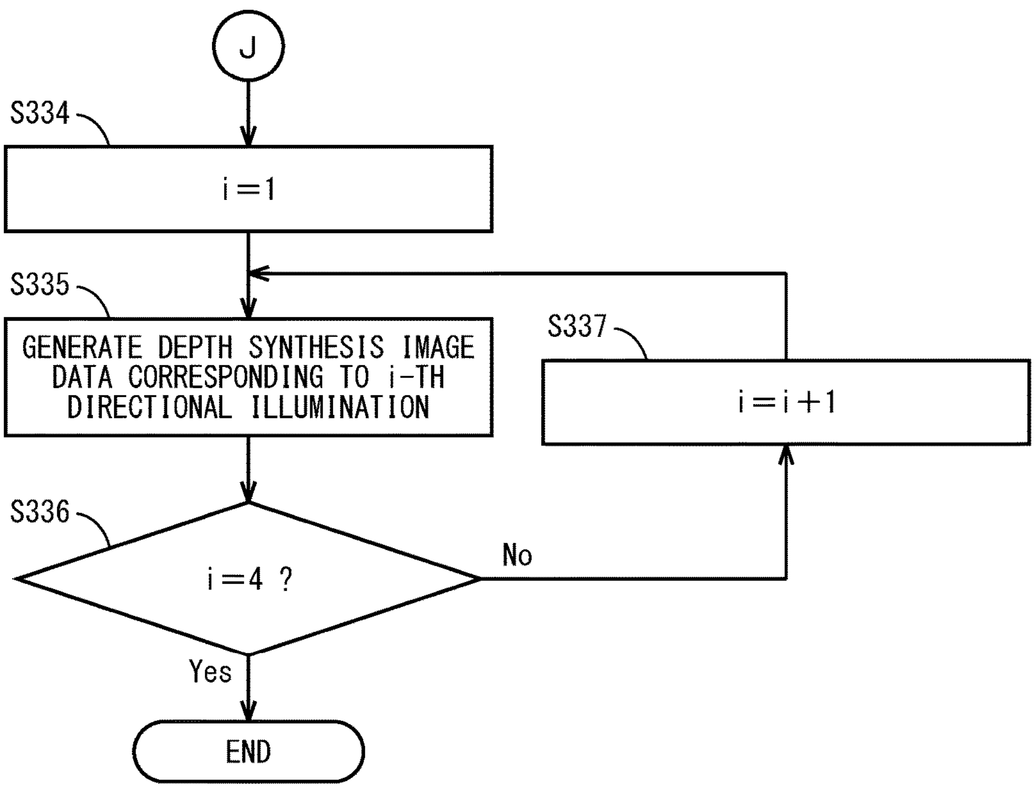
FIG. 30 is a flowchart for explaining the other example of the depth synthesis processing.

FIGS. 28, 29, and 30 are flowcharts for explaining another example of the depth synthesis processing. The control section 410 moves the lens unit 131 to the lower limit position (step S321). Subsequently, the control section 410 irradiates the ring illumination on the observation target S with the light projecting section 140 and images the observation target S with the imaging section 132 (step S322). The control section 410 gives a number corresponding to the position in the Z direction of the lens unit 131 to generated original image data (step S323).

Subsequently, the control section 410 sets i to 1 (step S324). In this step, i indicates numbers of a plurality of directional illuminations. Thereafter, the control section 410 irradiates the i-th directional illumination on the observation target S with the light projecting section 140 and images the observation target S with the imaging section 132 (step S325). The control section 410 gives a number corresponding to the position in the Z direction of the lens unit 131 to generated original image data (step S326). Subsequently, the control section 410 determines whether i is 4 (step S327).

If i is not 4 in step S327, the control section 410 updates i to i+1 (step S328). Thereafter, the control section 410 returns to the processing in step S325. The control section 410 repeats the processing in steps S325 to S328 until i reaches 4. Consequently, pluralities of original image data corresponding to the respective first to fourth directional illuminations are generated. If i is 4 in step S327, the control section 410 determines whether the lens unit 131 has moved to the upper limit position (step S329).

If the lens unit 131 has not moved to the upper limit position in step S329, the control section 410 moves the lens unit 131 upward by a predetermined amount (step S330). Thereafter, the control section 410 returns to the processing in step S322. The control section 410 repeats the processing insteps S322 to S330 until the lens unit 131 moves to the upper limit position.

If the lens unit 131 has moved to the upper limit position in step S329, the control section 410 determines a focus degree of each of pixels concerning the original image data corresponding to the ring illumination (step S331). Subsequently, the control section 410 generates depth synthesis image data corresponding to the ring illumination by combining pixel data of the plurality of original image data on the basis of a determination result of the focus degree (step S332). The control section 410 generates mask image data indicating a correspondence relation between pixels of combined image data and numbers of the original image data and causes the storing section 420 to store the mask image data (step S333).

Subsequently, the control section 410 sets i to 1 again (step S334). Thereafter, the control section 410 generates depth synthesis image data corresponding to the i-th directional illumination by combining the pixel data of the plurality of original image data on the basis of the mask image data stored in the storing section 420 (step S335).

Subsequently, the control section 410 determines whether i is 4 (step S336). If i is not 4 in step S316, the control section 410 updates i to i+1 (step S337). Thereafter, the control section 410 returns to the processing in step S335. The control section 410 repeats the processing in steps S335 to S337 until i reaches 4. Consequently, depth synthesis image data corresponding to the respective first to fourth directional illuminations are generated. If i is 4 in step S336, the control section 410 ends the processing.

In the above explanation, a part of the processing may be performed at another point in time. For example, a part of the processing in steps S331 to S337 may be executed in parallel to steps S321 to S330. In this case, it is possible to increase the speed of the depth synthesis processing. The processing in steps S322 and S323 may be executed later than the processing in steps S324 to S328.

In the example and the other example of the depth synthesis processing, the lens unit 131 is moved upward to the upper limit position by the predetermined amount at a time after being moved to the lower limit position serving as the initial position. However, the present invention is not limited to this. In the depth synthesis processing, the lens unit 131 may be moved downward to the lower limit position by the predetermined amount at a time after being moved to the upper limit position serving as the initial position.

Note that, in the above explanation, the pluralities of original image data respectively corresponding to the positions H1 to Hj are combined in the depth synthesis processing. However, the present invention is not limited to this. The pluralities of original image data respectively corresponding to the positions H1 to Hj may be independently used without being combined.

For example, original image data in which a focus of the imaging section 132 coincides with a specific portion of the observation target S most may be extracted from the pluralities of original image data respectively corresponding to the positions H1 to Hj on the basis of the determination result by the focus determining section 620 shown in FIG. 9. In this case, it is possible to generate, at high speed, image data for display indicating an image having a large focus degree as a whole on the basis of the plurality of original image data respectively extracted according to the ring illumination and the first to fourth directional illuminations.

(4) DR Adjustment Processing (a) Processing Content

The user can give an instruction for the DR adjustment processing to the arithmetic processing section 600 by operating the DR adjustment button b2 shown in FIG. 12 using the console 440A shown in FIG. 8.

In the DR adjustment processing, in a state in which the light reception time of the imaging section 132 is changed to a plurality of values decided in advance, the observation target S at the time when the ring illumination and the first to fourth directional illuminations are respectively irradiated is imaged. Consequently, a plurality of original image data respectively corresponding to the ring illumination and the first to fourth directional illuminations are generated by the data generating section 610 shown in FIG. 9 in every light reception time of the imaging section 132. An overall pixel value of the original image data generated when the light reception time of the imaging section 132 is short is relatively small. An overall pixel value of the original image data generated when the light reception time of the imaging section 132 is long is relatively large.

The plurality of original image data corresponding to the ring illumination are combined by the data generating section 610. Consequently, it is possible to adjust a dynamic range of the original image data corresponding to the ring illumination. Similarly, the pluralities of original image data corresponding to the directional illuminations are combined by the data generating section 610. Consequently, it is possible to adjust a dynamic range of the original image data corresponding to the directional illuminations.

The adjustment of the dynamic range includes expansion and reduction of the dynamic range. It is possible to reduce black solid and halation (white void) in an image by combining the pluralities of original image data to expand the dynamic range. On the other hand, a difference in light and shade of an image is increased by combining the pluralities of original image data to reduce the dynamic range. Consequently, it is possible to precisely observe unevenness of the observation target S having a smooth surface.

In the above explanation, the original image data are combined first such that the dynamic range is adjusted for each of the ring illumination and the first to fourth directional illuminations. The image data for display is generated on the basis of the combined pluralities of original image data. However, the present invention is not limited to this. The image data for display may be generated first on the basis of the pluralities of original image data in every light reception time of the imaging section 132. The image data for display generated in every light reception time of the imaging section 132 may be combined such that the dynamic range is adjusted.

(b) Example of the DR Adjustment Processing

The system program stored in the storing section 420 shown in FIG. 2 includes a DR adjustment program. The control section 410 shown in FIG. 2 performs the DR adjustment processing by executing the DR adjustment program.

Figure 31:
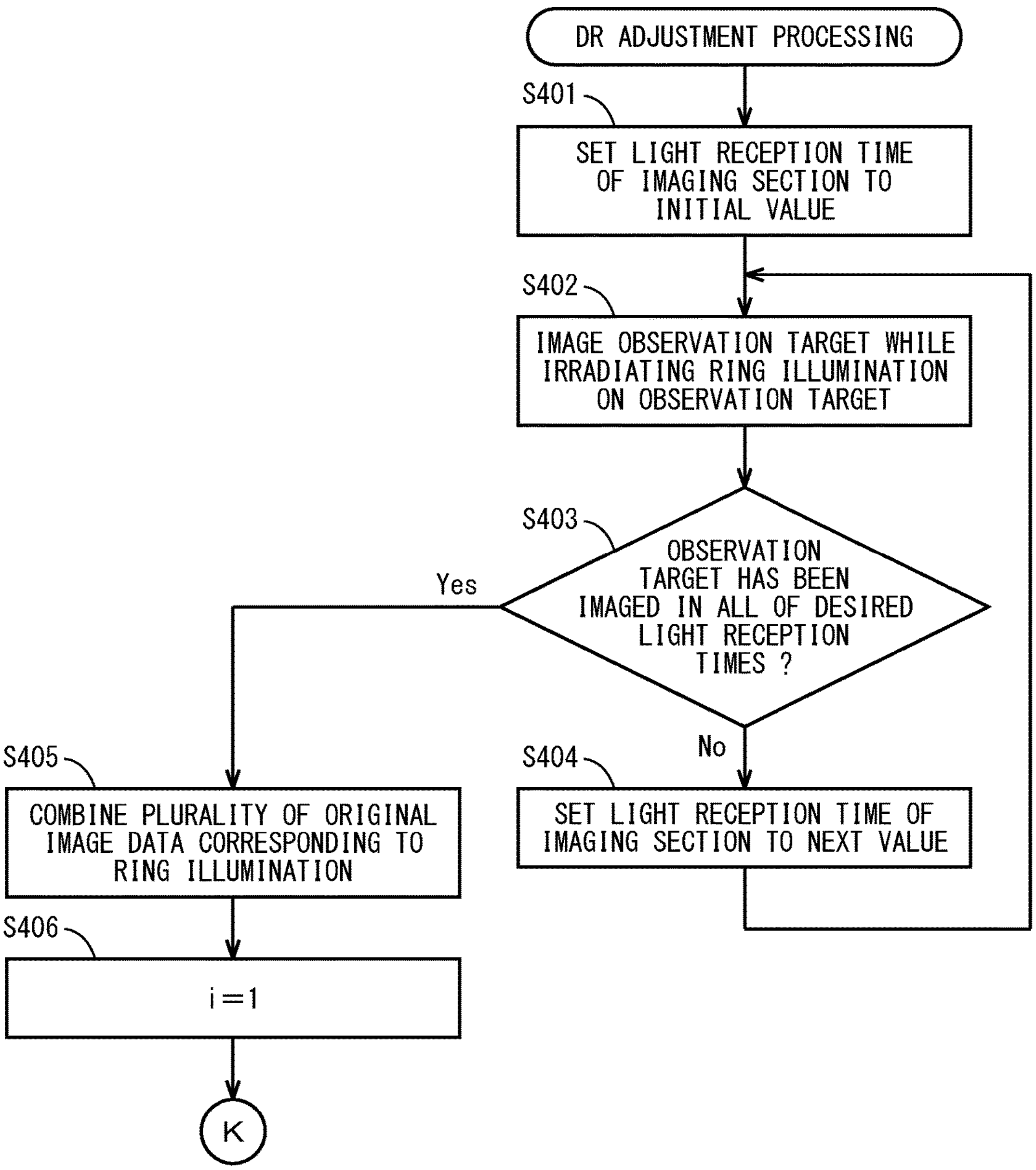
FIG. 31 is a flowchart for explaining an example of DR adjustment processing.
Figure 32:
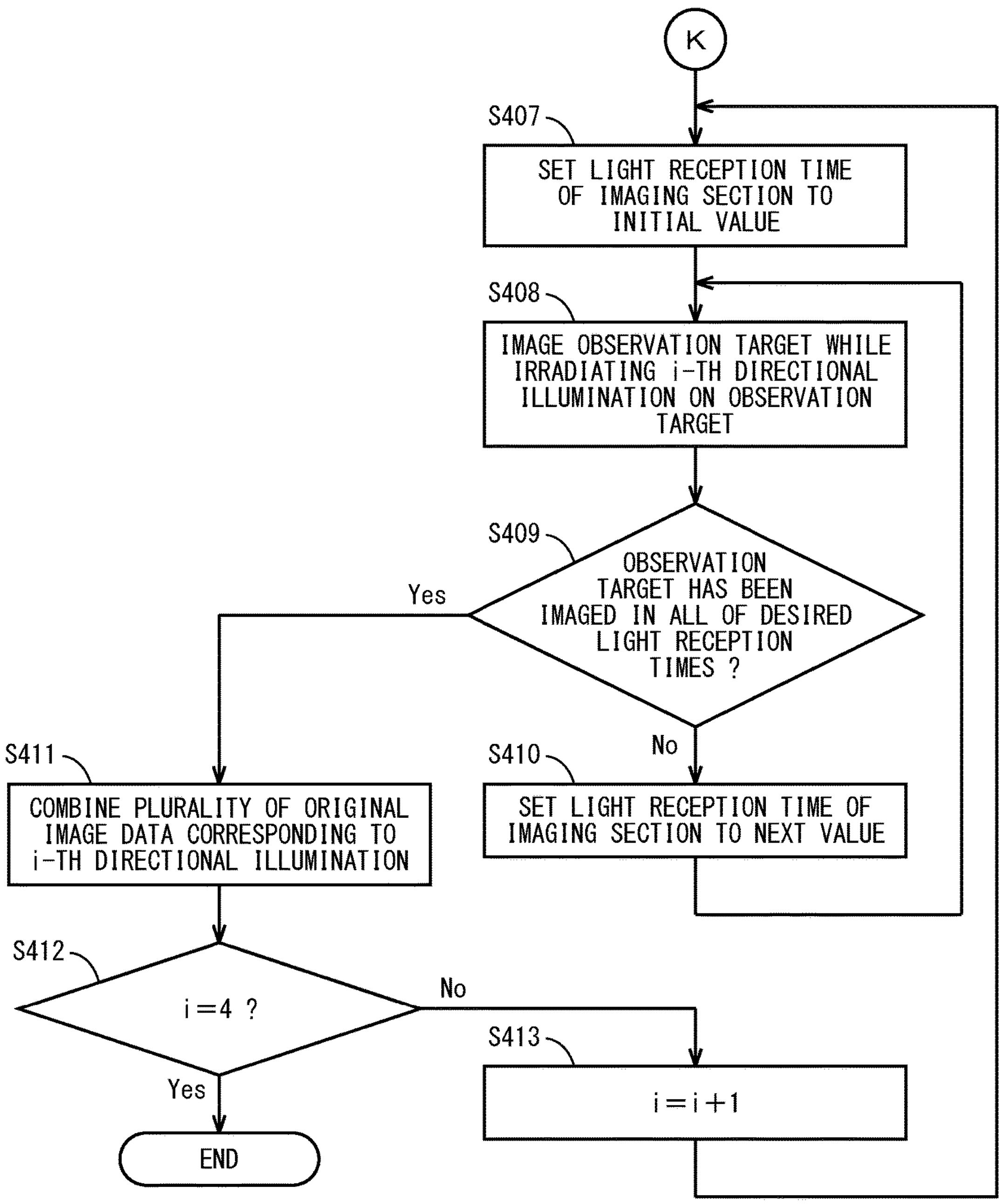
FIG. 32 is a flowchart for explaining the example of the DR adjustment processing.

FIGS. 31 and 32 are flowcharts for explaining an example of the DR adjustment processing. The control section 410 sets the light reception time of the imaging section 132 to an initial value decided in advance (step S401). In this state, the control section 410 irradiates the ring illumination on the observation target S with the light projecting section 140 and images the observation target S with the imaging section 132 (step S402). Subsequently, the control section 410 determines whether the observation target S has been imaged in all of desired light reception times of the imaging section 132 in a state in which the ring illumination is irradiated (step S403).

If the observation target S has been imaged in not all of the desired light reception times of the imaging section 132 in step S403, the control section 410 sets the light reception time of the imaging section 132 to the next value decided in advance (step S404). Thereafter, the control section 410 returns to the processing in step S402. The control section 410 repeats the processing in steps S402 to S404 until the observation target S is imaged in all of the desired light reception times of the imaging section 132.

If the observation target S has been imaged in all of the desired light reception times of the imaging section 132 in step S403, the control section 410 combines a generated plurality of original image data corresponding to the ring illumination (step S405). Consequently, a dynamic range of the original image data corresponding to the ring illumination is adjusted.

Thereafter, the control section 410 sets i to 1 (step S406). In this step, i indicates numbers of a plurality of directional illuminations. Subsequently, the control section 410 sets the light reception time of the imaging section 132 to an initial value decided in advance (step S407). In this state, the control section 410 irradiates the i-th directional illumination on the observation target S with the light projecting section 140 and images the observation target S with the imaging section 132 (step S408). Subsequently, the control section 410 determines whether the observation target S has been imaged in all of the desired light reception times of the imaging section 132 in a state in which the i-th directional illumination is irradiated (step S409).

If the observation target S has been imaged in not all of the desired light reception times of the imaging section 132 in step S409, the control section 410 sets the light reception time of the imaging section 132 to the next value decided in advance (step S410). Thereafter, the control section 410 returns to the processing in step S408. The control section 410 repeats the processing in steps S408 to S410 until the observation target S is imaged in all of the desired light reception times of the imaging section 132.

If the observation target S has been imaged in all of the desired light reception times of the imaging section 132 in step S409, the control section 410 combines a generated plurality of original image data corresponding to the i-th directional illumination (step S411). Consequently, a dynamic range of the original image data corresponding to the i-th directional illumination is adjusted.

Subsequently, the control section 410 determines whether i is 4 (step S412). If i is not 4 in step S412, the control section 410 updates i to i+1 (step S413). Thereafter, the control section 410 returns to the processing in step S407. The control section 410 repeats the processing in steps S407 to S413 until i reaches 4. Consequently, pluralities of original image data corresponding to the respective first to fourth directional illuminations are generated and combined to adjust a dynamic range. If i is 4 in step S412, the control section 410 ends the processing.

In the above explanation, a part of the processing may be performed at another point in time. For example, the processing in step S405 may be executed in parallel to the processing in steps S406 to S413. The processing in step S411 corresponding to the i-th directional illumination may be executed in parallel to steps S407 to S410 corresponding to the (i+1)-th directional illumination. In these cases, it is possible to increase the speed of the DR adjustment processing.

Alternatively, the processing in steps S401 to S405 may be executed later than the processing in steps S406 to S413. The processing in step S411 corresponding to the i-th directional illumination may be executed later than the processing insteps S407 to S410 corresponding to the (i+1)-th directional illumination.

(c) Another Example of the DR Adjustment Processing.

Figure 33:
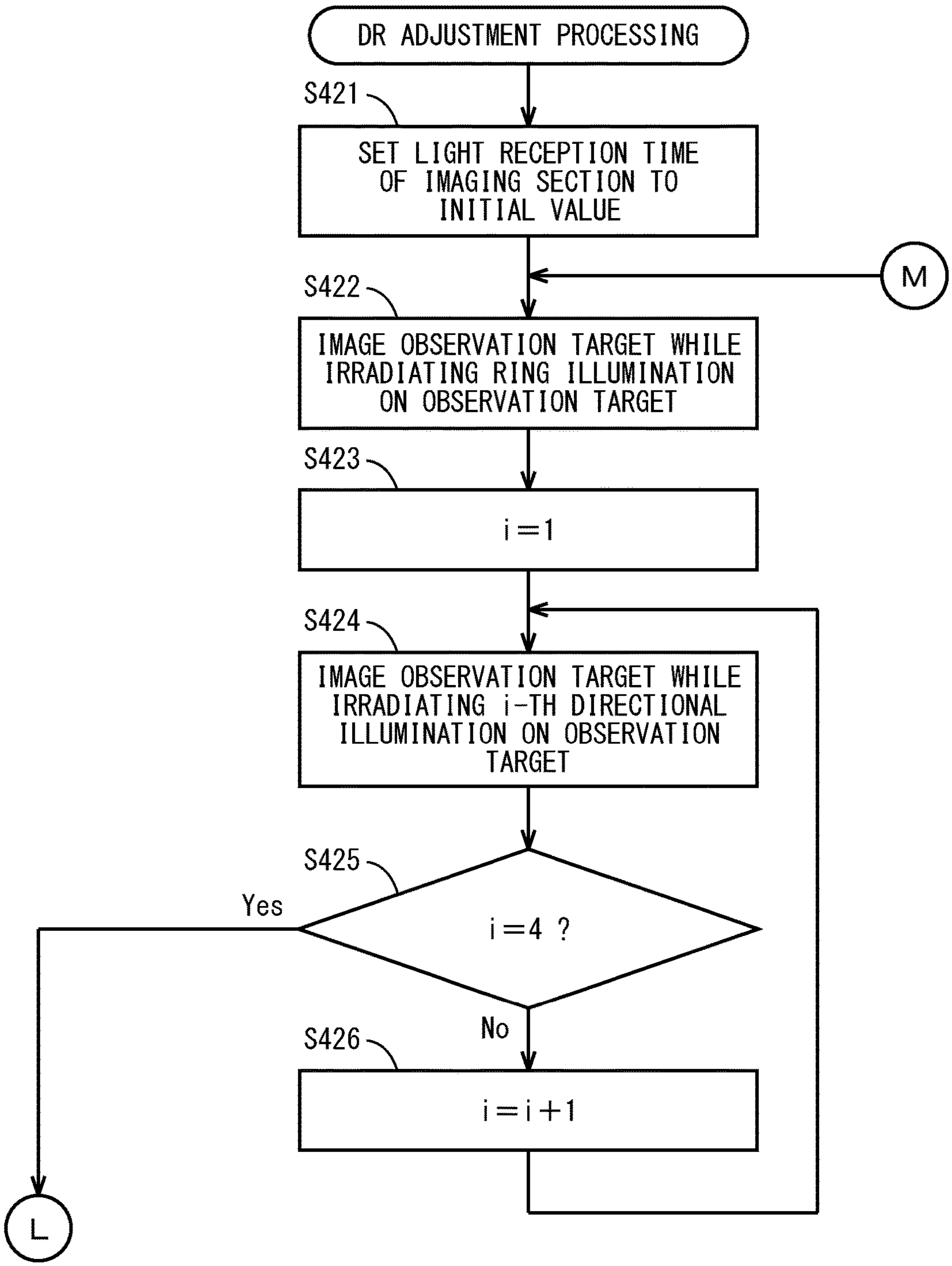
FIG. 33 is a flowchart for explaining another example of the DR adjustment processing.
Figure 34:
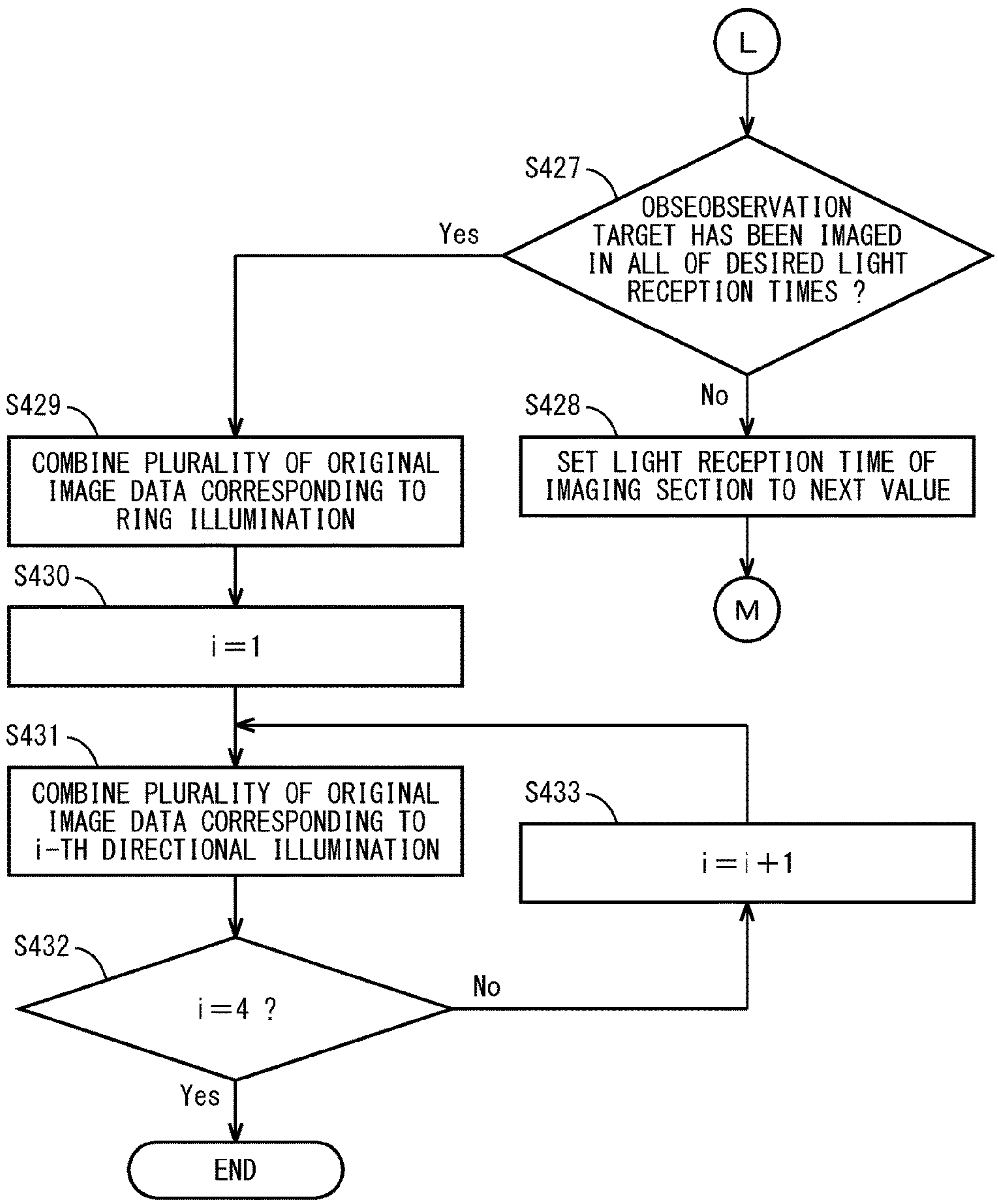
FIG. 34 is a flowchart for explaining the other example of the DR adjustment processing.

FIGS. 33 and 34 are flowcharts for explaining another example of the DR adjustment processing. The control section 410 sets the light reception time of the imaging section 132 to an initial value decided in advance (step S421). In this state, the control section 410 irradiates the ring illumination on the observation target S with the light projecting section 140 and images the observation target S with the imaging section 132 (step S422).

Subsequently, the control section 410 sets i to 1 (step S423). In this step, i indicates numbers of a plurality of directional illuminations. Thereafter, the control section 410 irradiates the i-th directional illumination on the observation target S with the light projecting section 140 and images the observation target S with the imaging section 132 (step S424).

Subsequently, the control section 410 determines whether i is 4 (step S425). If i is not 4 in step S425, the control section 410 updates i to i+1 (step S426). Thereafter, the control section 410 returns to the processing in step S424. The control section 410 repeats the processing in steps S424 to S426 until i reaches 4. Consequently, pluralities of original image data corresponding to the respective first to fourth directional illuminations are generated. Subsequently, the control section 410 determines whether the observation target S has been imaged in all of the desired light reception times of the imaging section 132 (step S427).

If the observation target S has been imaged in not all of the desired light reception times of the imaging section 132 in step S427, the control section 410 sets the light reception time of the imaging section 132 to the next value decided in advance (step S428). Thereafter, the control section 410 returns to the processing in step S422. The control section 410 repeats the processing in steps S422 to S428 until the observation target S is imaged in all of the desired light reception time of the imaging section 132.

If the observation target S has been imaged in all of the desired light reception times of the imaging section 132 in step S427, the control section 410 combines a generated plurality of original image data corresponding to the ring illumination to adjust a dynamic range (step S429). Consequently, a dynamic range of the original image data corresponding to the ring illumination is adjusted.

Thereafter, the control section 410 sets i to 1 again (step S430). Subsequently, the control section 410 combines a generated plurality of original image data corresponding to the i-th directional illumination (step S431). Consequently, a dynamic range of the original image data corresponding to the i-th directional illumination is adjusted. Subsequently, the control section 410 determines whether i is 4 (step S432).

If i is not 4 in step S432, the control section 410 updates i to i+1 (step S433). Thereafter, the control section 410 returns to the processing in step S431. The control section 410 repeats the processing in steps S431 to S433 until i reaches 4. Consequently, the pluralities of original image data corresponding to the respective first to fourth directional illuminations are combined to adjust a dynamic range. If i is 4 in step S432, the control section 410 ends the processing.

In the above explanation, a part of the processing may be performed at another point in time. For example, a part of the processing in steps S429 to S433 may be performed in parallel to the processing in steps S421 to S428. In this case, it is possible to increase the speed of the DR adjustment processing. The processing in step S422 may be executed later than the processing in steps S423 to S426. Further, the processing in step S429 may be executed later than the processing in steps S430 to S433.

(5) Connection Processing (a) Processing Content

The surface of the observation target S, original image data of which is generated by imaging performed by the imaging section 132 shown in FIG. 1 once, is referred to as unit region. The observation target S is imaged while the stage 121 shown in FIG. 1 is moved in the X direction or the Y direction, whereby a plurality of original image data adjacent to one another in the X direction or the Y direction are generated by the imaging section 132. The data generating section 610 shown in FIG. 9 can generate connected image data indicating a region of the observation target S larger than the unit region by connecting the plurality of original image data adjacent to one another.

Figure 35A:
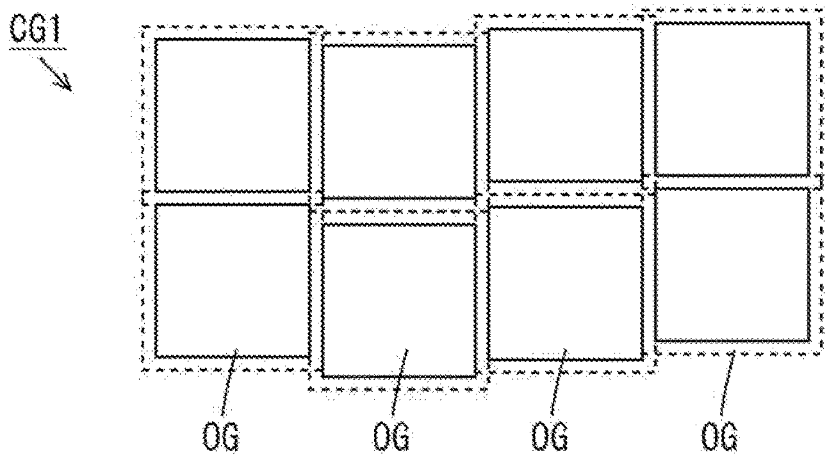
FIGS. 35A to 35C are diagrams visually showing connected image data.
Figure 35B:
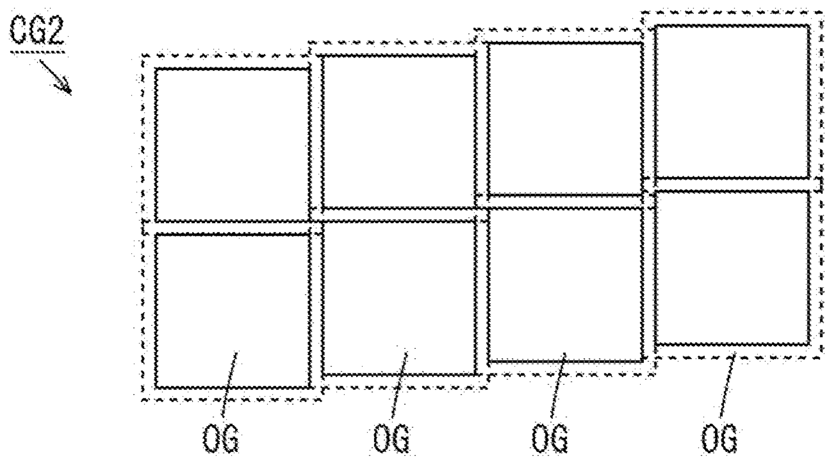
Figure 35C:
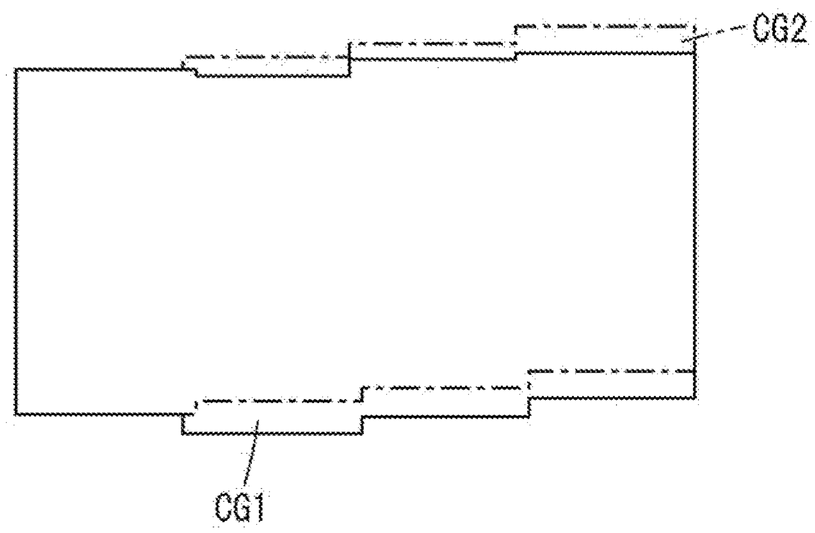

FIGS. 35A to 35C are diagrams visually showing the connected image data. Connected image data respectively corresponding to the ring illumination and the plurality of directional illuminations are generated. FIGS. 35A and 35B show connected image data CG1 and CG2 respectively corresponding to any two illuminations among the ring illumination and the plurality of directional illuminations. The connected image data CG1 and CG2 are generated by connecting pluralities of original image data OG adjacent to one another. Overlapping portions serving as overlap widths are provided in the original image data OG adjacent to one another. In FIGS. 35A and 35B, the overlapping portion is indicated by a dotted line.

It is possible to generate image data for display by combining the pluralities of connected image data including the connected image data CG1 and CG2. An irradiating position of illumination and an overlapping portion are sometimes different for each of the connected image data. In this case, as shown in FIG. 35C, the sizes of a plurality of connected image data do not coincide with one another. In FIG. 35C, the connected image data CG1 and CG2 are respectively indicated by a solid line and an alternate long and short dash line. In such a case, it is difficult to accurately generate image data for display. In order to prevent the difficulty, in this embodiment, connection processing explained below is executed.

The user can give an instruction for the connection processing to the arithmetic processing section 600 by operating the connection button b3 shown in FIG. 12 using the console 440A shown in FIG. 8.

FIGS. 36A to 36E are diagrams for explaining the connection processing. As shown in FIGS. 36A to 36D, the stage 121 is sequentially moved in the X direction while the ring illumination is irradiated on the observation target S. The movement of the stage 121 is repeated until all of desired regions of the observation target S are imaged. In this state, original image data OG1, OG2, OG3, and OG4 are sequentially generated by the imaging section 132. In an example shown in FIGS. 36A to 36E, the original image data OG1, OG2, OG3, and OG4 are respectively indicated by a solid line, an alternate long and short dash line, a dotted line, and an alternate long and two short dashes line.

The stage 121 is moved such that parts of the original image data OG1 to OG4 adjacent to one another overlap one another. In the example shown in FIGS. 36A to 36E, overlapping portions OL1, OL2, and OL3 are respectively formed between the original image data OG1 and OG2, between the original image data OG2 and OG3, and between the original image data OG3 and OG4. The overlapping portions OL1 to OL3 serve as overlap widths in connecting the original image data OG1 to OG4 adjacent to one another.

Figure 36A:
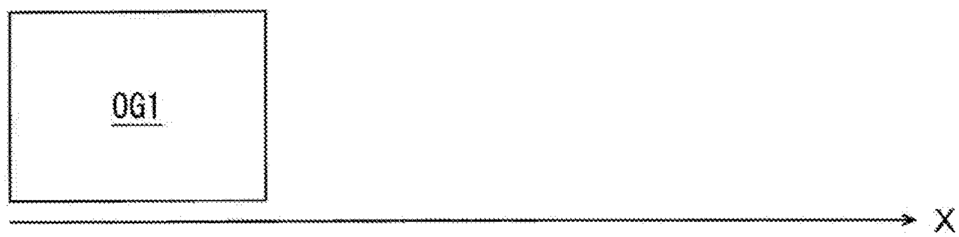
FIGS. 36A to 36E are diagrams for explaining connection processing.
Figure 36B:
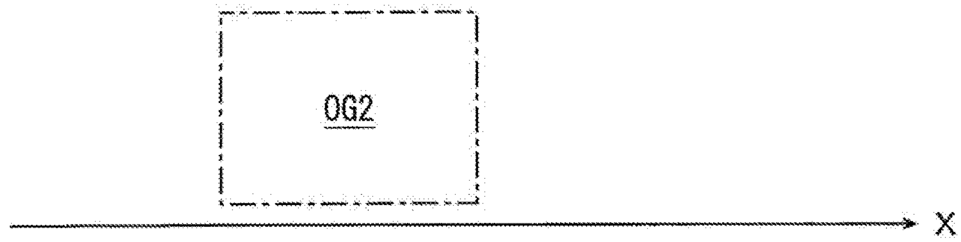
Figure 36C:
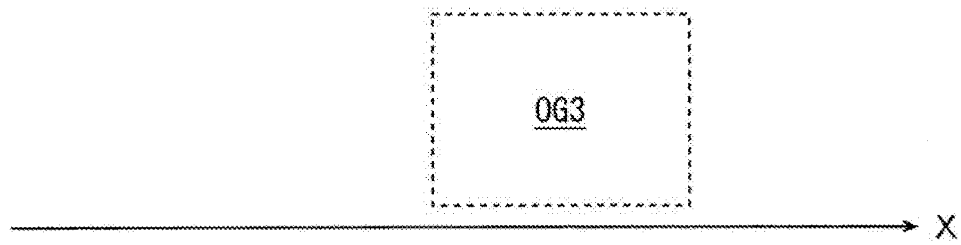
Figure 36D:
Figure 36E:
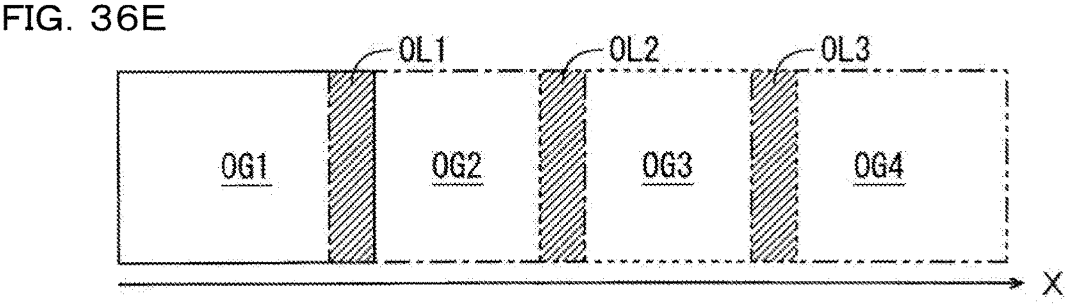

Positions of the stage 121 at the time when the original image data OG1 to OG4 are generated are calculated by the position calculating section 632 shown in FIG. 9. Position information indicating the positions is stored in the storing section 420 shown in FIG. 2. Overlapping region information indicating the overlapping portions OL1 to OL3 among the original image data OG1 to OG4 is stored in the storing section 420. The data generating section 610 shown in FIG. 9 connects the adjacent original image data OG1 to OG4 as shown in FIG. 36E by performing pattern matching concerning the overlapping portions OL1 to OL3. Consequently, the original image data OG1 to OG4 are connected at high accuracy.

Similarly, the stage 121 is sequentially moved in the X direction while the directional illuminations are irradiated on the observation target S. In this state, a plurality of original image data adjacent to one another in the X direction are sequentially generated by the imaging section 132. The data generating section 610 corrects the positions of the generated original image data on the basis of the position information and the overlapping region information stored in the storing section 420 and connects the original image data adjacent to one another after the correction.

With this procedure of the connection processing, it is possible to connect, at high accuracy, the original image data adjacent to one another corresponding to the directional illuminations without performing the pattern matching. Since it is unnecessary to perform the pattern matching, it is possible to increase the speed of the connection processing. Further, the sizes of the image data after the connection corresponding to the directional illuminations coincide with the sizes of the image data after the connection corresponding to the ring illumination. Consequently, it is possible to easily generate image data for display indicating a region of the observation target S larger than the unit region using a plurality of image data after the connection.

In the connection processing, the plurality of image data after the connection are generated first. The image data for display indicating the region of the observation target S larger than the unit region is generated using the generated plurality of image data after the connection. However, the present invention is not limited to this. Image data for display in a plurality of positions of the stage 121 may be generated first. The image data for display indicating the region of the observation target S larger than the unit region may be generated by connecting the generated plurality of image data for display. In this case, a plurality of image data for display are desirably connected using the pattern matching. The plurality of image data for display are desirably connected using overlapping region information at the time when the ring illumination is emitted.

(b) Example of the Connection Processing

The system program stored in the storing section 420 shown in FIG. 2 includes a connection program. The control section 410 shown in FIG. 2 performs the connection processing by executing the connection program.

Figure 37:
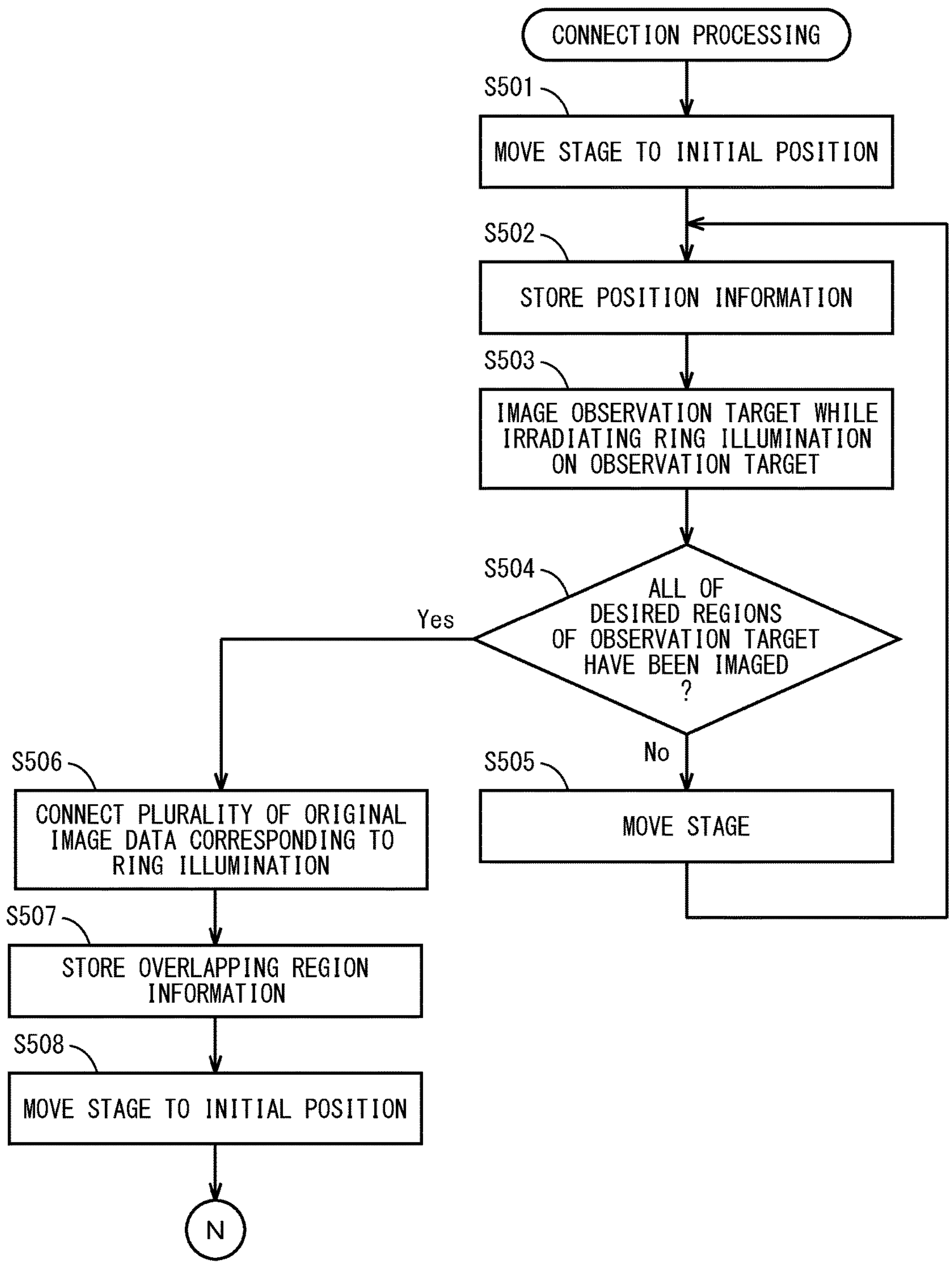
FIG. 37 is a flowchart for explaining an example of the connection processing.
Figure 38:
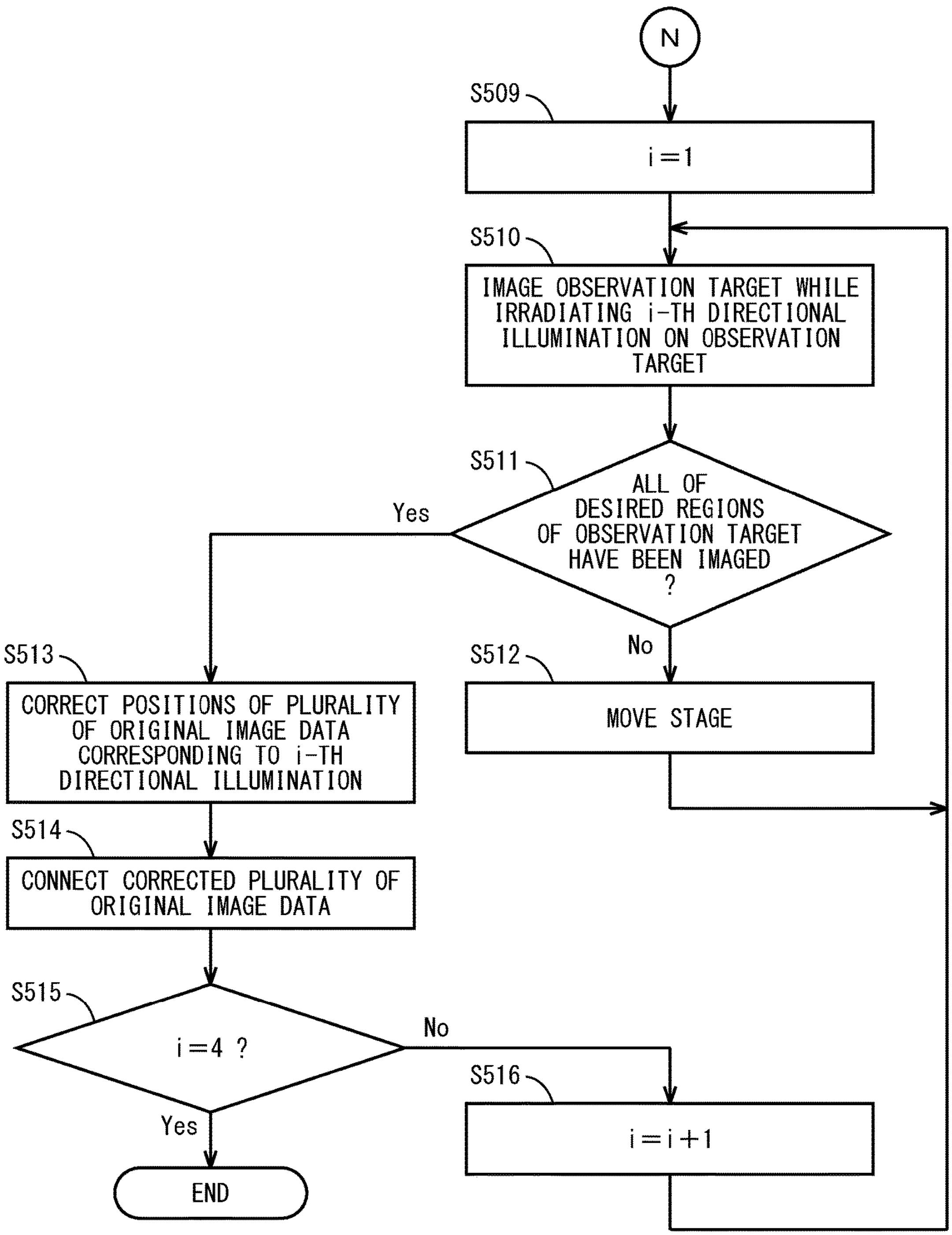
FIG. 38 is a flowchart for explaining the example of the connection processing.

FIGS. 37 and 38 are flowcharts for explaining an example of the connection processing. The control section 410 moves the stage 121 to an initial position (step S501). The control section 410 calculates a position of the stage 121 after the movement and causes the storing section 420 to store position information indicating the position (step S502). Subsequently, the control section 410 irradiates the ring illumination on the observation target S with the light projecting section 140 and images the observation target S with the imaging section 132 (step S503). Subsequently, the control section 410 determines whether all of the desired regions of the observation target S have been imaged in a state in which the ring illumination is irradiated (step S504).

If not all of the desired regions of the observation target S have been imaged in step S504, the control section 410 moves the stage 121 by a predetermined amount (step S505). Thereafter, the control section 410 returns to the processing in step S502. The control section 410 repeats the processing in steps S502 to S505 until all of the desired regions of the observation target S are imaged.

If all of the desired regions of the observation target S have been imaged in step S504, the control section 410 connects a generated plurality of original image data corresponding to the ring illumination (step S506). The control section 410 causes the storing section 420 to store overlapping region information indicating overlapping regions at the time when the original image data adjacent to one another are connected (step S507).

Thereafter, the control section 410 moves the stage 121 to the initial position (step S508). Subsequently, the control section 410 sets i to 1 (step S509). In this step, i indicates numbers of a plurality of directional illuminations. Subsequently, the control section 410 irradiates the i-th directional illumination on the observation target S with the light projecting section 140 and images the observation target S with the imaging section 132 (step S510). Subsequently, the control section 410 determines whether all of the desired regions of the observation target S have been imaged in a state in which the i-th directional illumination is irradiated (step S511).

If not all of the desired regions of the observation target S have been imaged in step S511, the control section 410 moves the stage 121 by a predetermined amount (step S512). Thereafter, the control section 410 returns to the processing in step S510. The control section 410 repeats the processing in steps S510 to S512 until all of the desired regions of the observation target S are imaged.

If all of the desired regions of the observation target S have been imaged in step S511, the control section 410 corrects the positions of a generated plurality of original image data corresponding to the i-th directional illumination on the basis of the position information and the overlapping region information stored in the storing section 420 (step S513). The control section 410 connects the corrected plurality of original image data (step S514).

Subsequently, the control section 410 determines whether i is 4 (step S515). If i is not 4 in step S515, the control section 410 updates i to i+1 (step S516). Thereafter, the control section 410 returns to the processing in step S510. The control section 410 repeats the processing in steps S510 to S516 until i reaches 4. Consequently, a plurality of original image data corresponding to the respective first to fourth directional illuminations are generated. The plurality of original image data are connected on the basis of the position information and the overlapping region information stored in the storing section 420. If i is 4 in step S515, the control section 410 ends the processing.

In the above explanation, a part of the processing may be performed at another point in time. For example, the processing in steps S506 and S507 may be executed in parallel to steps S508 to S512. The processing in steps S513 and S514 corresponding to the i-th directional illumination may be executed in parallel to steps S510 to S512 corresponding to the (i+1)-th directional illumination. In these cases, it is possible to increase the speed of the connection processing.

Alternatively, the processing in steps S506 and S507 may be executed later than the processing in steps S508 to S512. The processing insteps S513 and S514 corresponding to the i-th directional illumination may be executed later than the processing in steps S510 to S512 corresponding to the (i+1)-th directional illumination.

(c) Another Example of the Connection Processing

Figure 39:
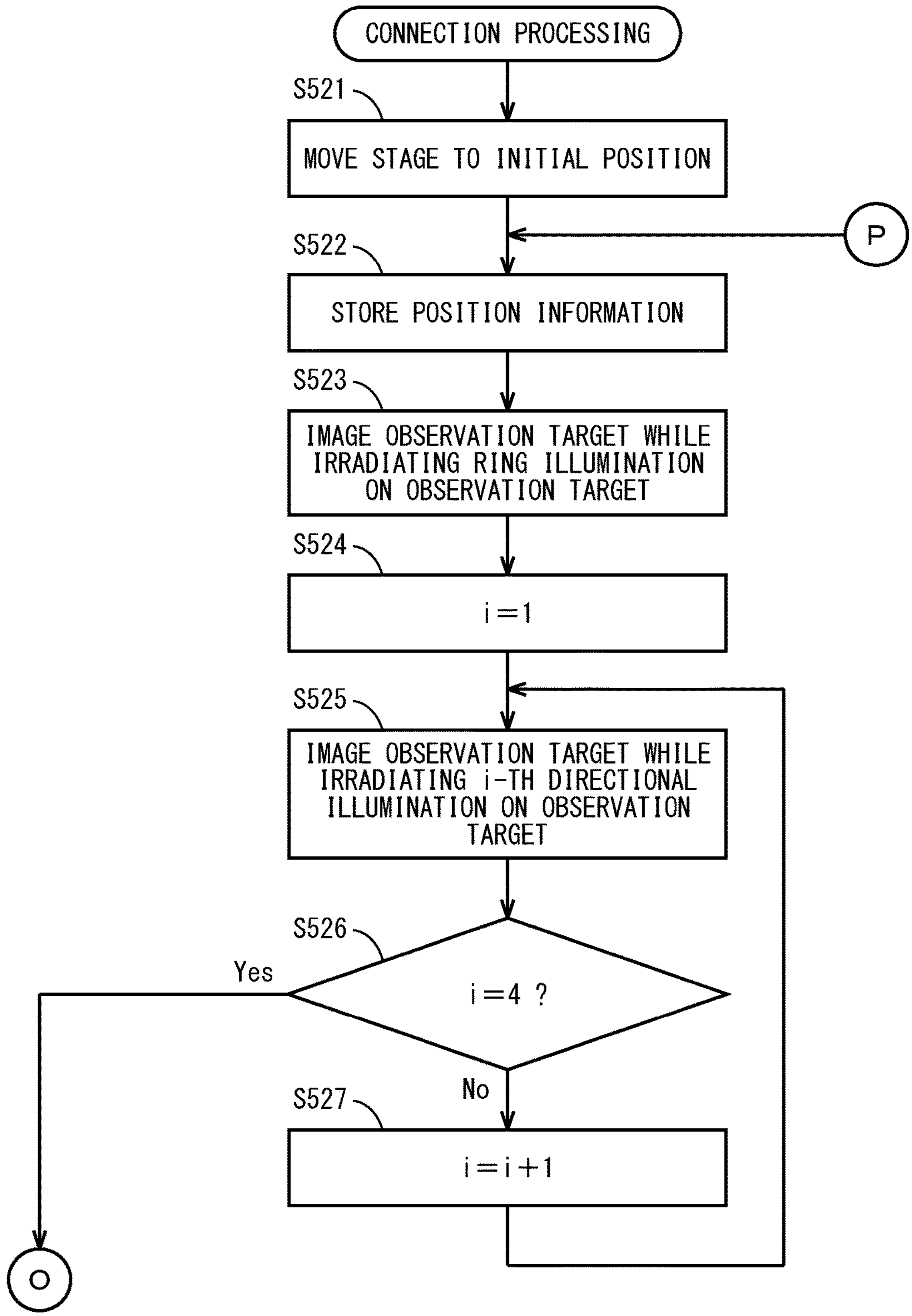
FIG. 39 is a flowchart for explaining another example of the connection processing.
Figure 40:
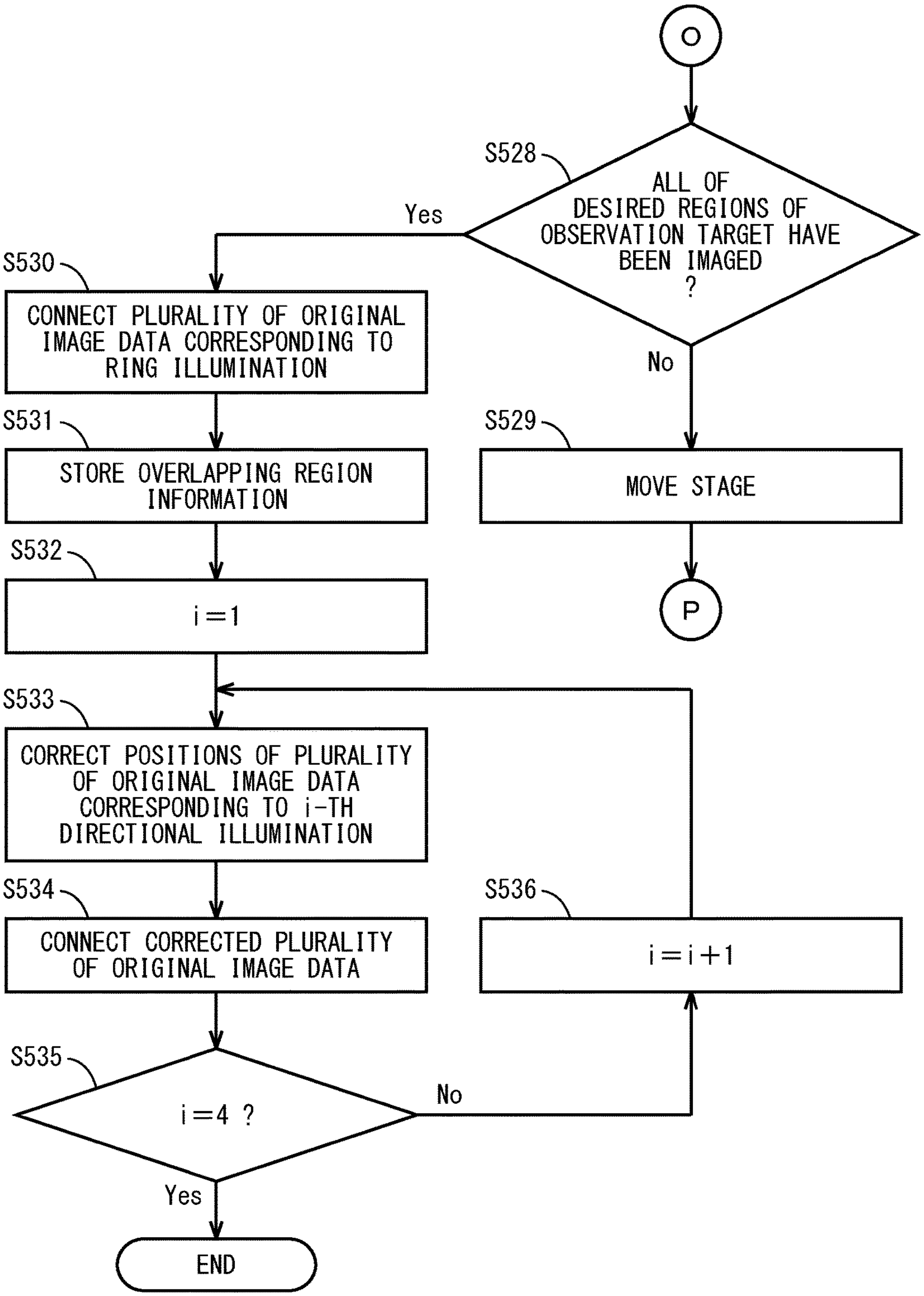
FIG. 40 is a flowchart for explaining the other example of the connection processing.

FIGS. 39 and 40 are flowcharts for explaining another example of the connection processing. The control section 410 moves the stage 121 to the initial position (step S521). The control section 410 calculates a position of the stage 121 after the movement and causes the storing section 420 to store position information indicating the position (step S522). Subsequently, the control section 410 irradiates the ring illumination on the observation target S with the light projecting section 140 and images the observation target S with the imaging section 132 (step S523).

Subsequently, the control section 410 sets i to 1 (step S524). In this step, i indicates numbers of a plurality of directional illuminations. Thereafter, the control section 410 irradiates the i-th directional illumination on the observation target S with the light projecting section 140 and images the observation target S with the imaging section 132 (step S525). Subsequently, the control section 410 determines whether i is 4 (step S526).

If i is not 4 in step S526, the control section 410 updates i to i+1 (step S527). Thereafter, the control section 410 returns to the processing in step S525. The control section 410 repeats the processing in steps S525 to S527 until i becomes 4. Consequently, pluralities of original image data corresponding to the respective first to fourth directional illuminations are generated. If i is 4 in step S526, the control section 410 determines whether all of the desired regions of the observation target S have been imaged (step S528).

If not all of the desired regions of the observation target S have been imaged in step S528, the control section 410 moves the stage 121 by a predetermined amount (step S529). Thereafter, the control section 410 returns to the processing in step S522. The control section 410 repeats the processing in steps S522 to S528 until all of the desired regions of the observation target S are imaged.

If all of the desired regions of the observation target S have been imaged in step S528, the control section 410 connects a generated plurality of original image data corresponding to the ring illumination (step S530). The control section 410 causes the storing section 420 to store overlapping region information indicating overlapping regions at the time when the original image data adjacent to one another are connected (step S531).

Subsequently, the control section 410 sets i to 1 again (step S532). Thereafter, the control section 410 corrects the positions of a generated plurality of original image data corresponding to the i-th directional illumination on the basis of the position information and the overlapping region information stored in the storing section 420 (step S533). The control section 410 connects the corrected plurality of original image data (step S534). Subsequently, the control section 410 determines whether i is 4 (step S535).

If i is not 4 in step S535, the control section 410 updates i to i+1 (step S536). Thereafter, the control section 410 returns to the processing in step S533. The control section 410 repeats the processing in steps S533 to S536 until i reaches 4. Consequently, pluralities of original image data corresponding to the respective first to forth directional illuminations are connected on the basis of the position information and the overlapping region information stored in the storing section 420. If i is 4 in step S535, the control section 410 ends the processing.

In the above explanation, a part of the processing may be performed at another point in time. For example, a part of the processing in steps S530 to S536 may be executed in parallel to the processing in steps S521 to S529. In this case, it is possible to increase the speed of the connection processing. The processing in step S523 may be executed later than the processing in steps S524 to S527.

(6) Effect

In the magnifying observation apparatus 1 according to this embodiment, the plurality of original image data respectively corresponding to the ring illumination and the first to fourth directional illuminations are generated by the plural illumination imaging processing. In the image-for-display generation processing, the imaginary emitting direction of light is designated by the light icon ss1 on the display section 430 on the basis of the operation of the operation section 440 by the user. The image data for display indicating the image SI of the observation target S that should be obtained when it is assumed that the light in the designated emitting direction is irradiated on the observation target S is generated on the basis of the designated emitting direction and the plurality of original image data. The image SI based on the generated image data for display is displayed on the display section 430.

Therefore, by optionally designating the imaginary emitting direction of light, the user can generate, without changing the emitting direction of light actually irradiated on the observation target S, image data for display indicating the image SI at the time when light in an appropriate emitting direction corresponding to the shape and the material of the observation target S is irradiated on the observation target S. Consequently, the user can easily acquire the image SI of the observation target S corresponding to a request of the user.

The image data for display can be generated using an already generated plurality of image data. Therefore, it is unnecessary to perform the imaging of the observation target S again. Therefore, it is possible to reduce a burden on the user.

In the image-for-display generation processing, when the designated emitting direction is not the ring emitting direction or all of the first to fourth emitting directions, combination rates are calculated concerning the plurality of original image data. The plurality of original image data are combined on the basis of the combination rates. Consequently, it is possible to easily generate image data for display corresponding to the designated emitting direction.

[2] Second Embodiment

Figure 41:
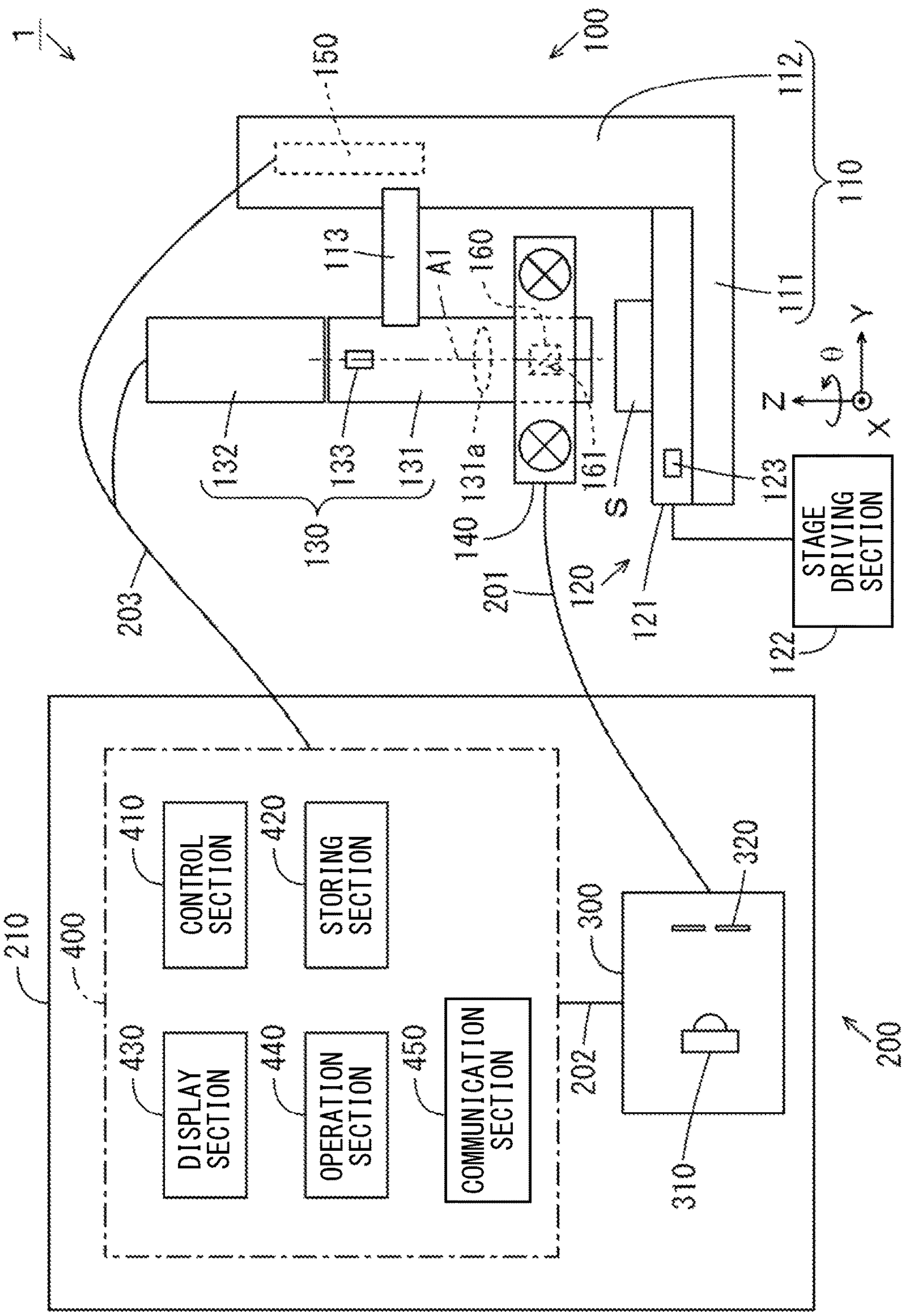
FIG. 41 is a schematic diagram showing the configuration of a magnifying observation apparatus according to a second embodiment of the present invention.

Concerning a magnifying observation apparatus according to a second embodiment of the present invention, differences from the magnifying observation apparatus 1 according to the first embodiment are explained. FIG. 41 is a schematic diagram showing the configuration of the magnifying observation apparatus according to the second embodiment of the present invention. As shown in FIG. 41, in the magnifying observation apparatus 1 according to this embodiment, the measurement head 100 further includes a light projecting section 160. The light projecting section 160 includes a half mirror 161.

The lens unit 131 is configured to be capable of holding the light projecting section 160 on the inside. The light projecting section 160 is disposed in the lens unit 131 in a state in which the light projecting section 160 is inclined at approximately 45° with respect to the optical axis A1 of the objective lens 131*a* such that a reflection surface of the half mirror 161 faces obliquely downward. The light projecting section 160 is optically connected to the light generating section 300 of the processing device 200 by a part of not-shown optical fibers of the fiber unit 201.

The light blocking section 320 of the light generating section 300 includes a plurality of opening patterns respectively corresponding to the regions 140A to 140D of the light projecting section 140 shown in FIGS. 3A and 3B and includes an opening pattern corresponding to the light projecting section 160. The light-projection control section 510 shown in FIG. 2 is capable of making light incident on the light projecting section 140 as in the first embodiment by switching the opening pattern of the light blocking section 320 that causes the light to pass. The light-projection control section 510 is also capable of making the light incident on the light projecting section 160. Behavior of the light made incident on the light projecting section 140 is the same as behavior of the light made incident on the light projecting section 140 in the first embodiment.

The light made incident on the light projecting section 160 is reflected by the half mirror 161 to be emitted downward along the optical axis A1 of the objective lens 131*a* and irradiated on the observation target S. The light emitted from the light projecting section 160 is referred to as coaxial epi-illumination. The light irradiated on the observation target S is reflected upward, transmitted through the half mirror 161 of the light projecting section 160 and the lens unit 131, and guided to the imaging section 132.

With the configuration explained above, the light projecting section 160 is capable of irradiating the light on the observation target S from a position closer to the optical axis A1 of the objective lens 131*a* than the light projecting section 140. Therefore, the coaxial epi-illumination is bright field illumination emitted in a direction parallel to the optical axis A1 of the objective lens 131*a*. The ring illumination is dark field illumination irradiated in a direction inclined with respect to the optical axis A1 of the objective lens 131*a*. By irradiating the coaxial epi-illumination on the observation target S, it is possible to more clearly image unevenness on the surface of the observation target S and a difference of a material. Note that it is also possible to simultaneously irradiate lights on the observation target S from the light projecting sections 140 and 160.

The imaging control section 520 shown in FIG. 2 controls a light reception time, a gain, timing, and the like of the imaging section 132 during the irradiation of the coaxial epi-illumination. In this embodiment, the irradiation of the coaxial epi-illumination is performed later than the irradiation of the ring illumination and the first to fourth directional illuminations. The imaging control section 520 performs automatic exposure on the basis of an average brightness value of original image data corresponding to the ring illumination generated earlier to thereby adjust the light reception time during the irradiation of the coaxial epi-illumination. The light reception time during the irradiation of the coaxial epi-illumination may be adjusted to a desired value by the user.

The imaging section 132 further generates original image data indicating the observation target S at the time when the coaxial epi-illumination is irradiated on the observation target S. The generated original image data corresponding to the coaxial epi-illumination is stored in the storing section 420. Imaging information further indicating presence or absence of execution of the irradiation of the coaxial epi-illumination and imaging conditions such as a light reception time during the irradiation of the coaxial epi-illumination is stored in the storing section 420.

The data generating section 610 shown in FIG. 9 generates image data for display further on the basis of the original image data corresponding to the coaxial epi-illumination in addition to the original image data respectively corresponding to the ring illumination and the directional illuminations stored in the storing section 420. Specifically, the data generating section 610 combines, at rates decided by illumination conditions designated by the user, a part or all of the plurality of original image data respectively corresponding to the ring illumination, the directional illuminations, and the coaxial epi-illumination. The generated image data for display is stored in the storing section 420.

In the plural illumination imaging processing according to this embodiment, the observation target S is imaged using the coaxial epi-illumination after the imaging of the observation target S performed using the ring illumination and the first to fourth directional illuminations. Consequently, a plurality of (in this example, six) original image data respectively corresponding to the ring illumination, the first to fourth directional illuminations, and the coaxial epi-illumination are generated.

Figure 42:
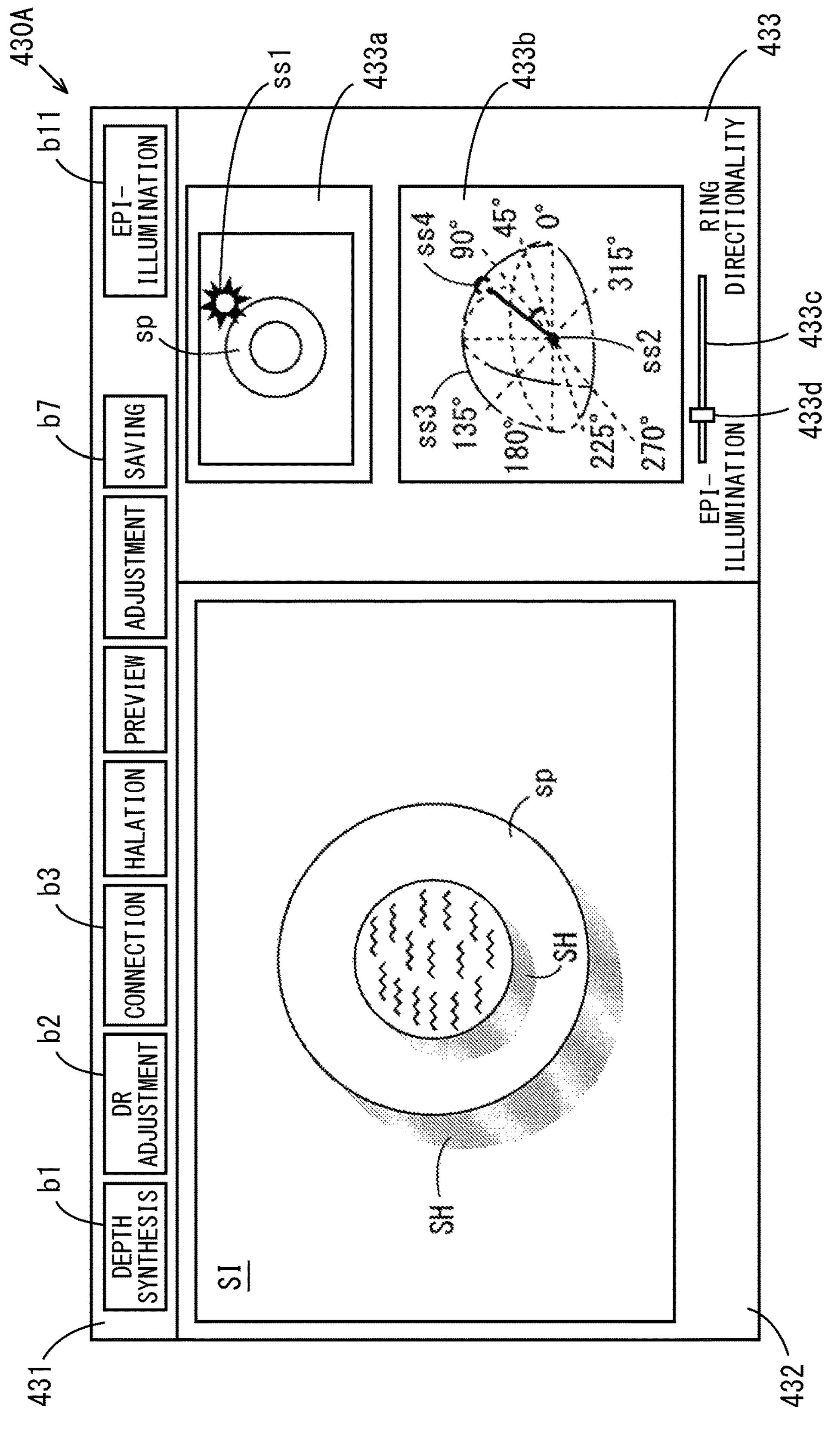
FIG. 42 is a diagram showing a display example of an observation screen after plural illumination imaging processing according to the second embodiment.

When the plural illumination imaging processing is completed, the observation screen 430A is displayed on the display section 430. FIG. 42 is a diagram showing a display example of the observation screen 430A after the plural illumination imaging processing according to the second embodiment. As shown in FIG. 42, an epi-illumination button b11 is displayed in the function display region 431 in addition to the plurality of buttons b1 to b3 and b7 explained above.

The user operates the epi-illumination button b11 using the console 440A shown in FIG. 8. Consequently, the user can instruct that image data for display should be generated using the original image data corresponding to the coaxial epi-illumination.

When it is instructed that the original image data corresponding to the coaxial epi-illumination is used, a bar 433*c* and a slider 433*d* for designating a combination rate of the original image data corresponding to the coaxial epi-illumination to the other original image data (hereinafter referred to as epi-illumination image rate) are displayed in the sub-display region 433.

The user can designate the epi-illumination image rate by operating the slider 433*d*. In the example shown in FIG. 42, the epi-illumination image rate is designated higher as the slider 433*d* is closer to the left end of the bar 433*c*. The epi-illumination image rate is designated lower as the slider 433*d* is closer to the right end of the bar 433*c*.

When the epi-illumination image rate is designated, in the processing in step S209 in FIG. 22 in the image-for-display generation processing, the control section 410 calculates combination rates of the plurality of original image data on the basis of the designated epi-illumination image rate in addition to the designated emitting direction.

For example, first, the control section 410 calculates combination rates of original image data respectively corresponding to the ring illumination and the first to fourth directional illuminations on the basis of the designated emitting direction. Thereafter, the control section 410 corrects the combination rates of the original image data respectively corresponding to the ring illumination and the first to fourth directional illuminations such that a total of a plurality of combination rates of the ring illumination and the first to fourth directional illuminations is (100−t) % when the designated epi-illumination image rate is t (t is a number of 0 to 100)%.

The plurality of original image data are combined on the basis of the plurality of combination rates calculated as explained above, whereby image data for display is generated. The image SI of the observation target S including components of the original image data corresponding to the coaxial epi-illumination is displayed in the main display region 432.

With the image SI of the original image data corresponding to the coaxial epi-illumination, it is possible to accurately observe the unevenness on the surface of the observation target S and the difference of the material compared with the image SI of the original image data respectively corresponding to the ring illumination and the first to fourth directional illuminations.

Therefore, the user can easily acquire the image SI of the observation target S corresponding to a purpose of observation by operating the epi-illumination button b11 and the slider 433*d* shown in FIG. 42.

[3] Third Embodiment

Figure 43:
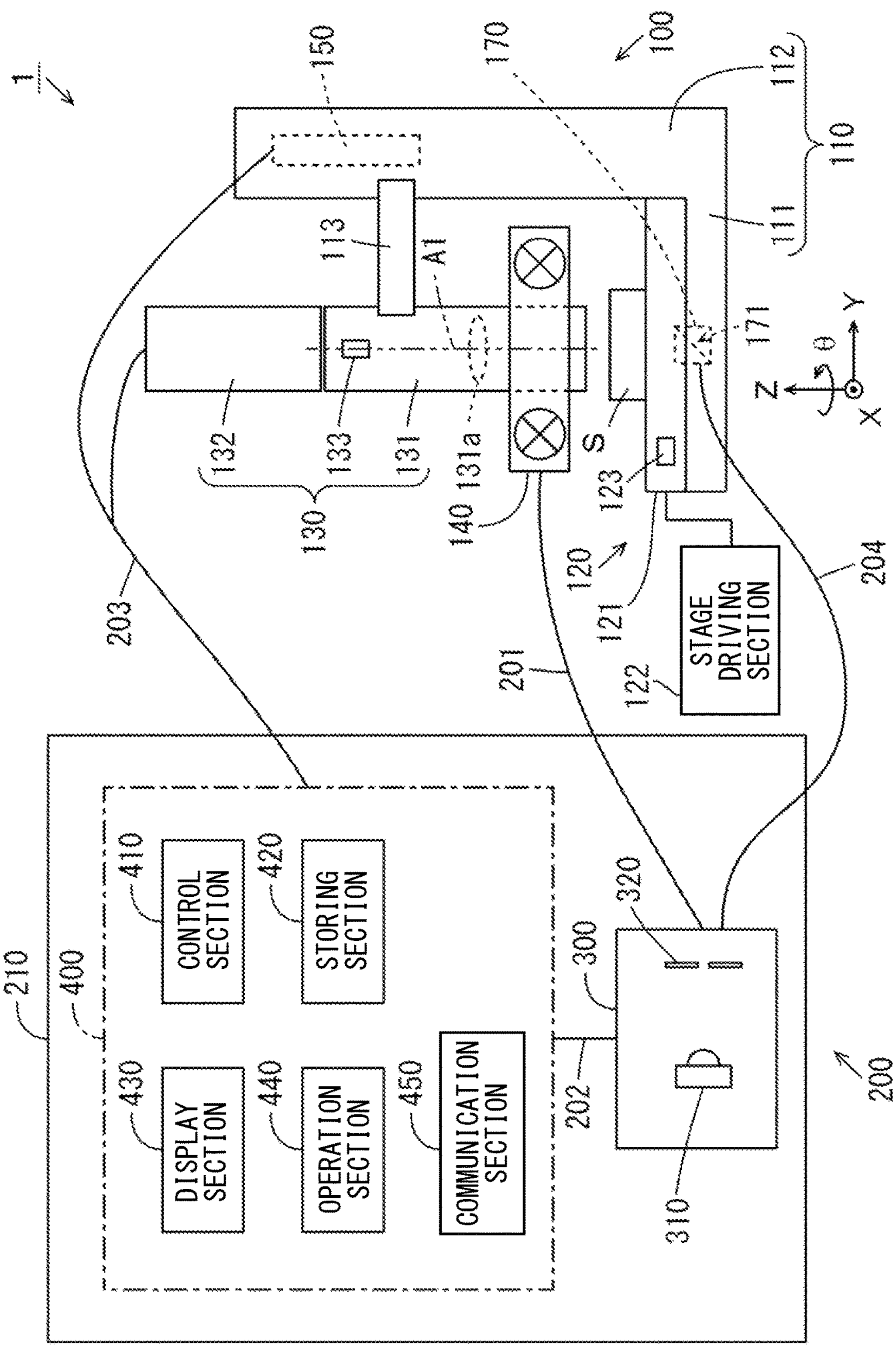
FIG. 43 is a schematic diagram showing the configuration of a magnifying observation apparatus according to a third embodiment of the present invention.

Concerning a magnifying observation apparatus according to a third embodiment of the present invention, differences from the magnifying observation apparatus 1 according to the first embodiment are explained. FIG. 43 is a schematic diagram showing the configuration of the magnifying observation apparatus according to the third embodiment of the present invention. As shown in FIG. 43, in the magnifying observation apparatus 1 according to this embodiment, the measurement head 100 further includes a light projecting section 170. The light projecting section 170 includes a mirror 171. The magnifying observation apparatus 1 further includes a fiber unit 204. The fiber unit 204 includes a not-shown plurality of optical fibers. The light projecting section 170 may be incorporated in the setting section 111 of the stand section 110.

The setting section 111 of the stand section 110 is configured to be capable of holding the light projecting section 170 on the inside. The light projecting section 170 is disposed in the setting section 111 in a state in which the light projecting section 170 is inclined approximately 45° with respect to the optical axis A1 of the objective lens 131*a* such that a reflection surface of the mirror 171 faces obliquely upward. Consequently, the light projecting section 170 is opposed to the lens barrel section 130 across the observation target S and the stage 121. The light projecting section 170 is optically connected to the light generating section 300 of the processing device 200 by a part of the not-shown optical fibers of the fiber unit 201.

The light blocking section 320 of the light generating section 300 includes a plurality of opening patterns respectively corresponding to the regions 140A to 140D of the light projecting section 140 shown in FIGS. 3A and 3B and includes an opening pattern corresponding to the light projecting section 170. The light-projection control section 510 shown in FIG. 2 is capable of making light incident on the light projecting section 140 as in the first embodiment by switching the opening pattern of the light blocking section 320 that causes the light to pass. The light-projection control section 510 is also capable of making the light incident on the light projecting section 170. Behavior of the light made incident on the light projecting section 140 is the same as behavior of the light made incident on the light projecting section 140 in the first embodiment.

The light made incident on the light projecting section 170 is reflected by the mirror 171 to be emitted upward along the optical axis A1 of the objective lens 131*a* and irradiated on the observation target S on the stage 121. The light emitted from the light projecting section 170 is referred to as transmission illumination. The light irradiated on the observation target S is transmitted upward, transmitted through the lens unit 131, and guided to the imaging section 132. By irradiating the transmission illumination on the observation target S, it is possible to image the structure on the inside of the observation target S.

The imaging section 132 further generates original image data indicating the observation target S at the time when the transmission illumination is irradiated on the observation target S. The generated original image data corresponding to the transmission illumination is stored in the storing section 420. Imaging information further indicating presence or absence of execution of irradiation of the transmission illumination and imaging conditions such as a light reception time during the irradiation of the transmission illumination is stored in the storing section 420.

The data generating section 610 shown in FIG. 9 generates image data for display further on the basis of the original image data corresponding to the transmission illumination in addition to the original image data respectively corresponding to the ring illumination and the directional illuminations stored in the storing section 420. Specifically, the data generating section 610 combines, at rates decided by illumination conditions designated by the user, a part or all of the plurality of original image data respectively corresponding to the ring illumination, the directional illuminations, and the transmission illumination. The generated image data for display is stored in the storing section 420.

The measurement head 100 shown in FIG. 43 does not include the light projecting section 160 that emits the coaxial epi-illumination. However, the present invention is not limited to this. The measurement head 100 shown in FIG. 43 may include the light projecting section 160 same as the light projecting section 160 shown in FIG. 41. In this case, image data for display is generated on the basis of the original image data respectively corresponding to the ring illumination, the directional illuminations, the coaxial epi-illumination, and the transmission illumination.

In the plural illumination imaging processing according to this embodiment, the observation target S is imaged using the transmission illumination after the imaging of the observation target S performed using the ring illumination and the first to fourth directional illuminations. Consequently, a plurality of (in this example, six) original image data respectively corresponding to the ring illumination, the first to fourth directional illuminations, and the transmission illumination are generated.

Figure 44:
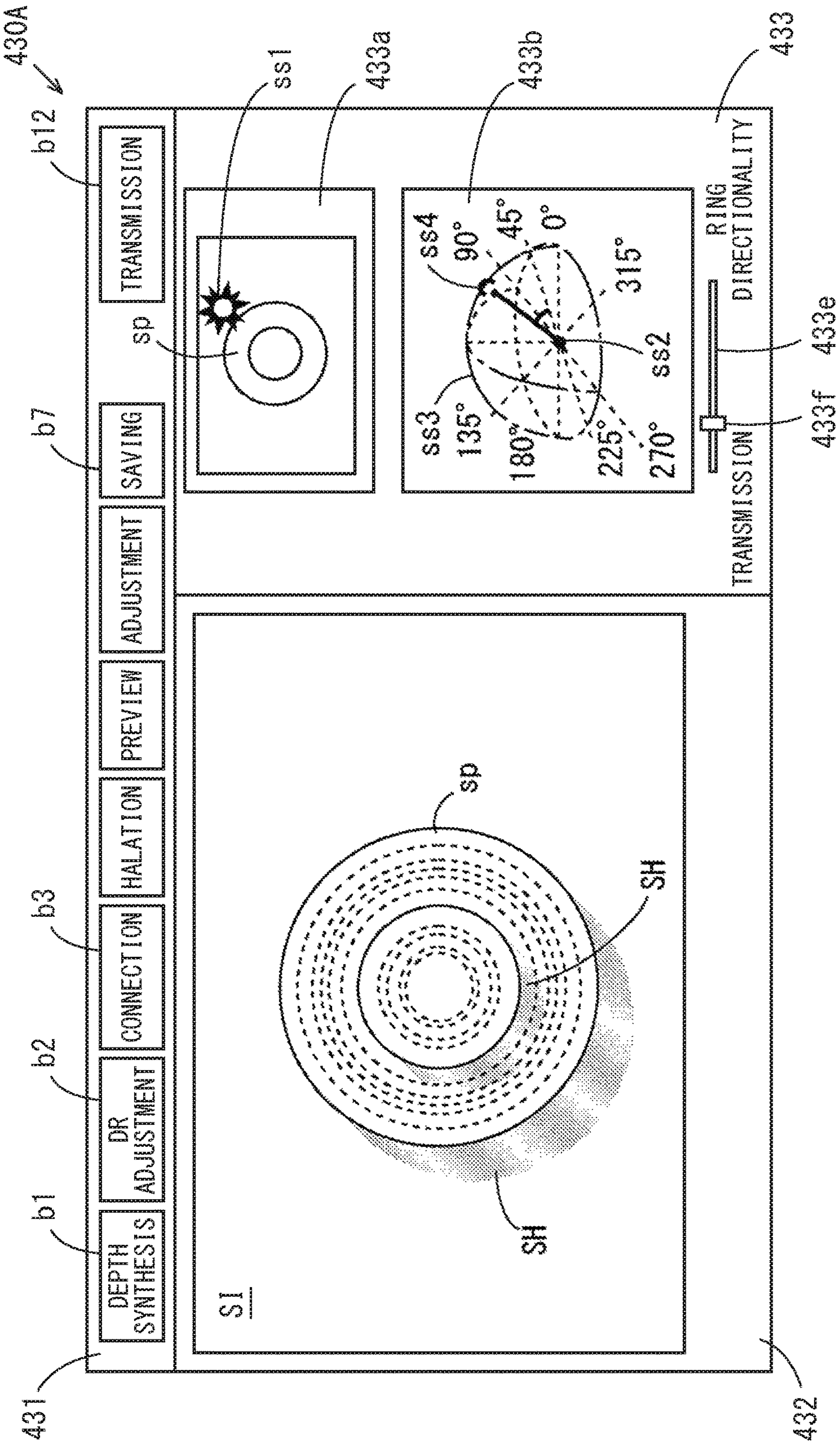
FIG. 44 is a diagram showing a display example of an observation screen after plural illumination imaging processing according to the third embodiment.

When the plural illumination imaging processing is completed, the observation screen 430A is displayed on the display section 430. FIG. 44 is a diagram showing a display example of the observation screen 430A after the plural illumination imaging processing according to the third embodiment. As shown in FIG. 44, a transmission button b12 is displayed in the function display region 431 in addition to the plurality of buttons b1 to b3 and b7 explained above.

The user operates the transmission button b12 using the console 440A shown in FIG. 8. Consequently, the user can instruct that image data for display should be generated using the original image data corresponding to the transmission illumination.

When it is instructed that the original image data corresponding to the transmission illumination is used, a bar 433*e* and a slider 433*f* for designating a combination rate of the original image data corresponding to the transmission illumination to the other original image data (hereinafter referred to as transmission image rate) are displayed in the sub-display region 433.

The user can designate the transmission image rate by operating the slider 433*f*. In the example shown in FIG. 44, the transmission image rate is designated higher as the slider 433*f* is closer to the left end of the bar 433*e*. The transmission image rate is designated lower as the slider 433*f* is closer to the right end of the bar 433*e*.

When the transmission image rate is designated, in the processing in step S209 in FIG. 22 in the image-for-display generation processing, the control section 410 calculates combination rates of the plurality of original image data on the basis of the designated transmission image rate in addition to the designated emitting direction.

For example, first, the control section 410 calculates combination rates of original image data respectively corresponding to the ring illumination and the first to fourth directional illuminations on the basis of the designated emitting direction. Thereafter, the control section 410 corrects the combination rates of the original image data respectively corresponding to the ring illumination and the first to fourth directional illuminations such that a total of a plurality of combination rates of the ring illumination and the first to fourth directional illuminations is (100−u) % when the designated transmission image rate is u (u is a number of 0 to 100)%.

The plurality of original image data are combined on the basis of the plurality of combination rates calculated as explained above, whereby image data for display is generated. The image SI of the observation target S including components of the original image data corresponding to the transmission illumination is displayed in the main display region 432. When the observation target S is formed of a material that transmits light, the internal structure of the observation target S clearly appears in the image SI of the original image data corresponding to the transmission illumination.

Therefore, the user can easily acquire the image SI of the observation target S corresponding to a purpose of observation by operating the transmission button b12 and the slider 433*f* shown in FIG. 44.

When the measurement head 100 shown in FIG. 43 includes the light projecting section 160 shown in FIG. 41 as explained above, in the plural illumination imaging processing, a plurality of original image data respectively corresponding to the ring illumination, the directional illumination, the coaxial epi-illumination, and the transmission illumination may be generated. In this case, on the observation screen 430A, the epi-illumination button b11, the bar 433*c*, and the slider 433*d* shown in FIG. 42 and the transmission button b12, the bar 433*e*, and the slider 433*f* shown in FIG. 44 may be simultaneously displayed. Consequently, flexibility of adjustment is improved concerning the image SI of the observation target S displayed in the main display region 432.

[4] Other Embodiments (1) In the embodiment, after the plurality of original image data respectively corresponding to the plurality of illuminations are generated, the image data for display is generated on the basis of the plurality of original image data according to the illumination conditions designated by the user. However, the present invention is not limited to this. The illumination conditions may be designated by the user first. In this case, original image data necessary for generating the image data for display that should be generated is determined on the basis of the designated illumination conditions.

Therefore, in this embodiment, only illumination corresponding to the necessary original image data is irradiated on the observation target S. Consequently, only the necessary original image data is generated. With this configuration, the other illuminations are not irradiated on the observation target S. Unnecessary original image data is not generated. Consequently, it is possible to generate the image data for display at high speed.

(2) In the embodiment, the regions 140A to 140D of the light projecting section 140 are desirably disposed rotation-symmetrically around the optical axis A1 of the objective lens 131*a*. However, the present invention is not limited to this. The regions 140A to 140D of the light projecting section 140 do not have to be disposed rotation-symmetrically around the optical axis A1 of the objective lens 131*a*.

(3) In the embodiment, when the image data for display is generated by combining the plurality of original image data, one of the plurality of original image data is desirably original image data corresponding to the ring illumination. However, the present invention is not limited to this. It is also possible that the original image data corresponding to the ring illumination is not used for the combination and the image data for display is generated by combining a part or all of the plurality of original image data respectively corresponding to the directional illuminations, the coaxial epi-illumination, and the transmission illumination.

(4) In the embodiment, the image data for display is generated by combining the plurality of original image data. However, the present invention is not limited to this. The image data for display may be generated by selecting one of the generated plurality of original image data. In this configuration, a larger number of original image data are desirably generated. In this case, it is possible to generate more accurate image data for display. Therefore, a larger number of light emission regions may be provided in order to make it possible to generate a larger number of original image data. Light emitting members may be provided to be capable of emitting lights from a larger number of positions. Alternatively, a single light emitting member may be provided to be capable of moving to a plurality of emitting positions.

Figure 45:
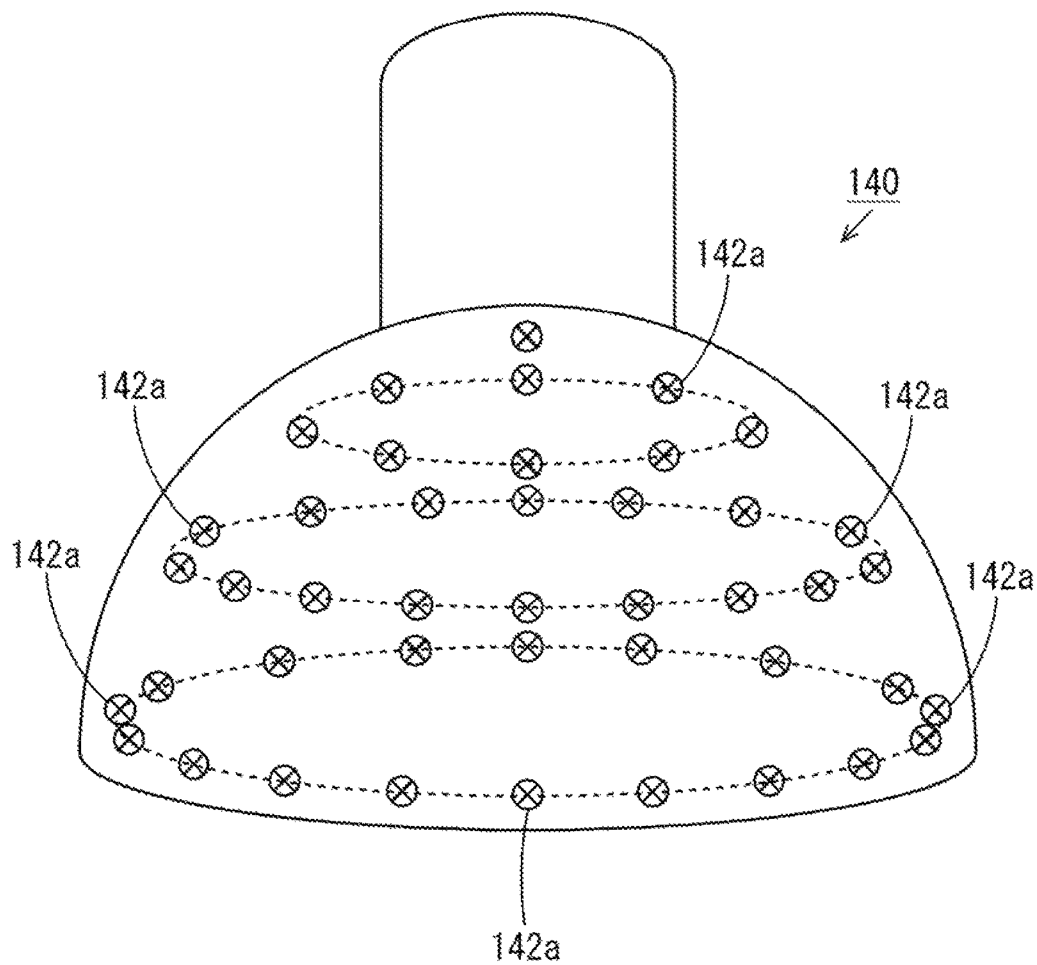
FIG. 45 is a schematic diagram showing a modification of a light projecting section.

(5) In the embodiment, the light projecting section 140 has the cylindrical shape. However, the present invention is not limited to this. The light projecting section 140 may have a shape other than the cylindrical shape. FIG. 45 is a schematic diagram showing a modification of the light projecting section 140. In the example shown in FIG. 45, the light projecting section 140 has, for example, a hemispherical shape. A plurality of light sources 142*a* are provided to be capable of irradiating lights in a plurality of emitting directions on an observation target from any positions on the inner surface of the light projecting section 140. In this case, it is easy to generate image data for display using single original image data without combining a plurality of original image data. In this configuration, it is more desirable that light amounts of lights in emitting directions can be individually adjusted.

(6) In the embodiment, in the image-for-display generation processing, when the imaginary emitting direction of light is designated by the user anew, the image SI of the observation target S displayed on the display section 430 is switched to the image SI corresponding to the light in the designated emitting direction. However, the present invention is not limited to this.

When the imaginary emitting direction of light is designated by the user anew, the image SI of the observation target S based on the image data for display before the update and the image SI of the observation target S based on the image data for display after the update may be simultaneously displayed on the display section 430. In this case, the user can compare the image SI of the observation target S before the emitting direction is designated and the image SI of the observation target S after the designation. Therefore, it is possible to easily identify an appropriate image SI through the observation of the observation target S while designating the imaginary emitting direction of light. The example in which the images SI before and after the update are simultaneously displayed includes, for example, displaying the images SI before and after the update side by side and superimposing and displaying the images SI before and after the update.

(7) In the embodiment, the emitting-direction designation field 433*a* for designating the imaginary emitting direction of light and the emitting-direction display field 433*b* for displaying the imaginary emitting direction of light are displayed on the display section 430 together with the image SI based on the image data for display. However, the present invention is not limited to this. The emitting-direction designation field 433*a* and the emitting-direction display field 433*b* may be displayed on another display device separate from the display section 430. For example, by providing a display function in the console 440A of the operation section 440, the emitting-direction designation field 433*a* and the emitting-direction display field 433*b* may be displayed on the console 440A.

(8) In the embodiment, the control section 410 of the magnifying observation apparatus 1 executes the plural illumination imaging processing, the image-for-display generation processing, the depth synthesis processing, the DR adjustment processing, and the connection processing. However, the present invention is not limited to this. The control section 410 only has to execute the plural illumination imaging processing and the image-for-display generation processing among the plurality of kinds of processing explained above and does not have to execute a part or all of the depth synthesis processing, the DR adjustment processing, and the connection processing.

[5] Correspondence Relation Between the Constituent Elements of the Claims and the Sections of the Embodiments An example of correspondence between the constituent elements of the claims and the sections of the embodiments is explained. However, the present invention is not limited to the example explained below.

In the embodiment, the observation target S is an example of the observation target, the stage 121 is an example of the stage, the ring illumination and the first to fourth directional illuminations are examples of the lights in the plurality of emitting directions, the light projecting sections 140, 160, and 170, the fiber units 201 and 204, and the light generating section 300 are examples of the light projecting device, the imaging section 132 is an example of the imaging section, the display section 430 and the operation section 440 are examples of the designating section, the data generating section 610 is an example of the data generating section, the display section 430 is an example of the display section, and the magnifying observation apparatus 1 is an example of the magnifying observation apparatus.

The light icon ss1 and the emitting position image ss4 are examples of the first indicator, the display section 430 is an example of the indicator display section, the operation section 440 is an example of the operation section, the target partial image sp and the reference point image ss2 on the target position image ss0 are an example of the second indicator, and the hemispherical image ss3 is an example of the third indicator.

Further, the function display region 431 in the display section 430 is an example of the first display region, the main display region 432 in the display section 430 is an example of the second display region, the objective lens 131*a* is an example of the objective lens, the regions 140A to 140D of the light projecting section 140 are examples of the plurality of light emission regions, the light projecting section 140 is an example of the first light projecting section, and the light blocking section 320 is an example of the switching section.

The coaxial epi-illumination is an example of the first light, the light projecting section 160 is an example of the second light projecting section, the transmission illumination is an example of the second light, the light projecting section 170 is an example of the third light projecting section, the main display region 432 is an example of the main display region, the emitting-direction designation field 433*a* is an example of the sub-display region, the target partial image sp displayed in the emitting-direction designation field 433*a* is an example of the position image, and the light icon ss1 displayed in the main display region 432 and the emitting-direction designation region 433*a* is an example of the emitting position indicator.

As the constituent elements of the claims, other various elements including the configurations or the functions described in the claims can also be used.

The present invention can be effectively used in various magnifying observation apparatuses.

What is claimed is:

1. A magnifying observation apparatus comprising:
- a stage on which an observation target is placed;
- a light projecting device configured to selectively irradiate lights in a plurality of emitting directions different from one another on the observation target placed on the stage;
- an imaging section configured to receive light from the observation target and respectively generate a plurality of image data indicating images of the observation target at times when the lights in the plurality of emitting directions are respectively irradiated on the observation target;
- a designating section configured to designate an imaginary emitting direction of light on the basis of operation by a user;
- a data generating section configured to generate, on the basis of the emitting direction designated by the designating section and the plurality of image data generated by the imaging section, image data for display indicating an image of the observation target that should be obtained when it is assumed that the light in the designated emitting direction is irradiated on the observation target; and
- a display section configured to display an image for display based on the image data for display generated by the data generating section.

2. The magnifying observation apparatus according to claim 1, wherein the data generating section generates the image data for display by combining at least two or more image data among the plurality of image data generated by the imaging section.

3. The magnifying observation apparatus according to claim 2, wherein the data generating section determines rates of the combination of the at least two or more image data on the basis of the designated emitting direction.

4. The magnifying observation apparatus according to claim 1, wherein the data generating section updates, according to the emitting direction designated by the designating section, the image data for display to be generated.

5. The magnifying observation apparatus according to claim 4, wherein the display section displays an image for display based on the image data for display before the update simultaneously with an image for display based on the image data for display after the update.

6. The magnifying observation apparatus according to claim 1, wherein the designating section includes:
- an indicator display section configured to display a first indicator indicating an emitting position of light; and
- an operation section operated by the user in order to change a position of the first indicator displayed on the indicator display section, wherein the imaginary emitting direction of light is designated on the basis of the position of the first indicator on the indicator display section operated by the operation section.

7. The magnifying observation apparatus according to claim 6, wherein the indicator display section further displays a second indicator indicating a position of the observation target.

8. The magnifying observation apparatus according to claim 6, wherein the indicator display section further displays a third indicator indicating a range that can be designated as the imaginary emitting direction of light.

9. The magnifying observation apparatus according to claim 6, wherein the indicator display section configures a part of the display section, and the display section includes:

a first display region where the image for display based on the image data for display is displayed; and a second display region where the first indicator is displayed.

10. The magnifying observation apparatus according to claim 6, wherein the indicator display section configures a part of the display section, and the display section superimposes and displays the first indicator on the image for display based on the image data for display.

11. The magnifying observation apparatus according to claim 1, further comprising an objective lens, wherein the imaging section generates the plurality of image data by receiving light from the observation target via the objective lens, and the light projecting device includes:

a first light projecting section including a plurality of light emission regions rotation-symmetrically disposed around an optical axis of the objective lens, the first light projecting section being provided to surround the optical axis of the objective lens; and a switching section configured to switch an emission state of light in the plurality of light emission regions such that the lights in the plurality of light emitting directions are irradiated on the observation target.

12. The magnifying observation apparatus according to claim 11, wherein the light projecting device further includes a second light projecting section configured to irradiate first light on the observation target from a position closer to the optical axis of the objective lens than the first light projecting section, the switching section further switches an emission state of the first light in the second light projecting section, the imaging section further generates image data indicating an image of the observation target at a time when the first light is irradiated on the observation target, and the data generating section generates the image data for display further on the basis of the image data generated according to the first light.

13. The magnifying observation apparatus according to claim 11, wherein the light projecting device further includes a third light projecting section disposed to be opposed to the imaging section across the observation target and configured to irradiate second light on the observation target, the switching section further switches an emission state of the second light in the third light projecting section, the imaging section further generates image data indicating an image of the observation target at a time when the second light is irradiated on the observation target, and the data generating section generates the image data for display further on the basis of the image data generated according to the second light.

14. The magnifying observation apparatus according to claim 1, wherein the designating section is configured to be capable of designating the imaginary emitting direction of light on the image for display displayed by the display section.

15. The magnifying observation apparatus according to claim 1, wherein the display section includes:

a main display region where the image for display based on the image data for display is displayed; and a sub-display region where a position image indicating a position of the observation target is displayed, the sub-display region being smaller than the main display region, emitting position indicators indicating emitting positions of lights are respectively displayed in the main display region and the sub-display region, and when the designation of the imaginary emitting direction of light is changed by the designating section, the emitting position indicators displayed in the main display region and the sub-display region move in association with each other to move to positions corresponding to the changed emitting direction.

16. The magnifying observation apparatus according to claim 15, wherein the designating section is configured to be capable of operating at least one of the emitting position indicator displayed in the main display region and the emitting position indicator displayed in the sub-display region.

17. The magnifying observation apparatus according to claim 11, wherein the data generating section updates, according to the emitting direction designated by the designating section, the image data for display to be generated.

18. The magnifying observation apparatus according to claim 14, wherein the data generating section updates, according to the emitting direction designated by the designating section, the image data for display to be generated.

* * * * *